US012138666B2

(12) United States Patent
Endo et al.

(10) Patent No.: US 12,138,666 B2

(45) Date of Patent: Nov. 12, 2024

(54) SUBSTRATE PROCESSING METHOD AND SUBSTRATE PROCESSING APPARATUS

(71) Applicant: SCREEN Holdings Co., Ltd., Kyoto (JP)

(72) Inventors: Toru Endo, Kyoto (JP); Yuta Yamanouchi, Kyoto (JP); Yuta Segawa, Kyoto (JP); Rikuta Aoki, Kyoto (JP); Tsung Ju Lin, Kyoto (JP); Jun Sawashima, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 0 days.

(21) Appl. No.: 18/166,603

(22) Filed: Feb. 9, 2023

(65) Prior Publication Data

US 2023/0256477 A1 Aug. 17, 2023

(30) Foreign Application Priority Data

Feb. 14, 2022 (JP) ................................ 2022-020586
Oct. 5, 2022 (JP) ................................ 2022-160808

(51) Int. Cl.

*B08B 3/04* (2006.01)
*B08B 3/02* (2006.01)
*B08B 13/00* (2006.01)

(52) U.S. Cl.

CPC ................ *B08B 3/04* (2013.01); *B08B 3/024* (2013.01); *B08B 13/00* (2013.01); *B08B 2203/0264* (2013.01)

(58) Field of Classification Search

None

See application file for complete search history.

(56) References Cited

U.S. PATENT DOCUMENTS 10,328,447 B1 * 6/2019 Vandenbergh ...... B05B 11/1045
2003/0170988 A1 * 9/2003 Izumi ...................... B05B 7/066 438/689
2004/0197433 A1 * 10/2004 Terada ................ B23K 26/146 257/E23.179

(Continued)

FOREIGN PATENT DOCUMENTS

JP 2008027931 A 2/2008
JP 2016025197 A * 2/2016

(Continued)

*Primary Examiner* — Spencer E. Bell

*Assistant Examiner* — Omair Chaudhri

(74) *Attorney, Agent, or Firm* — OSTROLENK FABER LLP

(57) ABSTRACT

A substrate processing apparatus includes a chemical liquid nozzle 31 that includes a chemical liquid discharge port 95 discharging a chemical liquid in a chemical liquid discharge direction D1, inclined with respect to an upper surface of a substrate W, toward a target position P1 within the upper surface of the substrate W, a spray shield 101 that includes a shield surface 104 directly opposing the upper surface of the substrate W and with which the shield surface 104 overlaps with the target position P1 in plan view and, when the chemical liquid nozzle 31 and the shield surface 104 are viewed from below, all portions of the chemical liquid discharge port 95 are disposed at an outer side of an outer edge of the shield surface 104 or on the outer edge of the shield surface 104, and a nozzle moving unit 38 that moves the chemical liquid nozzle 31 together with the spray shield 101.

14 Claims, 18 Drawing Sheets

(56) References Cited

U.S. PATENT DOCUMENTS

| | | | | |
|---|---|---|---|---|
| 2008/0017222 | A1* | 1/2008 | Miya | H01L 21/67051 134/116 |
| 2010/0247761 | A1* | 9/2010 | Hashimoto | H01L 21/68792 118/52 |
| 2014/0326807 | A1* | 11/2014 | Lee | B05C 11/10 239/589 |
| 2018/0036752 | A1* | 2/2018 | Breingan | H01L 21/67051 |
| 2018/0046082 | A1* | 2/2018 | deVilliers | B05B 9/047 |
| 2018/0345315 | A1* | 12/2018 | Tanaka | B05D 1/005 |
| 2019/0041743 | A1* | 2/2019 | Okita | H01L 21/02052 |
| 2019/0176179 | A1* | 6/2019 | Yoshida | H01L 21/67034 |
| 2020/0013641 | A1* | 1/2020 | Nulman | H01L 21/0206 |
| 2020/0381269 | A1 | 12/2020 | Fujiwara et al. | |
| 2023/0001458 | A1* | 1/2023 | Hashimoto | B05B 1/10 |
| 2023/0100608 | A1* | 3/2023 | Smith | E03D 9/08 4/448 |
| 2023/0241636 | A1* | 8/2023 | Takakita | B05B 12/32 239/290 |

FOREIGN PATENT DOCUMENTS

| | | | | |
|---|---|---|---|---|
| JP | 2020174193 | A | | 10/2020 |
| JP | 2020194950 | A | | 12/2020 |
| KR | 20080061915 | A | * | 7/2008 |
| KR | 20160115539 | A | * | 10/2016 |

* cited by examiner

SUBSTRATE PROCESSING METHOD AND SUBSTRATE PROCESSING APPARATUS

CROSS REFERENCE TO RELATED APPLICATIONS

This application claims the benefit of priority to Japanese Patent Application No. 2022-20586 filed on Feb. 14, 2022 and Japanese Patent Application No. 2022-160808 filed on Oct. 5, 2022. The entire contents of these applications are hereby incorporated herein by reference.

BACKGROUND OF THE INVENTION

1. Field of the Invention

The present invention relates to a substrate processing method and a substrate processing apparatus that process a substrate. Examples of substrates include a semiconductor wafer, a substrate for a flat panel display (FPD) such as a liquid crystal display and an organic electroluminescence (organic EL) display, a substrate for an optical disc, a substrate for a magnetic disc, a substrate for a magneto-optical disc, a substrate for a photomask, a ceramic substrate, a substrate for a solar cell, and the like.

2. Description of Related Art

Japanese Patent Application Publication No. 2016-25197 discloses that a chemical liquid nozzle that discharges a chemical liquid such as SPM (a mixed liquid of sulfuric acid and hydrogen peroxide water), etc., toward an upper surface of a substrate and a dispersion preventing cover that receives upwardly scattering spray droplets of the chemical liquid.

With Japanese Patent Application Publication No. 2016-25197, a range of dispersion of the spray droplets of the chemical liquid that are generated when the chemical liquid nozzle discharges the chemical liquid toward the upper surface of the substrate can be narrowed by the dispersion preventing cover. However, further narrowing of the range of dispersion of the spray droplets is required.

SUMMARY OF THE INVENTION

A preferred embodiment of the present invention provides a substrate processing apparatus including a substrate holding unit that holds a substrate horizontally, a chemical liquid nozzle that includes a chemical liquid discharge port that discharges a chemical liquid in a chemical liquid discharge direction, inclined with respect to an upper surface of the substrate held by the substrate holding unit, toward a target position within the upper surface of the substrate, a spray shield that includes a shield surface directly opposing the upper surface of the substrate and with which the shield surface overlaps with the target position in plan view and, when the chemical liquid nozzle and the shield surface are viewed from below, all portions of the chemical liquid discharge port are disposed at an outer side of an outer edge of the shield surface or on the outer edge of the shield surface, and a nozzle moving unit that moves the chemical liquid nozzle together with the spray shield.

According to this arrangement, spray droplets of the chemical liquid that are generated when the chemical liquid nozzle discharges the chemical liquid toward the upper surface of the substrate are received by the spray shield. The chemical liquid nozzle discharges the chemical liquid toward the target position within the upper surface of the substrate. The chemical liquid discharged from the chemical liquid nozzle collides with the upper surface of the substrate or a liquid on the substrate at or in a vicinity of the target position. The shield surface of the spray shield is disposed above the target position and directly opposes the target position. The shield surface is therefore disposed close to a generation source of the spray droplets of the chemical liquid. The spray droplets of the chemical liquid that are scattered upward from the substrate can thereby be received efficiently by the spray shield.

The spray shield moves together with the chemical liquid nozzle. Even if the target position moves within the upper surface of the substrate due to movement of the chemical liquid nozzle, the state in which the shield surface directly opposes the target position can be maintained. Therefore, regardless of which position within the upper surface of the substrate the chemical liquid is discharged toward, the spray droplets of the chemical liquid can be received by the spray shield. Further, the chemical liquid nozzle discharges the chemical liquid in the chemical liquid discharge direction that is inclined with respect to the upper surface of the substrate. Therefore, in comparison to a case where the chemical liquid is discharged perpendicularly to the upper surface of the substrate, a distance by which the spray droplets of the chemical liquid scatter upward from the substrate can be decreased.

When the chemical liquid nozzle and the spray shield are viewed from directly below, respective portions of the chemical liquid discharge port are disposed at the outer side of the outer edge of the shield surface or on the outer edge of the shield surface. In other words, when the chemical liquid nozzle and the spray shield are viewed from directly below, the chemical liquid discharge port is not surrounded by the outer edge of the shield surface and does not overlap with respective portions of the shield surface other than the outer edge. The spray shield can thus be made compact in comparison to a case where the chemical liquid discharge port is surrounded by the outer edge of the shield surface.

The outer edge of the shield surface of the spray shield is a closed line (a line with which a start point and an end point are coincident) corresponding to a contour line of the shield surface. The shield surface may be one or more of a flat surface or curved surface and may include both a flat surface and a curved surface. If a flat surface is included in the shield surface, the flat surface may be parallel to the upper surface of the substrate or may be non-parallel to the upper surface of the substrate.

In the preferred embodiment of the present invention, at least a portion of the shield surface may be disposed higher than a lower end of the chemical liquid discharge port.

According to this arrangement, at least a portion of the shield surface of the spray shield is disposed higher than the lower end of the chemical liquid discharge port of the chemical liquid nozzle. When the chemical liquid nozzle discharges the chemical liquid, spray droplets of the chemical liquid that scatter radially from the chemical liquid discharge port are generated. By disposing at least a portion of the shield surface as described above, the spray droplets of the chemical liquid that are scattered upward from the chemical liquid discharge port can be received by the shield surface and a range of dispersion of the spray droplets of the chemical liquid can be narrowed.

In the preferred embodiment of the present invention, when the chemical liquid nozzle and the shield surface are viewed from below, a shortest distance from the chemical liquid discharge port to the outer edge of the shield surface may be shorter than a length of the shield surface in a front/rear direction of the spray shield that is horizontal and parallel to the chemical liquid discharge direction in plan view.

According to this arrangement, at least a portion of the shield surface of the spray shield is disposed higher than the lower end of the chemical liquid discharge port of the chemical liquid nozzle and the shield surface is disposed close to the chemical liquid discharge port of the chemical liquid nozzle. The spray droplets of the chemical liquid that are scattered from the chemical liquid discharge port can thus be received efficiently by the shield surface. On the other hand, the shield surface is long in the front/rear direction of the spray shield that is horizontal and parallel to the chemical liquid discharge direction in plan view. A large portion of the spray droplets of the chemical liquid that are scattered upward from the substrate moves in the front/rear direction of the spray shield in plan view. Since the shield surface is long in the front/rear direction of the spray shield, the spray droplets of the chemical liquid that are scattered upward from the substrate can be received efficiently by the shield surface.

In the preferred embodiment of the present invention, the chemical liquid discharge direction may be a direction that is parallel in plan view to a direction in which the nozzle moving unit moves the chemical liquid nozzle horizontally.

According to this arrangement, the chemical liquid nozzle discharges the chemical liquid in a direction parallel (strictly parallel or practically parallel) in plan view to the direction in which the chemical liquid nozzle moves horizontally. When the chemical liquid nozzle moves horizontally, not just the target position within the upper surface of the substrate but the spray shield also moves in the same direction as the chemical liquid nozzle. A large portion of the spray droplets of the chemical liquid that are scattered upward from the substrate moves in the chemical liquid discharge direction in plan view. By making the chemical liquid nozzle discharge the chemical liquid while moving the chemical liquid nozzle horizontally, the spray shield can be moved close to or away from the spray droplets of the chemical liquid that are scattered upward from the substrate to change the manner in which the spray droplets are received by the shield surface.

In the preferred embodiment of the present invention, a distance in a vertical direction from the upper surface of the substrate to the shield surface may decrease with separation from the chemical liquid discharge port in the front/rear direction of the spray shield that is horizontal and parallel to the chemical liquid discharge direction in plan view.

According to this arrangement, the distance in the vertical direction from the upper surface of the substrate to the shield surface is not fixed but changes. Specifically, the distance in the vertical direction from the upper surface of the substrate to the shield surface decrease with separation from the chemical liquid discharge port in the front/rear direction of the spray shield, that is, the horizontal direction that is parallel to the chemical liquid discharge direction in plan view. With separation from the chemical liquid discharge port, the shield surface approaches the target position within the upper surface of the substrate. The spray droplets of the chemical liquid that are scattered upward from the substrate can thus be received efficiently by the shield surface.

In the preferred embodiment of the present invention, an upper end of the shield surface may be a portion of the shield surface that is closest to the chemical liquid discharge port and may be disposed higher than the lower end of the chemical liquid discharge port.

According to this arrangement, the upper end of the shield surface is disposed higher than the lower end of the chemical liquid discharge port of the chemical liquid nozzle. The upper end of the shield surface is the portion of the shield surface that is closest to the chemical liquid discharge port. That is, the portion of the shield surface that is positioned highest is disposed higher than the lower end of the chemical liquid discharge port of the chemical liquid nozzle and is disposed at a position closest to the chemical liquid discharge port among portions of the shield surface. The spray droplets of the chemical liquid that are scattered from the chemical liquid discharge port can thus be received efficiently by the shield surface.

In the preferred embodiment of the present invention, when the chemical liquid nozzle and the shield surface are viewed from below, a shortest distance from the chemical liquid discharge port to the upper end of the shield surface may be shorter than the length of the shield surface in the front/rear direction of the spray shield.

According to this arrangement, the upper end of the shield surface is disposed close to the chemical liquid discharge port of the chemical liquid nozzle. The upper end of the shield surface is the portion of the shield surface that is closest to the chemical liquid discharge port and is disposed higher than the lower end of the chemical liquid discharge port. The spray droplets of the chemical liquid that are scattered from the chemical liquid discharge port can thus be received efficiently by the shield surface. On the other hand, the shield surface is long in the front/rear direction of the spray shield that is horizontal and parallel to the chemical liquid discharge direction in plan view. A large portion of the spray droplets of the chemical liquid that are scattered upward from the substrate moves in the front/rear direction of the spray shield in plan view. Since the shield surface is long in the front/rear direction of the spray shield, the spray droplets of the chemical liquid that are scattered upward from the substrate can be received efficiently by the shield surface.

In the preferred embodiment of the present invention, the chemical liquid nozzle may include a lower surface that directly opposes the upper surface of the substrate and a lower end of the shield surface may be disposed at a height equal to the lower surface of the chemical liquid nozzle or a height higher than the lower surface.

According to this arrangement, the lower end of the shield surface of the spray shield is disposed not at a position lower than the lower surface of the chemical liquid nozzle but at a position equal to the lower surface of the chemical liquid nozzle in the vertical direction or a position higher than the lower surface of the chemical liquid nozzle. Therefore, in comparison to a case where the lower end of the shield surface is disposed at a position lower than the lower surface of the chemical liquid nozzle, the chemical liquid discharge port can be brought closer to the upper surface of the substrate and an impact when the chemical liquid collides with the upper surface of the substrate or a liquid on the substrate can be relaxed.

The lower surface of the chemical liquid nozzle is a surface that is disposed lowest among the respective portions of the chemical liquid nozzle that are visible when the chemical liquid nozzle is viewed from below. The lower surface of the chemical liquid nozzle may be one or more of a flat surface or curved surface and may include both a flat surface and a curved surface. If a flat surface is included in the lower surface of the chemical liquid nozzle, the flat surface may be parallel to the upper surface of the substrate or may be non-parallel to the upper surface of the substrate.

In the preferred embodiment of the present invention, the chemical liquid nozzle may include a lower surface that directly opposes the upper surface of the substrate and an outer circumferential surface of cylindrical shape that extends upward from the lower surface and the chemical liquid discharge port may open at the outer circumferential surface of the chemical liquid nozzle.

According to this arrangement, the chemical liquid discharge port of the chemical liquid nozzle opens at the outer circumferential surface that extends upward from the lower surface of the chemical liquid nozzle. In this case, an inclination angle of the chemical liquid discharge direction with respect to a horizontal plane tends to be smaller than that in a case where the chemical liquid discharge port opens at the lower surface of the chemical liquid nozzle. When the chemical liquid is discharged obliquely toward the upper surface of the substrate, the spray droplets of the chemical liquid scatter obliquely upward from the substrate and horizontally away from the chemical liquid discharge port. When the inclination angle of the chemical liquid discharge direction with respect to the horizontal plane decreases, an angle of the spray droplets that scatter obliquely upward from the substrate (angle formed by a path through which liquid droplets pass and the horizontal plane) also decreases.

By forming the chemical liquid discharge port at the outer circumferential surface of the chemical liquid nozzle, the inclination angle of the chemical liquid discharge direction with respect to the horizontal plane can be decreased and a range of dispersion of the spray droplets in an up direction can be decreased. Further, since the distance in the vertical direction from the upper surface of the substrate to the shield surface decreases with separation from the chemical liquid discharge port, the spray droplets of the chemical liquid that are scattered obliquely upward from the substrate at a small inclination angle with respect to the horizontal plane can also be received by the shield surface. The range of dispersion of the spray droplets of the chemical liquid can thereby be narrowed not just in the up direction but also in the horizontal direction.

In the preferred embodiment of the present invention, the substrate processing apparatus may further include a first component liquid piping that guides a first component liquid exceeding 100° C. toward the chemical liquid discharge port and a second component liquid piping that guides a second component liquid containing water and being less than 100° C. toward the chemical liquid discharge port, the chemical liquid nozzle may include an arm portion of cylindrical shape that extends horizontally and a nozzle portion that extends downward from the arm portion, the nozzle portion may include an internal space in which the first component liquid exceeding 100° C. and the second component liquid containing water and being less than 100° C. are mixed and the chemical liquid discharge port by which the mixed liquid of the first component liquid and the second component liquid mixed in the internal space is discharged as the chemical liquid, and the first component liquid piping and the second component liquid piping may be inserted in the arm portion of cylindrical shape and connected to the nozzle portion.

According to this arrangement, the first component liquid exceeding 100° C. and the second component liquid containing water and being less than 100° C. are mixed in the nozzle portion of the chemical liquid nozzle and the mixed liquid of these is discharged as the chemical liquid from the nozzle portion. When the first component liquid exceeding 100° C. and the second component liquid containing water and being less than 100° C. are mixed immediately before discharge, spray droplets of the mixed liquid scatter at times from the chemical liquid discharge port and the upper surface of the substrate due to rapid boiling of water. By providing the spray shield, dispersion of such spray droplets can be prevented.

Further, the first component liquid piping and the second component liquid piping are inserted in the arm portion of cylindrical shape. The first component liquid piping and the second component liquid piping can thus be protected from other members and the spray droplets of the chemical liquid by the arm portion. In addition, decrease in temperature of the first component liquid flowing through the first component liquid piping can be alleviated by the arm portion to enable the first component liquid of high temperature to be supplied to the nozzle portion. The chemical liquid of high activity and high temperature can thereby be formed and supplied to the substrate.

In the preferred embodiment of the present invention, the substrate processing apparatus may further include a standby pod that houses the chemical liquid nozzle and the spray shield and a cleaning liquid piping that guides a cleaning liquid to be supplied to the chemical liquid nozzle and the spray shield inside the standby pod and the standby pod may include a housing cup having an inner circumferential surface of cylindrical shape that, in plan view, surrounds the chemical liquid nozzle and the spray shield positioned at a standby position and a top cover projecting from the inner circumferential surface of the housing cup in plan view and forming an opening through which the chemical liquid nozzle and the spray shield pass when the chemical liquid nozzle and the spray shield enter inside the housing cup.

According to this arrangement, the cleaning liquid is supplied to the chemical liquid nozzle and the spray shield inside the standby pod to clean the chemical liquid nozzle and the spray shield. The chemical liquid nozzle and the spray shield pass through the opening formed by the top cover of the standby pod and enter inside the housing cup of the standby pod. When the chemical liquid nozzle and the spray shield positioned at the standby position are viewed from above, the top cover is disposed between the housing cup and the chemical liquid nozzle plus the spray shield. Therefore, in comparison to a case where there is no top cover, a sealing property of the standby pod can be increased and a fluid (the cleaning liquid, etc.) that exits out of the standby pod through the opening can be lessened.

In the preferred embodiment of the present invention, the spray shield may further include a guard wall that extends downward from the shield surface. According to this arrangement, spray droplets of the chemical liquid that scatter along a path exiting from between the substrate and the shield surface can be received by the guard wall.

In the preferred embodiment of the present invention, the chemical liquid nozzle may include a lower surface that directly opposes the upper surface of the substrate and the outer edge of the shield surface may form a recess portion that houses at least a portion of the lower surface of the chemical liquid nozzle when the chemical liquid nozzle and the spray shield are viewed from below. According to this arrangement, an inner surface of the recess portion that corresponds to being a portion of the outer edge of the shield surface is disposed close to the chemical liquid discharge port and therefore, the spray droplets of the chemical liquid that scatter from the chemical liquid discharge port can be received efficiently by the shield surface.

In the preferred embodiment of the present invention, the spray shield may further include a guard wall that extends downward from the shield surface and the recess portion may be recessed from the guard wall. According to this arrangement, the recess portion is recessed from the guard wall and the guard wall is disposed close to the chemical liquid discharge port, and therefore the spray droplets of the chemical liquid that exit from between the substrate and the shield surface can be lessened further.

Another preferred embodiment of the present invention provides a substrate processing method including a step of moving a chemical liquid nozzle, including a chemical liquid discharge port, together with a spray shield, including a shield surface and with which when the chemical liquid nozzle and the shield surface are viewed from below, all portions of the chemical liquid discharge port are disposed at an outer side of an outer edge of the shield surface or on the outer edge of the shield surface, a step of making the chemical liquid discharge port discharge a chemical liquid in a chemical liquid discharge direction, inclined with respect to an upper surface of a substrate that is held horizontally, toward a target position within the upper surface of the substrate, and a step of making the shield surface directly oppose the upper surface of the substrate such that the shield surface overlaps with the target position in plan view in a state where the chemical liquid discharge port is discharging the chemical liquid in the chemical liquid discharge direction toward the target position to receive, by the shield surface, spray droplets of the chemical liquid that are scattered from the upper surface of the substrate. According to this method, the same effects as the substrate processing apparatus described above can be exhibited.

The above and other objects, features, and advantages of the present invention will become more apparent from the following detailed description of the preferred embodiments with reference to the attached drawings.

DETAILED DESCRIPTION OF PREFERRED EMBODIMENTS

Figure 1:
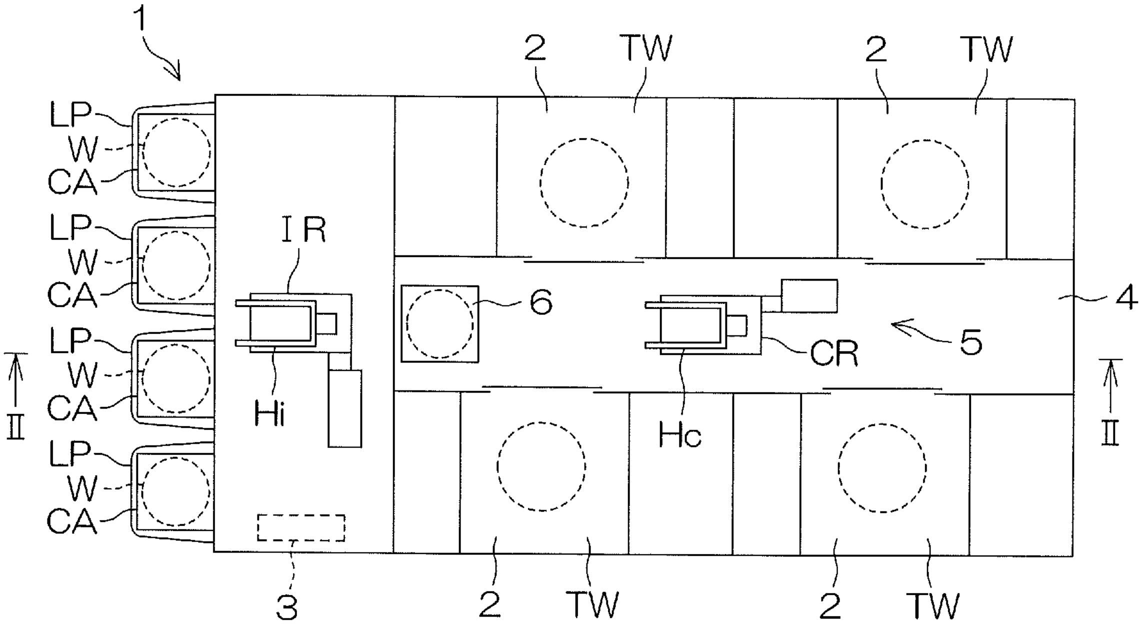
FIG. 1 is a schematic plan view showing a layout of a substrate processing apparatus according to a preferred embodiment of the present invention.
Figure 2:
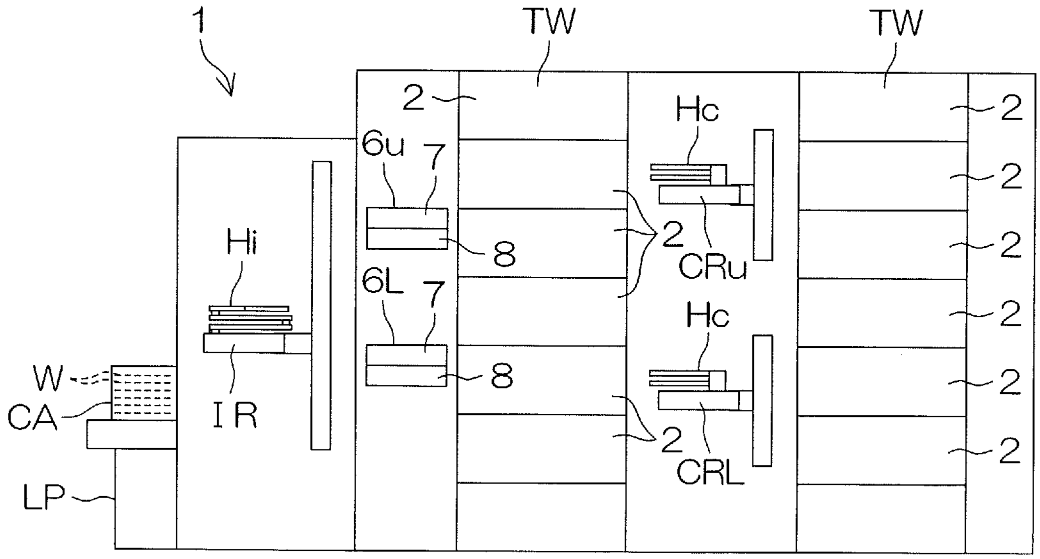
FIG. 2 is a schematic cross-sectional view showing a vertical cross-section of the substrate processing apparatus taken along line II-II shown in FIG. 1.

FIG. 1 is a schematic plan view showing a layout of a substrate processing apparatus 1 according to a preferred embodiment of the present invention. FIG. 2 is a schematic cross-sectional view showing a vertical cross-section of the substrate processing apparatus 1 taken along line II-II shown in FIG. 1.

The substrate processing apparatus 1 is a single substrate processing-type apparatus that processes disc-shaped substrates W such as a semiconductor wafer one by one. As shown in FIG. 1, the substrate processing apparatus 1 includes a load port LP that supports a carrier CA that houses a plurality of substrates W, a processing unit 2 that processes the substrate W transferred from the carrier CA on the load port LP with a processing fluid such as a processing liquid or a processing gas, a transfer system 5 that transfers the substrate W between the carrier CA on the load port LP and the processing unit 2 and a controller 3 that controls the substrate processing apparatus 1. FIG. 1 shows an example where a plurality of load ports LP and a plurality of processing units 2 are provided in the substrate processing apparatus 1.

The plurality of processing units 2 form a plurality of towers TW. FIG. 1 shows an example where four towers TW are formed. Half of the plurality of towers TW are disposed at a right side of a transfer passage 4 of rectilinear shape and the remaining half of the plurality of towers TW are disposed at a left side of the transfer passage 4. As shown in FIG. 2, each tower TW includes a plurality of processing units 2 that are stacked one above the other. In the present example, each tower TW includes six processing units 2 that are stacked one above the other. Therefore, 24 processing units 2 are provided in the substrate processing apparatus 1.

Processing units 2 at upper sides of all towers TW constitute upper processing unit groups and processing units 2 at lower sides of all towers TW constitute lower processing unit groups. If the number of processing units 2 constituting a single tower TW is an odd number, the processing unit 2 at the middle may belong to either of an upper processing unit group and a lower processing unit group. In the example shown in FIG. 1 and FIG. 2, twelve processing units 2 at the upper side constitute an upper processing unit group and twelve processing units 2 at the lower side constitute a lower processing unit group.

As shown in FIG. 1, the transfer system 5 includes a substrate mount portion 6 on which a substrate W transferred between a carrier CA on a load port LP and a processing unit 2 is placed temporarily, an indexer robot IR that transfers the substrate W between the carrier CA on the load port LP and the substrate mount portion 6, and a center robot CR that transfers the substrate W between the substrate mount portion 6 and the processing unit 2.

The substrate mount portion 6 is disposed between the indexer robot IR and the center robot CR in plan view. As shown in FIG. 2, the substrate mount portion 6 includes an upper substrate mount portion 6*u* and a lower substrate mount portion 6L that overlap with each other in plan view. The upper substrate mount portion 6*u* is disposed above the lower substrate mount portion 6L. The upper substrate mount portion 6*u* temporarily holds a substrate W that is being transferred between an upper processing unit group and a carrier CA. The lower substrate mount portion 6L temporarily holds a substrate W that is being transferred between a lower processing unit group and a carrier CA.

The upper substrate mount portion 6*u* and the lower substrate mount portion 6L both have an unprocessed substrate mount portion 7 on which an unprocessed substrate W is placed and a processed substrate mount portion 8 on which a processed substrate W is placed. The unprocessed substrate mount portion 7 and the processed substrate mount portion 8 overlap with each other in plan view. The unprocessed substrate mount portion 7 is disposed above the processed substrate mount portion 8. The unprocessed substrate mount portion 7 may instead be disposed below the processed substrate mount portion 8 in at least one of either of the upper substrate mount portion 6*u* and the lower substrate mount portion 6L.

The unprocessed substrate mount portion 7 and the processed substrate mount portion 8 both include a plurality of supporting portions that support a plurality of substrates W horizontally such as to overlap one above the other. Each supporting portion may be a plurality of pins that contact a lower surface of a substrate W or may be a pair of rails that extend horizontally at a right side and a left side of a substrate W. A substrate W can enter inside the unprocessed substrate mount portion 7 from either of the indexer robot IR side and the center robot CR side and can enter inside the processed substrate mount portion 8 from either of the indexer robot IR side and the center robot CR side.

The indexer robot IR is disposed between the substrate mount portion 6 and the load ports LP in plan view. The indexer robot IR includes one or more of a hand Hi that supports a substrate W horizontally. The hand Hi is movable in parallel in both a horizontal direction and a vertical direction. The hand Hi is rotatable by 180 degrees or more around a vertical straight line. The hand Hi can perform carry-in and carry-out of a substrate W with respect to any carrier CA on the plurality of load ports LP and can also perform carry-in and carry-out of a substrate W with respect to any of the unprocessed substrate mount portions 7 and processed substrate mount portions 8.

As shown in FIG. 2, the center robot CR includes an upper center robot CRu that transfers a substrate W between the upper substrate mount portion 6*u* and an upper processing unit group and a lower center robot CRL that transfers a substrate W between the lower substrate mount portion 6L and a lower processing unit group. The upper center robot CRu is disposed higher than the lower center robot CRL. The upper center robot CRu and the lower center robot CRL are disposed in the transfer passage 4 formed between the plurality of towers TW.

The upper center robot CRu and the lower center robot CRL both include one or more of a hand Hc that supports a substrate W horizontally. The hand Hc is movable in parallel in both the horizontal direction and the vertical direction. The hand Hc is rotatable by 180 degrees or more around a vertical straight line.

The hand Hc of the upper center robot CRu can perform carry-in and carry-out of a substrate W with respect to any processing unit 2 belonging to the upper processing unit groups and can perform carry-in and carry-out of a substrate W with respect to the unprocessed substrate mount portion 7 and the processed substrate mount portion 8 of the upper substrate mount portion 6*u*. The hand Hc of the lower center robot CRL can perform carry-in and carry-out of a substrate W with respect to any processing unit 2 belonging to the lower processing unit groups and can perform carry-in and carry-out of a substrate W with respect to the unprocessed substrate mount portion 7 and the processed substrate mount portion 8 of the lower substrate mount portion 6L.

Next, the processing unit 2 will be described.

Figure 3:
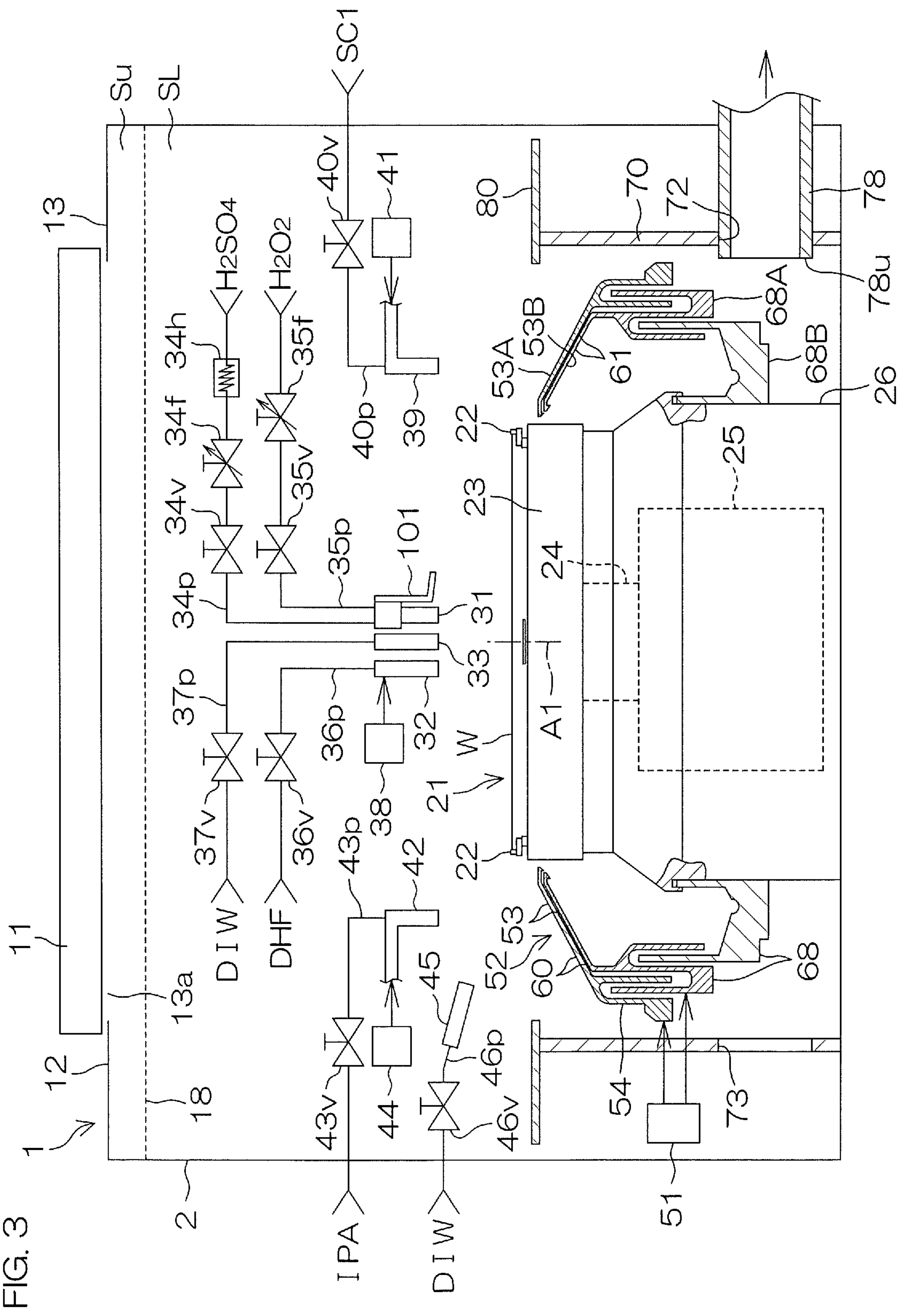
FIG. 3 is a schematic view of an interior of a processing unit when viewed horizontally.
Figure 4:
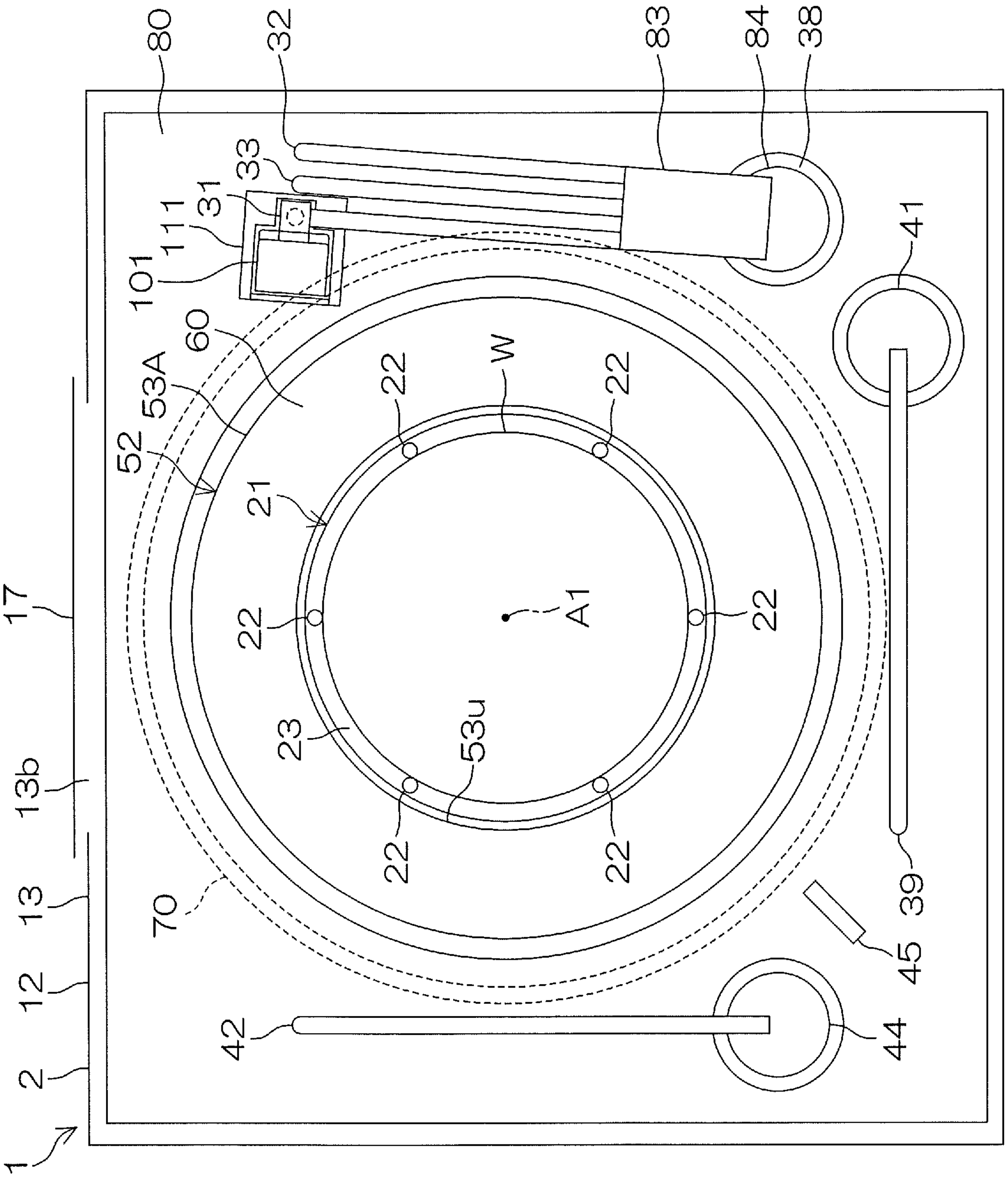
FIG. 4 is a schematic plan view showing the interior of the processing unit.

FIG. 3 is the schematic view of an interior of a processing unit 2 when viewed horizontally. FIG. 4 is a schematic plan view showing the interior of the processing unit 2.

As shown in FIG. 3, the processing unit 2 includes a box-shaped chamber 12 that has an internal space, a spin chuck 21 that rotates one substrate W around a vertical rotation axis A1 passing through the central portion of the substrate W while holding the substrate W horizontally within the chamber 12 and a plurality of nozzles that supply a processing liquid such as a chemical liquid or a rinse liquid to the substrate W held by the spin chuck 21.

As shown in FIG. 4, the chamber 12 has a partition wall 13 of box shape that is provided with a carry-in/carry-out port 13*b* through which the substrate W transferred by the center robot CR (see FIG. 1) passes and a shutter 17 that opens and closes the carry-in/carry-out port 13*b*. As shown in FIG. 3, the chamber 12 further includes a rectifying plate 18 that is disposed below an air blowing port 13*a* that opens at a ceiling surface of the partition wall 13. An FFU 11 (fan filter unit 11) that feeds clean air (air filtered by a filter) is disposed above the air blowing port 13*a*. The air blowing port 13*a* is provided at an upper end portion of the chamber 12 and an exhaust duct 78 to be described below is disposed at a lower end portion of the chamber 12. An upstream end 78*u* of the exhaust duct 78 is disposed inside the chamber 12 and a downstream end of the exhaust duct 78 is disposed outside the chamber 12.

The rectifying plate 18 partitions an internal space of the chamber 12 into an upper space Su above the rectifying plate 18 and a lower space SL below the rectifying plate 18. The upper space Su between the ceiling surface of the partition wall 13 and an upper surface of the rectifying plate 18 is a dispersion space in which the clean air disperses. The lower space SL between a lower surface of the rectifying plate 18 and a floor surface of the partition wall 13 is a processing space in which processing of the substrate W is performed. The spin chuck 21 is disposed in the lower space SL. A distance in the vertical direction from the floor surface of the partition wall 13 to the lower surface of the rectifying plate 18 is longer than a distance in the vertical direction from the upper surface of the rectifying plate 18 to the ceiling surface of the partition wall 13.

The FFU 11 feeds clean air into the upper space Su via the air blowing port 13*a*. The clean air supplied into the upper space Su hits the rectifying plate 18 and disperses in the upper space Su. The clean air inside the upper space Su passes through a plurality of penetrating holes that penetrate up and down through the rectifying plate 18 and flows downward from an entire area of the rectifying plate 18. The clean air supplied into the lower space SL is sucked into the exhaust duct 78 and is released from the chamber 12. A uniform descending flow (down flow) of clean air that flows downward from the rectifying plate 18 is thereby formed in the lower space SL. The processing of the substrate W is performed in a state where the descending flow of clean air is formed.

The spin chuck 21 is disposed in the lower space SL between the lower surface of the rectifying plate 18 and the floor space of the partition wall 13. The spin chuck 21 is disposed below the rectifying plate 18 and directly opposes the lower surface of the rectifying plate 18 in the vertical direction. When the spin chuck 21 holds the substrate W, an upper surface of the substrate W directly opposes the lower surface of the rectifying plate 18 in the vertical direction. The lower surface of the rectifying plate 18 corresponds to being a ceiling surface of the chamber 12. The upper surface of the substrate W that is being held by the spin chuck 21 thus directly opposes, in the vertical direction, the ceiling surface of the chamber 12 that houses the substrate W and the spin chuck 21.

The spin chuck 21 includes a plurality of chuck pins 22 that clamp the substrate W horizontally and a spin base 23 of disk shape that supports the plurality of chuck pins 22. The spin chuck 21 further includes a spin shaft 24 that extends downward from a central portion of the spin base 23, an electric motor 25 that rotates the spin shaft 24 to rotate the plurality of chuck pins 22 and the spin base 23, and a chuck housing 26 that surrounds the electric motor 25.

The spin base 23 includes an upper surface of circular shape that is disposed below the substrate W and an outer circumferential surface of circular cylindrical shape that extends downward from an outer circumference of the upper surface of the spin base 23. The upper surface of the spin base 23 is parallel to a lower surface of the substrate W. The upper surface of the spin base 23 is separated from the lower surface of the substrate W. The upper surface of the spin base 23 is concentric to the substrate W. An outer diameter of the upper surface of the spin base 23 is greater than an outer diameter of the substrate W. The chuck pins 22 project upward from an outer circumferential portion of the upper surface of the spin base 23.

As shown in FIG. 3, the plurality of nozzles include a first chemical liquid nozzle 31, a second chemical liquid nozzle 32, and a third chemical liquid nozzle 39 that discharge chemical liquids toward the upper surface of the substrate W and a first rinse liquid nozzle 33 and a second rinse liquid nozzle 45 that discharge a rinse liquid toward the upper surface of the substrate W. The plurality of nozzles further include a solvent nozzle 42 that discharges a liquid of organic solvent toward the upper surface of the substrate W.

FIG. 3 shows an example where SPM (a mixed liquid of sulfuric acid and hydrogen peroxide water) is discharged from the first chemical liquid nozzle 31, DHF (dilute hydrofluoric acid) is discharged from the second chemical liquid nozzle 32, and SC1 (a mixed liquid of ammonia water and hydrogen peroxide water and water) is discharged from the third chemical liquid nozzle 39. In this example, pure water (DIW (deionized water)) is discharged from the first rinse liquid nozzle 33 and the second rinse liquid nozzle 45 and IPA (isopropyl alcohol) is discharged from the solvent nozzle 42.

The chemical liquid may be a liquid other than SPM, DHF, and SC1. Specifically, the chemical liquid may be a liquid that includes at least one among sulfuric acid, nitric acid, hydrochloric acid, hydrofluoric acid, phosphoric acid, acetic acid, ammonia water, hydrogen peroxide water, organic acids (for example, citric acid, oxalic acid, etc.), organic alkalis (for example, TMAH: tetramethylammonium hydroxide, etc.), surfactants, and corrosion inhibitors or may be a liquid other than these. The same chemical liquid (a chemical liquid that is the same in component and concentration) may be discharged from two or more among the first chemical liquid nozzle 31, the second chemical liquid nozzle 32, and the third chemical liquid nozzle 39.

The rinse liquid may be a liquid other than pure water. The liquid of organic solvent may be a liquid other than IPA. Specifically, the rinse liquid may be a liquid that includes at least one among pure water, carbonated water, electrolyzed ion water, hydrogen water, ozone water, an aqueous hydrochloric acid solution of dilute concentration (for example, approximately 10 to 100 ppm), and an ammonia water of dilute concentration (for example, approximately 10 to 100 ppm) or may be a liquid other than the above. The liquid of organic solvent may be a liquid that includes at least one among IPA, HFE (hydrofluoroether), methanol, ethanol, acetone, and trans-1,2-dichloroethylene or may be a liquid other than these. Rinse liquids differing in at least one of either component and concentration may be discharged from the first rinse liquid nozzle 33 and the second rinse liquid nozzle 45.

The first chemical liquid nozzle 31 may be a scan nozzle that can move a collision position of the processing liquid with respect to the substrate W within the upper surface of the substrate W or may be a fixed nozzle that cannot move the collision position of the processing liquid with respect to the substrate W. The same applies to other nozzles. FIG. 3 shows an example where the first chemical liquid nozzle 31, the second chemical liquid nozzle 32, the third chemical liquid nozzle 39, the first rinse liquid nozzle 33, and the solvent nozzle 42 are scan nozzles and the second rinse liquid nozzle 45 is a fixed nozzle.

The processing unit 2 includes a nozzle moving unit that moves one or more of the scan nozzles horizontally. A single nozzle moving unit that is coupled to two or more scan nozzles may be provided or a single nozzle moving unit may be provided for each single scan nozzle. FIG. 4 shows an example where the first chemical liquid nozzle 31, the second chemical liquid nozzle 32, and the first rinse liquid nozzle 33 are coupled to a first nozzle moving unit 38, the third chemical liquid nozzle 39 is coupled to a second nozzle moving unit 41, and the solvent nozzle 42 is coupled to a third nozzle moving unit 44. In the following description, the first chemical liquid nozzle 31, the second chemical liquid nozzle 32, and the first rinse liquid nozzle 33 may be referred to at times as the "three nozzles."

FIG. 4 shows an example where each of the first nozzle moving unit 38, the second nozzle moving unit 41, and the third nozzle moving unit 44 is a swinging unit that moves one or more of the scan nozzles horizontally along a path of arcuate shape in plan view. A radius of the path of arcuate shape is large and therefore, the swinging unit moves one or more of the scan nozzles horizontally along a path that can be regarded as being a straight line in plan view. At least one among the first nozzle moving unit 38, the second nozzle moving unit 41, and the third nozzle moving unit 44 may be a slide unit that moves one or more of the scan nozzles horizontally along a path of rectilinear shape in plan view.

The first nozzle moving unit 38 includes a horizontal driving actuator that rotates one or more of the scan nozzles around a vertical straight line to move the one or more of the scan nozzles horizontally and a vertical driving actuator that moves one or more of the scan nozzles vertically. The same applies to the second nozzle moving unit 41 and the third nozzle moving unit 44. The horizontal driving actuator and the vertical driving actuator are, for example, electric motors. The horizontal driving actuator and the vertical driving actuator may instead be actuators other than electric motors such as air cylinders, etc.

As shown in FIG. 3, the first chemical liquid nozzle 31 is connected to a sulfuric acid piping **34*p* that guides sulfuric acid toward the first chemical liquid nozzle 31 and a hydrogen peroxide water piping 35*p* that guides hydrogen peroxide water toward the first chemical liquid nozzle 31. A sulfuric acid valve 34*v* and a flow control valve 34*f* are interposed in the sulfuric acid piping 34*p*. A hydrogen peroxide water valve 35*v* and a flow control valve 35*f* are interposed in the hydrogen peroxide water piping 35*p*. The sulfuric acid piping 34*p* is an example of a first component liquid piping and the hydrogen peroxide water piping 35*p*** is an example of a second component liquid piping.

Although not illustrated, the sulfuric acid valve **34*v* includes a valve body provided with a valve seat of annular shape through which a processing liquid such as sulfuric acid, etc., passes, a valve element that is movable with respect to the valve seat, and an actuator that moves the valve element between a closed position at which the valve element contacts the valve seat and an open position at which the valve element is separated from the valve seat. The same applies to other valves such as the hydrogen peroxide water valve 35*v*, etc. The actuator may be a pneumatic actuator or an electric actuator or an actuator other than these. The controller 3 controls the actuator to open and close the sulfuric acid valve 34*v***.

When the sulfuric acid valve **34*v* is opened, sulfuric acid is supplied from the sulfuric acid piping 34*p* to the first chemical liquid nozzle 31 at a flow rate corresponding to an opening degree of the flow control valve 34*f*. When the hydrogen peroxide water valve 35*v* is opened, hydrogen peroxide water is supplied from the hydrogen peroxide water piping 35*p* to the first chemical liquid nozzle 31 at a flow rate corresponding to an opening degree of the flow control valve 35*f*. When the sulfuric acid valve 34*v* and the hydrogen peroxide water valve 35*v* are opened, the sulfuric acid and the hydrogen peroxide water become mixed together and SPM is formed. The SPM is then discharged continuously downward from the first chemical liquid nozzle 31**.

A flow rate of the SPM discharged from the first chemical liquid nozzle 31 and a mixing ratio of the sulfuric acid and the hydrogen peroxide water (ratio of the flow rate of the sulfuric acid with respect to the flow rate of the hydrogen peroxide water) are changed by the flow control valve **34*f* and the flow control valve 35*f*. A temperature of the SPM discharged from the first chemical liquid nozzle 31** is changed by the mixing ratio of the sulfuric acid and the hydrogen peroxide water, a temperature of the sulfuric acid before mixing, and a temperature of the hydrogen peroxide water before mixing.

The mixing ratio of the sulfuric acid and the hydrogen peroxide water (ratio of the flow rate of the sulfuric acid with respect to the flow rate of the hydrogen peroxide water) is, for example, not less than 2. When the sulfuric acid and the hydrogen peroxide water are mixed together, SPM of high temperature is formed due to heat of dilution of the sulfuric acid. The temperature of the SPM discharged from the first chemical liquid nozzle 31 is, for example, higher than 100° C. The temperature of the sulfuric acid before being mixed with the hydrogen peroxide water is, for example, higher than 100° C. The substrate processing apparatus 1 is equipped with a heater **34*h* that heats the sulfuric acid supplied to the first chemical liquid nozzle 31**. The temperature of the hydrogen peroxide water before being mixed with the sulfuric acid is, for example, room temperature (for example, 20 to 30° C.). The temperature of the hydrogen peroxide water before being mixed with the sulfuric acid may instead be higher than room temperature.

The second chemical liquid nozzle 32 is connected to a second chemical liquid piping **36*p* that guides DHF toward the second chemical liquid nozzle 32. The first rinse liquid nozzle 33 is connected to a first rinse liquid piping 37*p* that guides pure water toward the first rinse liquid nozzle 33. When a second chemical liquid valve 36*v* that is interposed in the second chemical liquid piping 36*p* is opened, the DHF is supplied from the second chemical liquid piping 36*p* to the second chemical liquid nozzle 32 and is discharged continuously downward from the second chemical liquid nozzle 32. When a first rinse liquid valve 37*v* that is interposed in the first rinse liquid piping 37_p_ is opened, the pure water is supplied from the first rinse liquid piping 37_p_ to the first rinse liquid nozzle 33 and is discharged continuously downward from the first rinse liquid nozzle 33. A temperature of the pure water discharged from the first rinse liquid nozzle 33** may be room temperature or may be higher than room temperature.

The first nozzle moving unit 38 moves the three nozzles, that is, the first chemical liquid nozzle 31, the second chemical liquid nozzle 32, and the first rinse liquid nozzle 33 horizontally between a processing position at which the processing liquids discharged from the three nozzles are supplied to the upper surface of the substrate W and a standby position at which the three nozzles are positioned at a periphery of the spin chuck 21 in plan view. The three nozzles are supported by the first nozzle moving unit 38 in a state of being aligned horizontally in the order of the first chemical liquid nozzle 31, the first rinse liquid nozzle 33, and the second chemical liquid nozzle 32. As shown in FIG. 4, when the first nozzle moving unit 38 moves the three nozzles to the standby position, the first chemical liquid nozzle 31 is disposed at the substrate W side with respect to the second chemical liquid nozzle 32 and the first rinse liquid nozzle 33 in plan view.

The processing unit 2 includes a spray shield 101 that receives spray droplets of the chemical liquid that are generated when the first chemical liquid nozzle 31 discharges the chemical liquid toward the upper surface of the substrate W and a standby pod 111 that houses the first chemical liquid nozzle 31 and the spray shield 101. The spray shield 101 is disposed at a periphery of the first chemical liquid nozzle 31 and moves together with the first chemical liquid nozzle 31. The standby pod 111 is disposed at a position that overlaps with the first chemical liquid nozzle 31 and the spray shield 101 in plan view when the first chemical liquid nozzle 31 is disposed at the standby position. Details of the spray shield 101 and the standby pod 111 shall be described below.

The third chemical liquid nozzle 39 is connected to a third chemical liquid piping 40_p_ that guides SC1 toward the third chemical liquid nozzle 39. When a third chemical liquid valve 40_v_ that is interposed in the third chemical liquid piping 40_p_ is opened, the SC1 is supplied from the third chemical liquid piping 40_p_ to the third chemical liquid nozzle 39 and is discharged continuously downward from the third chemical liquid nozzle 39. The second nozzle moving unit 41 moves the third chemical liquid nozzle 39 horizontally between a processing position at which the processing liquid discharged from the third chemical liquid nozzle 39 is supplied to the upper surface of the substrate W and a standby position at which the third chemical liquid nozzle 39 is positioned at a periphery of the spin chuck 21 in plan view.

The solvent nozzle 42 is connected to a solvent piping 43_p_ that guides IPA toward the solvent nozzle 42. When a solvent valve 43_v_ that is interposed in the solvent piping 43_p_ is opened, the IPA is supplied from the solvent piping 43_p_ to the solvent nozzle 42 and is discharged continuously downward from the solvent nozzle 42. The third nozzle moving unit 44 moves the solvent nozzle 42 horizontally between a processing position at which the processing liquid discharged from the solvent nozzle 42 is supplied to the upper surface of the substrate W and a standby position at which the solvent nozzle 42 is positioned at a periphery of the spin chuck 21 in plan view.

The second rinse liquid nozzle 45 is connected to a second rinse liquid piping 46_p_ that guides pure water toward the second rinse liquid nozzle 45. When a second rinse liquid valve 46_v_ that is interposed in the second rinse liquid piping 46_p_ is opened, the pure water is supplied from the second rinse liquid piping 46_p_ to the second rinse liquid nozzle 45 and is discharged continuously downward from the second rinse liquid nozzle 45. The second rinse liquid nozzle 45 that is a fixed nozzle is fixed with respect to the partition wall 13 of the chamber 12. The second rinse liquid nozzle 45 discharges the pure water toward a central portion of the upper surface of the substrate W.

The processing unit 2 includes a processing cup 52 of cylindrical shape that surrounds a circumference of the spin chuck 21 inside the chamber 12 and receives the processing liquid that is scattered outward from the substrate W. The processing cup 52 includes a plurality of guards 53 that receive the processing liquid that is scattered outward from the substrate W and a plurality of cups 68 that receives the processing liquid that is guided downward by the plurality of guards 53. FIG. 3 shows an example where two guards 53 and two cups 68 are provided and the cup 68 at an outermost side is integral to the second guard 53 from an outer side.

The two guards 53 surround the spin chuck 21 concentrically. The two cups 68 also surround the spin chuck 21 concentrically. In the following, the guard 53 at an outermost side shall be referred to as the first guard 53A and the remaining guard 53 shall be referred to as the second guard 53B. Similarly, the cup 68 at the outermost side shall be referred to as the first cup 68A and the remaining cup 68 shall be referred to as the second cup 68B. The first guard 53A and the second guard 53B may be referred to collectively at times as the guards 53 and the first cup 68A and the second cup 68B may be referred to collectively at times as the cups 68.

Each guard 53 includes a circular cylindrical portion 54 that surrounds the circumference of the spin chuck 21 and a ceiling portion 60 of circular cylindrical shape that extends obliquely upward from the circular cylindrical portion 54 toward the rotation axis A1. The ceiling portion 60 includes an inclining portion 61 of circular cylindrical shape extending obliquely upward toward the rotation axis A1, a horizontal portion 62 (see FIG. 17) of circular shape extending horizontally from an upper end of the inclining portion 61 toward the rotation axis A1, and a folded-back portion 63 (see FIG. 17) of circular shape projecting downward from an inner circumferential end of the horizontal portion 62 that corresponds to being an inner circumferential end of the ceiling portion 60. The circular cylindrical portion 54 of the first guard 53A and the circular cylindrical portion 54 of the second guard 53B surround the spin chuck 21 concentrically. The ceiling portion 60 of the first guard 53A is disposed above the ceiling portion 60 of the second guard 53B and overlaps with the ceiling portion 60 of the second guard 53B in plan view.

An inner circumferential portion of the ceiling portion 60 of the first guard 53A corresponds to being an upper end portion 53_u_ of the first guard 53A. An inner circumferential portion of the ceiling portion 60 of the second guard 53B corresponds to being an upper end portion of the second guard 53B. The upper end portion 53_u_ of the first guard 53A and the upper end portion of the second guard 53B form an opening of circular shape that surrounds the substrate W and the spin base 23 in plan view. An inner diameter of the upper end portion 53_u_ of the first guard 53A is smaller than an inner diameter of the upper end portion of the second guard 53B. The inner diameter of the upper end portion 53_u_ of the first guard 53A may instead be equal to the inner diameter of the upper end portion of the second guard 53B. The inner diameter of the upper end portion 53*u* of the first guard 53A and the inner diameter of the upper end portion of the second guard 53B are greater than an outer diameter of the spin base 23.

Each cup 68 includes an inner wall portion of circular cylindrical shape that surrounds the spin chuck 21, an outer wall portion of circular cylindrical shape that surrounds the inner wall portion across an interval in a radial direction, and a bottom wall portion of circular annular shape that extends from a lower end portion of the inner wall portion to a lower end portion of the outer wall portion. The inner wall portion, the outer wall portion, and the bottom wall portion form a liquid receiving trough of circular annular shape that is opened upward. The processing liquid that is received by the guard 53 flows down into the liquid receiving trough. A drain port that releases the processing liquid inside the cup 68 opens at an upper surface of the bottom wall portion.

A lower end of an inner circumferential surface of the first guard 53A is disposed directly above the bottom wall portion of the first cup 68A. A lower end of an inner circumferential surface of the second guard 53B is disposed directly above the bottom wall portion of the second cup 68B. The processing liquid received by the inner circumferential surface of the first guard 53A flows downward along the inner circumferential surface of the first guard 53A and drops into the first cup 68A. The processing liquid received by the inner circumferential surface of the second guard 53B flows downward along the inner circumferential surface of the second guard 53B and drops into the second cup 68B.

The first guard 53A and the second guard 53B are movable up and down with respect to the partition wall 13 of the chamber 12. The first cup 68A is integral to the second guard 53B and moves up and down together with the second guard 53B. The first cup 68A may instead be a member separate from the second guard 53B and be fixed to the partition wall 13. The second cup 68B is fixed to the partition wall 13. The bottom wall portion of the second cup 68B is separated upward from a floor surface of the chamber 12 (the floor surface of the partition wall 13; the same applies hereinafter). The bottom wall portion of the first cup 68A is also separated upward from the floor surface of the chamber 12.

As shown in FIG. 3, the plurality of guards 53 are connected to a guard elevating/lowering unit 51 that elevates and lowers the plurality of guards 53 individually in the vertical direction. The guard elevating/lowering unit 51 positions each guard 53 at any position within a range from an upper position to a lower position. FIG. 3 shows a state where the first guard 53A and the second guard 53B are disposed at the lower positions. The upper positions are positions at which upper ends of the guards 53 are disposed higher than a holding position of the substrate W by the spin chuck 21. The lower positions are positions at which the upper ends of the guards 53 are disposed lower than the holding position of the substrate W by the spin chuck 21. The holding position of the substrate W by the spin chuck 21 is the position at which the substrate W held by the spin chuck 21 is disposed.

When a processing liquid is supplied to the substrate W that is rotating, the controller 3 controls the guard elevating/lowering unit 51 to position at least one of the guards 53 at the upper position. When the processing liquid is supplied to the substrate W in this state, the processing liquid is spun off outward from the substrate W. The spun-off processing liquid collides with the inner circumferential surface of the guard 53 that opposes the substrate W horizontally and is guided into the cup 68 corresponding to the guard 53. The processing liquid expelled from the substrate W is thereby collected in the cup 68.

In addition to the plurality of guards 53 and the plurality of cups 68, the processing cup 52 includes a cylindrical outer wall 70 that surrounds all guard 53 and all cups 68. The cylindrical outer wall 70 surrounds the first guard 53A, which, among all guards 53, is positioned at the outermost side, across an interval in a radial direction. The cylindrical outer wall 70 extends upward from the floor surface of the chamber 12. An upper end of the cylindrical outer wall 70 is disposed higher than the electric motor 25 of the spin chuck 21. The upper end of the cylindrical outer wall 70 is disposed lower than the substrate W.

The processing unit 2 includes a partitioning plate 80 by which a space around the first guard 53A inside the chamber 12 is partitioned above and below. The partitioning plate 80 surrounds the first guard 53A. The partitioning plate 80 is disposed above the cylindrical outer wall 70. The partitioning plate 80 is placed on the cylindrical outer wall 70 and is supported by the cylindrical outer wall 70. The partitioning plate 80 is disposed lower than the substrate W. An outer circumferential end of the partitioning plate 80 is separated horizontally from an inner circumferential surface of the chamber 12 and opposes the inner circumferential surface of the chamber 12 horizontally.

The exhaust duct 78 is inserted in an exhaust hole 72 that penetrates through the cylindrical outer wall 70 in the radial direction. The upstream end 78*u* of the exhaust duct 78 is disposed at an inner side of the cylindrical outer wall 70. The upstream end 78*u* of the exhaust duct 78 is disposed lower than the substrate W. The upstream end 78*u* of the exhaust duct 78 is disposed lower than the partitioning plate 80. The exhaust duct 78 is connected to an exhaust equipment provided in a plant in which the substrate processing apparatus 1 is installed. The upstream end 78*u* of the exhaust duct 78 forms an exhaust port that suctions gas inside the chamber 12.

Gas in a space higher than the processing cup 52 inside the chamber 12 is sucked into the inner side of the cylindrical outer wall 70 by a suction force transmitted via the exhaust duct 78. Gas that flows through a gap between the outer circumferential end of the partitioning plate 80 and the inner circumferential surface of the chamber 12 and reaches a space around the cylindrical outer wall 70 is sucked into the inner side of the cylindrical outer wall 70 via an exhaust relay hole 73 that penetrates through the cylindrical outer wall 70 in the radial direction. Gas at the inner side of the cylindrical outer wall 70 is sucked into the exhaust duct 78. The gas inside the chamber 12 is thereby released via the exhaust duct 78.

Next, an electrical arrangement of the substrate processing apparatus 1 will be described.

Figure 5:
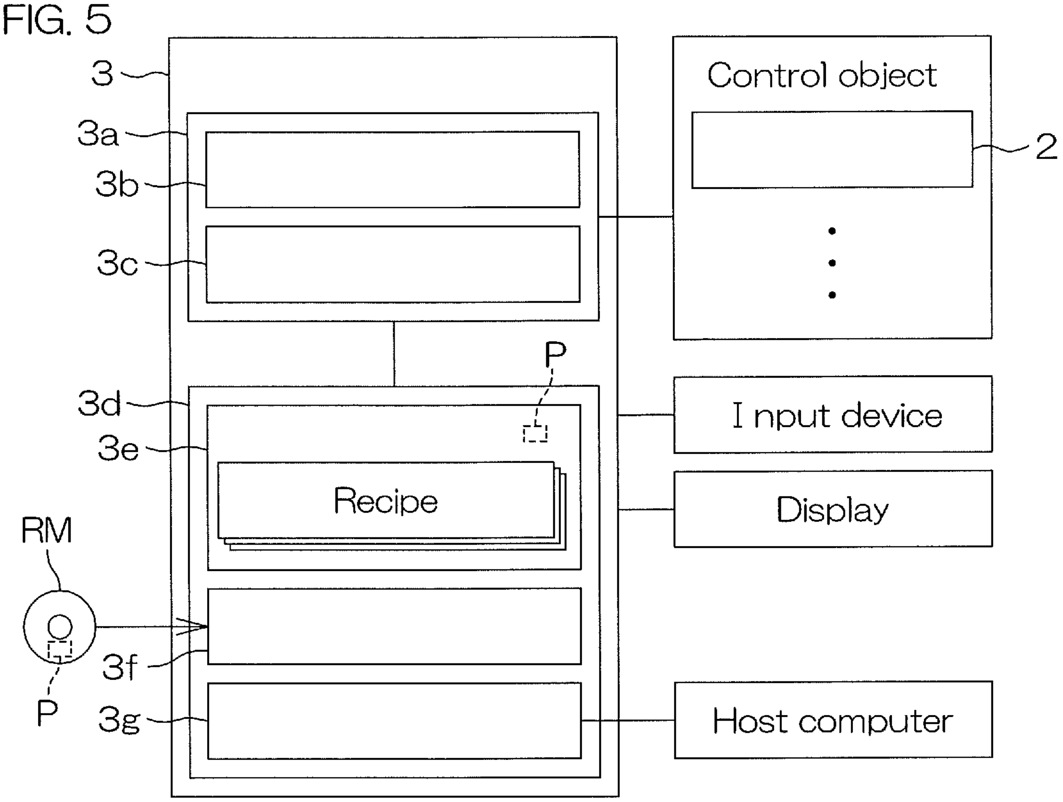
FIG. 5 is a block diagram showing an electrical arrangement of the substrate processing apparatus.

FIG. 5 is a block diagram showing the electrical arrangement of the substrate processing apparatus 1.

The controller 3 is a computer that includes a computer main body 3*a* and a peripheral device 3*d* that is connected to the computer main body 3*a*. The computer main body 3*a* includes a CPU 3*b* (central processing unit) that executes various types of commands and a memory 3*c* that stores information. The peripheral device 3*d* includes a storage 3*e* that stores information such as a program P, a reader 3*f* that reads information from a removable medium RM and a communication device 3*g* that communicates with other devices such as a host computer.

The controller 3 is connected to an input device and a display. The input device is operated when an operator such as a user or a maintenance operator inputs information to the substrate processing apparatus 1. The information is displayed on the screen of the display. The input device may be any one of a keyboard, a pointing device and a touch panel or may be a device other than those. A touch panel display that serves both as the input device and the display may be provided in the substrate processing apparatus 1.

The CPU 3*b* executes the program P stored in the storage 3*e*. The program P within the storage 3*e* may be previously installed in the controller 3, may be fed through the reader 3*f* from the removable medium RM to the storage 3*e* or may be fed from an external device such as the host computer to the storage 3*e* through the communication device 3*g*.

The storage 3*e* and the removable medium RM are nonvolatile memories that retain memory even without power being supplied. The storage 3*e* is, for example, a magnetic storage device such as a hard disk drive. The removable medium RM is, for example, an optical disc such as a compact disc or a semiconductor memory such as a memory card. The removable medium RM is an example of a computer readable recording medium in which the program P is recorded. The removable medium RM is a non-transitory tangible recording medium.

The storage 3*e* stores a plurality of recipes. The recipe is information that specifies the details of processing, processing conditions and processing procedures of the substrate W. A plurality of recipes differ from each other in at least one of the details of processing, the processing conditions and the processing procedures of the substrate W. The controller 3 controls the substrate processing apparatus 1 such that the substrate W is processed according to the recipe designated by the host computer. The controller 3 is programmed to execute the individual steps described below.

For example, the controller 3 supplies the processing liquids SPM, pure water, SC1, and pure water in that order to the upper surface of the substrate W that is rotating and thereafter dries the substrate W by high speed rotation of the substrate W. The types and order of the processing liquids supplied to the substrate W is not restricted to the above. For example, the controller 3 may supply the processing liquids SPM, warm water (pure water of higher temperature than room temperature), and pure water (pure water of room temperature) in that order to the upper surface of the substrate W. Or, the controller 3 may supply the processing liquids SPM, pure water, DHF, pure water, SC1, and pure water in that order to the upper surface of the substrate W or may supply the processing liquids DHF, pure water, SPM, pure water, SC1, and pure water in that order to the upper surface of the substrate W.

In the above-described example, the controller 3 may replace the pure water on the substrate W with an organic solvent such as IPA, etc., and thereafter dry the substrate W with the organic solvent adhered thereto by high speed rotation of the substrate W. In the above-described example, in order to shorten a time for peeling a resist by the SPM or to remove a residue of the resist by ozone water, the controller 3 may supply the ozone water to the substrate W before supplying the SPM or may supply the ozone water to the substrate W after supplying the SPM. In the former case, the SPM is supplied to the upper surface of the substrate W that is covered by a liquid film of the ozone water and in the latter case, the ozone water is supplied to the upper surface of the substrate W that is covered by a liquid film of the SPM.

Next, an example of substrate W processing will be described.

Figure 6:
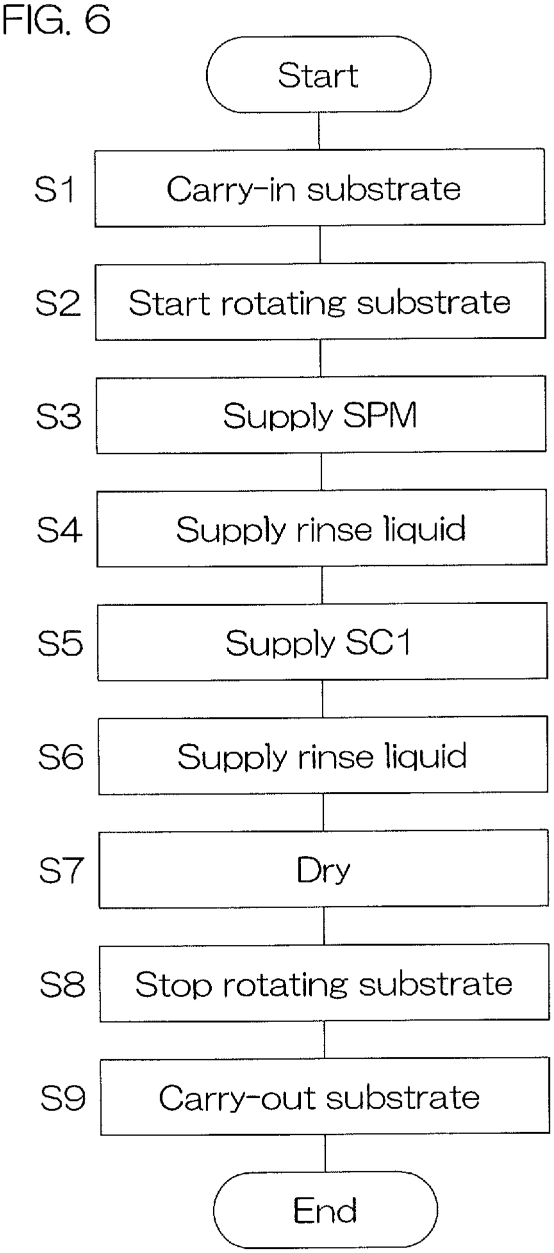
FIG. 6 is a process chart for describing an example of substrate processing performed by the substrate processing apparatus.

FIG. 6 is a process chart for describing an example of substrate W processing performed by the substrate processing apparatus 1. FIG. 6 shows an example where SPM, SC1, and pure water are supplied to the substrate W in the order of SPM, pure water, SC1, and pure water. In the following, reference is made to FIGS. 3, 4 and 6.

The substrate W that is processed is, for example, a semiconductor wafer such as a silicon wafer, etc. A front surface of the substrate W corresponds to being a device forming surface on which a device such as a transistor or a capacitor, etc., is formed. In the following, an example of resist removal of removing a mask of resist that has become unnecessary from the substrate W by supplying the SPM that is one example of a resist removing liquid and a resist peeling liquid to the upper surface of the substrate W shall be described. The processing of the substrate W may instead be that other than resist removal.

When the substrate W is to be processed by the substrate processing apparatus 1, a carry-in step of carrying the substrate W into the chamber 12 is performed (step S1 of FIG. 6).

Specifically, in a state where all of the guards 53 are positioned at the lower positions and all of the scan nozzles are positioned at the standby positions, the center robot CR (see FIG. 1) makes the hand Hc enter inside the chamber 12 while supporting the substrate W with the hand Hc. Thereafter, the center robot CR places the substrate W, on the hand Hc, on the plurality of chuck pins 22 in a state where the front surface of the substrate W is faced upward. Thereafter, the center robot CR makes the hand Hc retreat from inside the chamber 12.

When the substrate W is placed on the spin chuck 21, the plurality of chuck pins 22 are pressed against an outer circumferential surface of the substrate W and the substrate W is gripped. Thereafter, the electric motor 25 of the spin chuck 21 is driven to start rotation of the substrate W (step S2 of FIG. 6). Before or after the rotation of the substrate W is started, the guard elevating/lowering unit 51 elevates at least one of the guards 53 from the lower position to the upper position.

Next, a first chemical liquid supplying step of supplying the SPM that is an example of a chemical liquid to the upper surface of the substrate W is performed (step S3 of FIG. 6).

Specifically, in a state where at least one of the guards 53 is positioned at the upper position and the electric motor 25 is rotating the substrate W at a first chemical liquid supplying speed, the first nozzle moving unit 38 moves the first chemical liquid nozzle 31, the second chemical liquid nozzle 32, and the first rinse liquid nozzle 33 from the standby positions to the processing positions. Thereafter, the sulfuric acid valve 34*v* and the hydrogen peroxide water valve 35*v* are opened and the first chemical liquid nozzle 31 starts discharge of the SPM. When a predetermined time elapses from when the sulfuric acid valve 34*v* and the hydrogen peroxide water valve 35*v* were opened, the sulfuric acid valve 34*v* and the hydrogen peroxide water valve 35*v* are closed and the discharge of the SPM is stopped. After the discharge of the SPM is stopped, the first nozzle moving unit 38 positions the first chemical liquid nozzle 31, the second chemical liquid nozzle 32, and the first rinse liquid nozzle 33 at the processing positions without movement to the standby positions.

The SPM that is discharged from the first chemical liquid nozzle 31 collides with the upper surface of the substrate W that is rotating at the first chemical liquid supplying speed and thereafter flows outward along the upper surface of the substrate W due to a centrifugal force. Therefore, the SPM is supplied to the entire upper surface of the substrate W and a liquid film of the SPM that covers the entire upper surface of the substrate W is formed. While the first chemical liquid nozzle 31 is discharging the SPM, the first nozzle moving unit 38 may move a collision position of the SPM with respect to the upper surface of the substrate W such that the collision position passes a central portion and an outer circumferential portion or may keep the collision position still at the central portion.

Next, a first rinse liquid supplying step of supplying the pure water that is an example of a rinse liquid to the upper surface of the substrate W is performed (step S4 of FIG. 6).

Specifically, in a state where the first chemical liquid nozzle 31, the second chemical liquid nozzle 32, and the first rinse liquid nozzle 33 are positioned at the processing positions, at least one of the guards 53 is positioned at the upper position, and the electric motor 25 is rotating the substrate W at a first rinse liquid supplying speed, the first rinse liquid valve 37*v* is opened and the first rinse liquid nozzle 33 starts discharge of the pure water. Before the discharge of the pure water is started, the guard elevating/lowering unit 51 may move at least one of the guards 53 vertically to switch the guard 53 that receives the liquid that is scattered outward from the substrate W.

The pure water that is discharged from the first rinse liquid nozzle 33 collides with the upper surface of the substrate W that is rotating at the first rinse liquid supplying speed and thereafter flows outward along the upper surface of the substrate W. The SPM on the substrate W is rinsed off by the pure water discharged from the first rinse liquid nozzle 33. A liquid film of the pure water that covers the entire upper surface of the substrate W is thereby formed. While the first rinse liquid nozzle 33 is discharging the pure water, the first nozzle moving unit 38 may move a collision position of the pure water with respect to the upper surface of the substrate W such that the collision position passes the central portion and the outer circumferential portion or may keep the collision position still at the central portion. When a predetermined time elapses from when the first rinse liquid valve 37*v* was opened, the first rinse liquid valve 37*v* is closed and the discharge of the pure water is stopped. Thereafter, the first nozzle moving unit 38 moves the first chemical liquid nozzle 31, the second chemical liquid nozzle 32, and the first rinse liquid nozzle 33 to the standby positions.

Next, a second chemical liquid supplying step of supplying the SC1 that is an example of a chemical liquid to the upper surface of the substrate W is performed (step S5 of FIG. 6).

Specifically, in a state where at least one of the guards 53 is positioned at the upper position and the electric motor 25 is rotating the substrate W at a second chemical liquid supplying speed, the second nozzle moving unit 41 moves the third chemical liquid nozzle 39 from the standby position to the processing position. Thereafter, the third chemical liquid valve 40*v* is opened and the third chemical liquid nozzle 39 starts discharge of the SC1. Before the discharge of the SC1 is started, the guard elevating/lowering unit 51 may move at least one of the guards 53 vertically to switch the guard 53 that receives the liquid that is scattered outward from the substrate W.

The SC1 that is discharged from the third chemical liquid nozzle 39 collides with the upper surface of the substrate W that is rotating at the second chemical liquid supplying speed and thereafter flows outward along the upper surface of the substrate W. The pure water on the substrate W is replaced by the SC1 discharged from the third chemical liquid nozzle 39. A liquid film of the SC1 that covers the entire upper surface of the substrate W is thereby formed. While the third chemical liquid nozzle 39 is discharging the SC1, the second nozzle moving unit 41 may move a collision position of the SC1 with respect to the upper surface of the substrate W such that the collision position passes the central portion and the outer circumferential portion or may keep the collision position still at the central portion. When a predetermined time elapses from when the third chemical liquid valve 40*v* was opened, the third chemical liquid valve 40*v* is closed and the discharge of the SC1 is stopped. Thereafter, the second nozzle moving unit 41 moves the third chemical liquid nozzle 39 to the standby position.

Next, a second rinse liquid supplying step of supplying the pure water that is an example of a rinse liquid to the upper surface of the substrate W is performed (step S6 of FIG. 6).

Specifically, in a state where at least one of the guards 53 is positioned at the upper position and the electric motor 25 is rotating the substrate W at a second rinse liquid supplying speed, the second rinse liquid valve 46*v* is opened and the second rinse liquid nozzle 45 starts discharge of the pure water. Before the discharge of the pure water is started, the guard elevating/lowering unit 51 may move at least one of the guards 53 vertically to switch the guard 53 that receives the liquid that is scattered outward from the substrate W.

The second rinse liquid nozzle 45 is a fixed nozzle that discharges the rinse liquid toward the central portion of the upper surface of the substrate W. The pure water that is discharged from the second rinse liquid nozzle 45 collides with the upper surface of the substrate W that is rotating at the second rinse liquid supplying speed and thereafter flows outward along the upper surface of the substrate W. The SC1 on the substrate W is rinsed off by the pure water discharged from the second rinse liquid nozzle 45. A liquid film of the pure water that covers the entire upper surface of the substrate W is thereby formed. When a predetermined time elapses from when the second rinse liquid valve 46*v* was opened, the second rinse liquid valve 46*v* is closed and the discharge of the pure water is stopped.

Next, a drying step of drying the substrate W by rotation of the substrate W is performed (step S7 of FIG. 6).

Specifically, in a state where at least one of the guards 53 is positioned at the upper position, the electric motor 25 accelerates the substrate W in a rotation direction and rotates the substrate W at a high rotational speed (of, for example, several thousand rpm) that is greater than the rotational speed of the substrate W in a period from the first chemical liquid supplying step to the second rinse liquid supplying step. Liquid is thereby removed from the substrate W and the substrate W is dried. Before the high speed rotation of the substrate W is started, the guard elevating/lowering unit 51 may move at least one of the guards 53 vertically to switch the guard 53 that receives the liquid that is scattered outward from the substrate W. When a predetermined time elapses from when the high speed rotation of the substrate W was started, the electric motor 25 stops rotating. The rotation of the substrate W is thereby stopped (step S8 of FIG. 6).

Next, a carry-out step of carrying out the substrate W from the chamber 12 is performed (step S9 of FIG. 6).

Specifically, in a state where all of the guards 53 are positioned at the lower positions and all of the scan nozzles are positioned at the standby positions, the center robot CR makes the hand Hc enter inside the chamber 12. After the plurality of chuck pins 22 release the gripping of the substrate W, the center robot CR supports the substrate W on the spin chuck 21 with the hand Hc. Thereafter, the center robot CR makes the hand Hc retreat from inside the chamber 12 while supporting the substrate W with the hand Hc. The processed substrate W is thereby carried out from the chamber 12.

Next, the three nozzles, that is, the first chemical liquid nozzle 31, the second chemical liquid nozzle 32, and the first rinse liquid nozzle 33 shall be described.

In the following, directions in which the first chemical liquid nozzle 31 moves horizontally shall be defined respectively as a right direction and a left direction of the first chemical liquid nozzle 31, a direction horizontally away from the first nozzle moving unit 38 that is orthogonal to the right direction and the left direction of the first chemical liquid nozzle 31 shall be defined as a front direction of the first chemical liquid nozzle 31, and a direction opposite the front direction of the first chemical liquid nozzle 31 shall be defined as a rear direction of the first chemical liquid nozzle 31, respectively. A down direction of the first chemical liquid nozzle 31 is the same as the direction in which gravity acts.

Figures 7A, 7B, 7C:
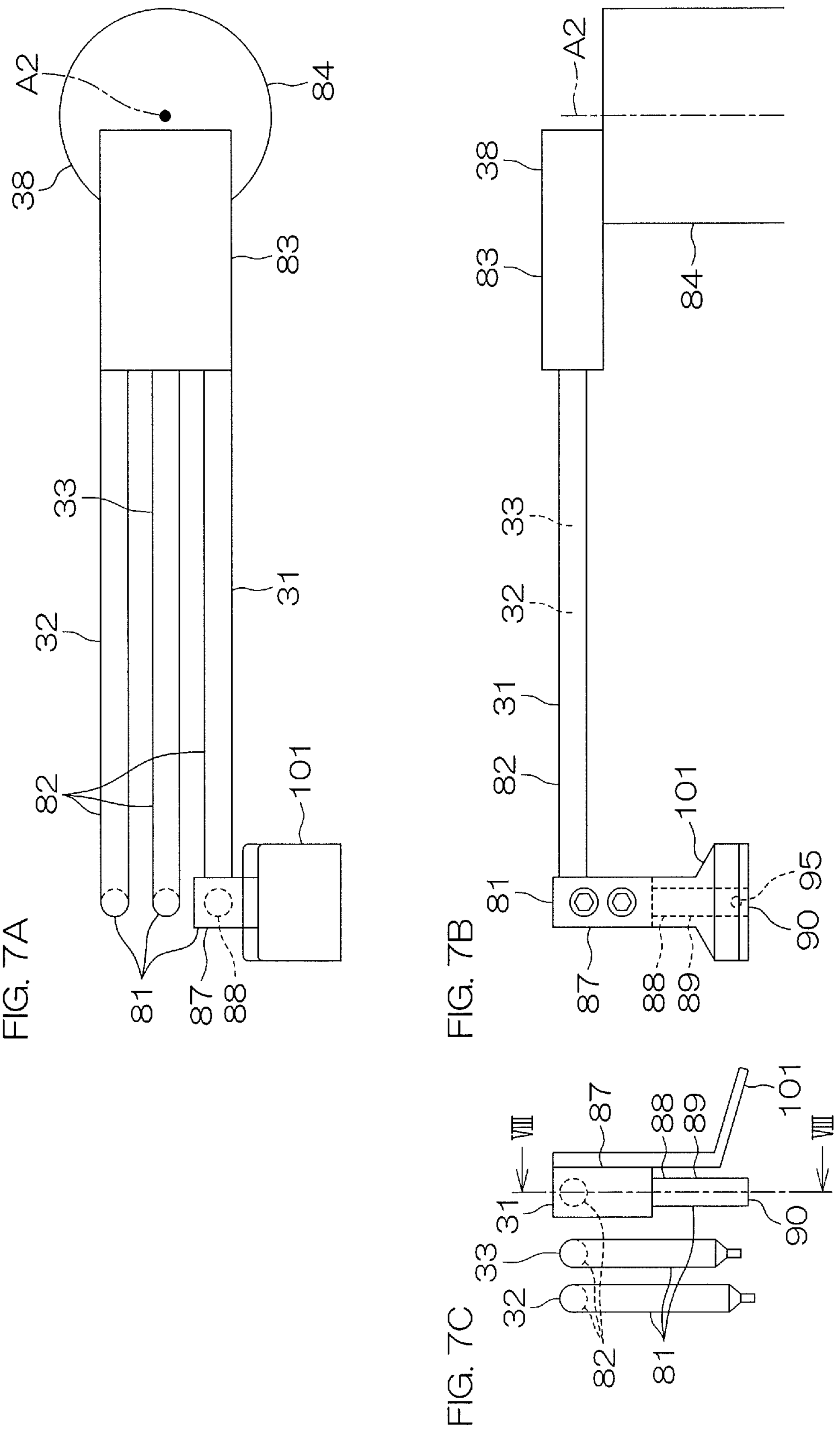
FIGS. 7A to 7C are schematic views showing a first chemical liquid nozzle, a second chemical liquid nozzle, and a first rinse liquid nozzle.
Figure 8:
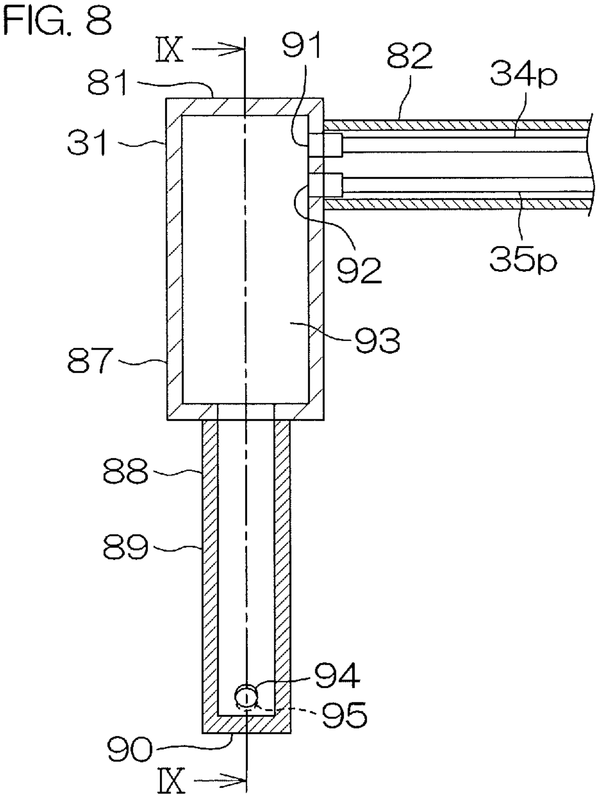
FIG. 8 is a schematic cross-sectional view showing a vertical cross-section of the first chemical liquid nozzle taken along line VIII-VIII shown in FIG. 7C.
Figure 9:
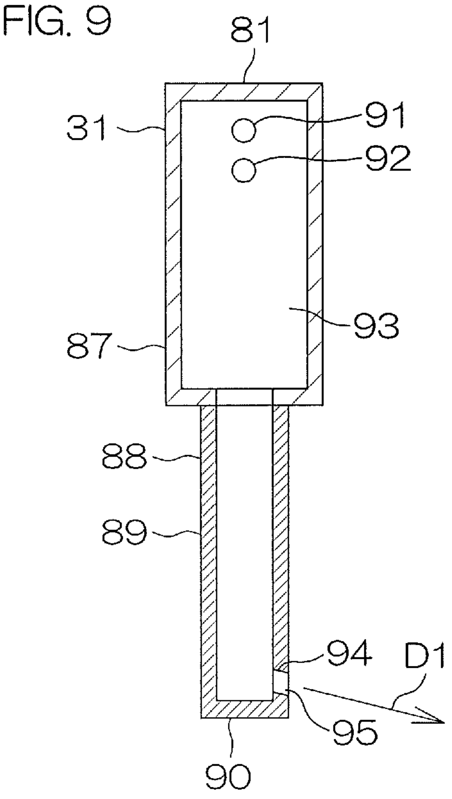
FIG. 9 is a schematic cross-sectional view showing a vertical cross-section of the first chemical liquid nozzle taken along line IX-IX shown in FIG. 8.

FIG. 7A is a schematic plan view of the three nozzles. FIG. 7B is a schematic left side view of the three nozzles. FIG. 7C is a schematic front view of the three nozzles. FIG. 8 is a schematic cross-sectional view showing a vertical cross-section of the first chemical liquid nozzle 31 taken along line VIII-VIII shown in FIG. 7C. FIG. 9 is a schematic cross-sectional view showing a vertical cross-section of the first chemical liquid nozzle 31 taken along line IX-IX shown in FIG. 8.

As shown in FIG. 7A, FIG. 7B, and FIG. 7C, the three nozzles are all of L shape. Each of the three nozzles includes a nozzle portion 81 provided with a discharge port that discharges a processing liquid such as a chemical liquid, pure water, etc., and an arm portion 82 that supports the nozzle portion 81. A length of the first chemical liquid nozzle 31 in a front/rear direction of the first chemical liquid nozzle 31 is greater than a length of the first chemical liquid nozzle 31 in an up/down direction of the first chemical liquid nozzle 31. The same applies to the second chemical liquid nozzle 32 and the first rinse liquid nozzle 33.

As shown in FIG. 7B, the first nozzle moving unit 38 includes a common arm 83 that supports each of the three nozzles and a driving body 84 that moves the common arm 83 to move the three nozzles integrally. The common arm 83 projects horizontally from the driving body 84. The three nozzles project horizontally from the common arm 83. The driving body 84 is disposed at an outer side of the processing cup 52 (see FIG. 4). The driving body 84 extends up and down along a vertical rotation axis A2. The driving body 84 rotates around the rotation axis A2 to move the common arm 83 horizontally and extends and contracts up and down to move the common arm 83 vertically.

The arm portion 82 extends horizontally from the common arm 83 to the corresponding nozzle portion 81. The nozzle portion 81 extends downward from a front end of the corresponding arm portion 82. For example, the arm portion 82 of the first chemical liquid nozzle 31 extends horizontally from the common arm 83 to the nozzle portion 81 of the first chemical liquid nozzle 31 and the nozzle portion 81 of the first chemical liquid nozzle 31 extends downward from the front end of the arm portion 82 of the first chemical liquid nozzle 31. The arm portion 82 may be bent obliquely or perpendicularly in an up direction or the down direction. The arm portion 82 may be bent obliquely or perpendicularly in the right direction or left direction.

As shown in FIG. 7A, center lines of the three arm portions 82 are separated horizontally and are parallel to each other when viewed vertically. The arm portion 82 of the first rinse liquid nozzle 33 is disposed between the arm portion 82 of the first chemical liquid nozzle 31 and the arm portion 82 of the second chemical liquid nozzle 32. As shown in FIG. 7C, center lines of the three nozzle portions 81 are separated horizontally and are parallel to each other when viewed horizontally. The nozzle portion 81 of the first rinse liquid nozzle 33 is disposed between the nozzle portion 81 of the first chemical liquid nozzle 31 and the nozzle portion 81 of the second chemical liquid nozzle 32.

Lower ends of the three nozzles are disposed lower than the common arm 83. FIG. 7C shows an example where the lower ends of the three nozzles are disposed at different heights. In this example, the lower end of the second chemical liquid nozzle 32 is disposed lower than the lower ends of the first chemical liquid nozzle 31 and the first rinse liquid nozzle 33 and the lower end of the first rinse liquid nozzle 33 is disposed higher than the lower ends of the first chemical liquid nozzle 31 and the second chemical liquid nozzle 32. The lower ends of the three nozzles may instead be disposed at an equal height or two of the lower ends of the three nozzles may be disposed at an equal height differing from that of the remaining lower end of the three nozzles.

As shown in FIG. 7C, the nozzle portion 81 of the first chemical liquid nozzle 31 includes an upstream portion 87 that extends downward from the arm portion 82 of the first chemical liquid nozzle 31 and a downstream portion 88 that extends downward from the upstream portion 87 and is thinner than the upstream portion 87. The nozzle portion 81 of the second chemical liquid nozzle 32 includes a large diameter portion that extends downward from the arm portion 82 of the second chemical liquid nozzle 32, a tapered portion that becomes thinner with separation downward from the large diameter portion, and a small diameter portion that extends downward from the tapered portion and is thinner than the large diameter portion. The nozzle portion 81 of the first rinse liquid nozzle 33 also includes a large diameter portion that extends downward from the arm portion 82 of the first rinse liquid nozzle 33, a tapered portion that becomes thinner with separation downward from the large diameter portion, and a small diameter portion that extends downward from the tapered portion and is thinner than the large diameter portion.

A chemical liquid discharge port 95 (see FIG. 9) of the first chemical liquid nozzle 31 opens at an outer circumferential surface 89 of the downstream portion 88 of the first chemical liquid nozzle 31. A discharge port of the second chemical liquid nozzle 32 opens at a lower surface of the small diameter portion of the second chemical liquid nozzle 32. A discharge port of the first rinse liquid nozzle 33 opens at a lower surface of the small diameter portion of the first rinse liquid nozzle 33. A lower surface 90 of the downstream portion 88 of the first chemical liquid nozzle 31 corresponds to being the lower surface 90 and the lower end of the first chemical liquid nozzle 31. A lower surface of the small diameter portion of the second chemical liquid nozzle 32 corresponds to being the lower surface and the lower end of the second chemical liquid nozzle 32. A lower surface of the small diameter portion of the first rinse liquid nozzle 33 corresponds to being the lower surface and the lower end of the first rinse liquid nozzle 33.

The downstream portion 88 of the first chemical liquid nozzle 31 is of a vertical columnar shape that extends downward from a lower surface of the upstream portion 87 of the first chemical liquid nozzle 31. The downstream portion 88 includes the lower surface 90 that is a flat surface parallel to the upper surface of the substrate W and the outer circumferential surface 89 of cylindrical shape that extends vertically from the lower surface 90 to the lower surface of the upstream portion 87. FIG. 7A shows an example where the downstream portion 88 is of circular columnar shape. In this example, the lower surface 90 of the downstream portion 88 is a horizontal flat surface of circular shape and the outer circumferential surface 89 of the downstream portion 88 is of a vertical, circular cylindrical shape.

As shown in FIG. 8 and FIG. 9, the first chemical liquid nozzle 31 includes a sulfuric acid inflow port 91 into which the sulfuric acid before being mixed with the hydrogen peroxide water flows, a hydrogen peroxide water inflow port 92 into which the hydrogen peroxide water before being mixed with the sulfuric acid flows, and an internal space 93 in which the sulfuric acid that flowed into the sulfuric acid inflow port 91 and the hydrogen peroxide water that flowed into the hydrogen peroxide water inflow port 92 are mixed together. The first chemical liquid nozzle 31 further includes the chemical liquid discharge port 95 that discharges the SPM formed in the internal space 93 and a front end flow passage 94 that guides the SPM from the internal space 93 to the chemical liquid discharge port 95.

The sulfuric acid inflow port 91, the hydrogen peroxide water inflow port 92, and the chemical liquid discharge port 95 open at outer surfaces of the first chemical liquid nozzle 31. In the example shown in FIG. 8 and FIG. 9, the sulfuric acid inflow port 91 and the hydrogen peroxide water inflow port 92 open at an outer surface of the upstream portion 87 and the chemical liquid discharge port 95 opens at an outer surface of the downstream portion 88. An internal space of the downstream portion 88 extends downward from an internal space of the upstream portion 87. The internal spaces of the upstream portion 87 and the downstream portion 88 correspond to being the internal space 93 of the first chemical liquid nozzle 31. An area of a cross section of the internal space of the downstream portion 88 along a horizontal plane is smaller than an area of a cross section of the internal space of the upstream portion 87 along a horizontal plane.

As shown in FIG. 8, the arm portion 82 of the first chemical liquid nozzle 31 is of a cylindrical shape that extends to the nozzle portion 81 of the first chemical liquid nozzle 31. The sulfuric acid piping 34*p* and the hydrogen peroxide water piping 35*p* are inserted inside the arm portion 82 of the first chemical liquid nozzle 31. A portion of the sulfuric acid piping 34*p* and a portion of the hydrogen peroxide water piping 35*p* are disposed inside the arm portion 82 of the first chemical liquid nozzle 31. The sulfuric acid piping 34*p* and the hydrogen peroxide water piping 35*p* are coupled to the nozzle portion 81 of the first chemical liquid nozzle 31. The sulfuric acid piping 34*p* does not have to be inserted inside the arm portion 82 of the first chemical liquid nozzle 31. The same applies to the hydrogen peroxide water piping 35*p*.

The sulfuric acid is supplied from the sulfuric acid piping 34*p* to the internal space of the upstream portion 87 through the sulfuric acid inflow port 91. The hydrogen peroxide water is supplied from the hydrogen peroxide water piping 35*p* to the internal space of the upstream portion 87 through the hydrogen peroxide water inflow port 92. The sulfuric acid and the hydrogen peroxide water are mixed together inside the upstream portion 87 and thereafter flow down into the downstream portion 88. The chemical liquid discharge port 95 discharges the SPM that corresponds to being the mixed liquid of the sulfuric acid and the hydrogen peroxide water that have been mixed together in the internal space 93 of the first chemical liquid nozzle 31.

The front end flow passage 94 guides the SPM from the internal space 93 of the first chemical liquid nozzle 31 to the chemical liquid discharge port 95. The front end flow passage 94 extends obliquely upward from the chemical liquid discharge port 95 to the internal space 93 of the first chemical liquid nozzle 31. The first chemical liquid nozzle 31 thus does not discharge the SPM directly below from the chemical liquid discharge port 95 but discharges the SPM from the chemical liquid discharge port 95 in a chemical liquid discharge direction D1 that is inclined with respect to a horizontal plane. An inclination angle of the chemical liquid discharge direction D1 with respect to the horizontal plane corresponds to being an inclination angle of a center line of the front end flow passage 94 with respect to the horizontal plane.

The chemical liquid discharge port 95 is an opening of circular shape or elliptical shape that opens at an outer surface of the first chemical liquid nozzle 31. The chemical liquid discharge port 95 opens not at the lower surface 90 of the downstream portion 88 but at the outer circumferential surface 89 of the downstream portion 88. The chemical liquid discharge port 95 is directed in the left direction of the first chemical liquid nozzle 31 (the right direction of FIG. 9 is the left direction of the first chemical liquid nozzle 31). The first chemical liquid nozzle 31 moves horizontally in the right/left direction of the first chemical liquid nozzle 31. Therefore, the chemical liquid discharge port 95 discharges the SPM in the chemical liquid discharge direction D1 that is parallel or substantially parallel in plan view to the direction in which the first chemical liquid nozzle 31 moves horizontally.

Next, the spray shield 101 shall be described.

In the following, a horizontal direction that is parallel in plan view to and is the same in orientation in plan view as the chemical liquid discharge direction D1 shall be defined as a rear direction of the spray shield 101, a direction opposite the rear direction of the spray shield 101 shall be defined as a front direction of the spray shield 101, and horizontal directions orthogonal to the chemical liquid discharge direction D1 in plan view shall be defined respectively as a right direction and a left direction of the spray shield 101, respectively. A down direction of the spray shield 101 is the same as the direction in which gravity acts. The front direction of the spray shield 101 is coincident with the right direction of the first chemical liquid nozzle 31 and the rear direction of the spray shield 101 is coincident with the left direction of the first chemical liquid nozzle 31.

Figure 10:
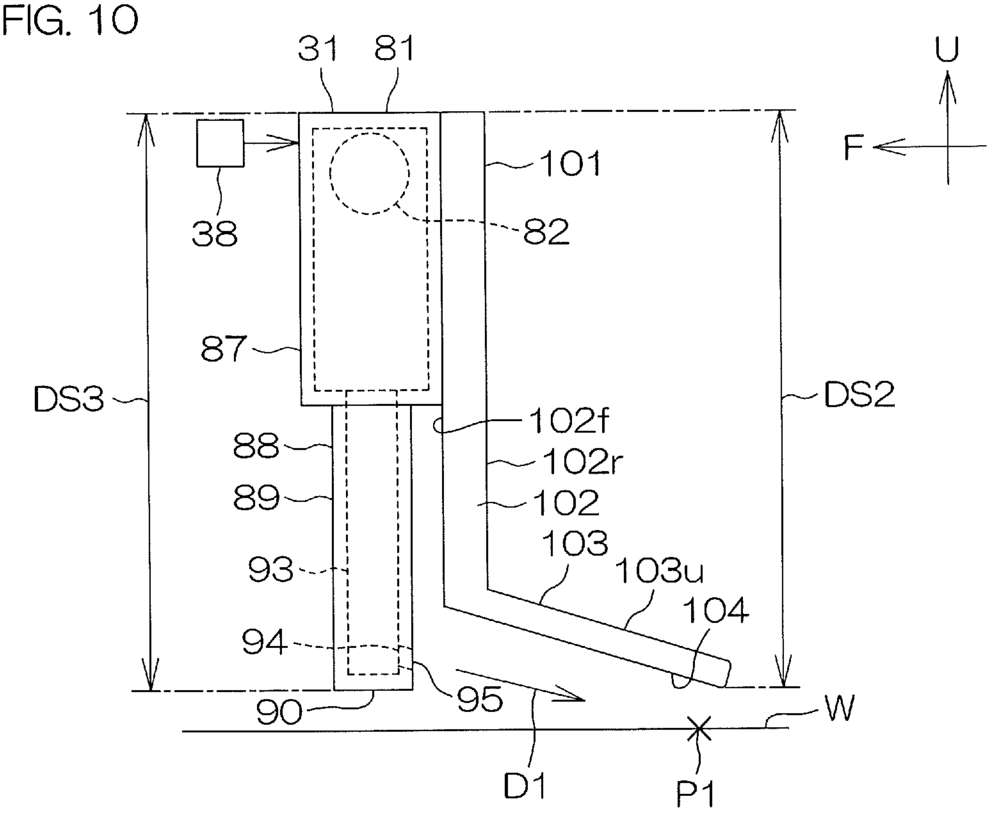
FIG. 10 is a schematic view of the first chemical liquid nozzle and a spray shield as viewed from a left side of the spray shield.
Figure 11:
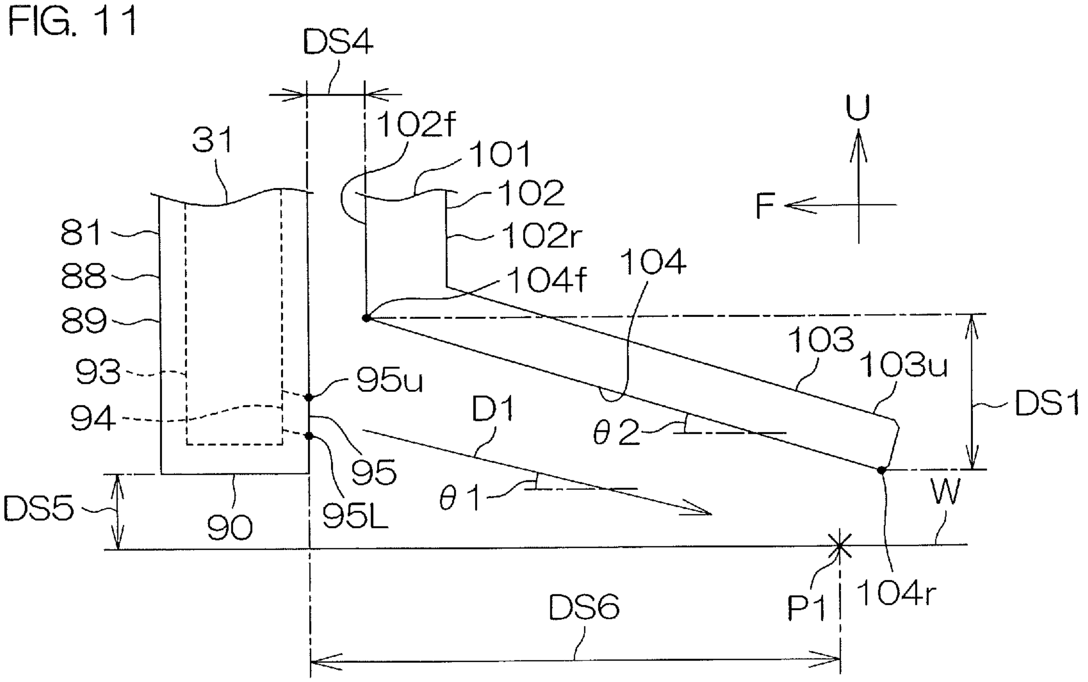
FIG. 11 is an enlarged view of a portion of FIG.

FIG. 10 is a schematic view of the first chemical liquid nozzle 31 and the spray shield 101 as viewed from a left side of the spray shield 101. FIG. 11 is an enlarged view of a portion of FIG. 10. FIG. 12 to FIG. 15 are schematic views of the first chemical liquid nozzle 31 and the spray shield 101 as viewed from a rear side, a front side, an upper side, and a lower side, respectively, of the spray shield 101.

In FIG. 10 to FIG. 15, an arrow U, an arrow F, an arrow R, and an arrow L indicate an up direction, the front direction, the right direction, and the left direction, respectively, of the spray shield 101. The same applies to other figures. Also, in FIG. 15, the chemical liquid discharge port 95 is indicated with thick lines. The same applies to FIG. 22 to FIG. 24 described below.

As shown in FIG. 10, the first chemical liquid nozzle 31 is a nozzle with the spray shield 101 that receives spray droplets of the chemical liquid that scatter upward from the substrate W. The spray shield 101 is a fender-like guard for liquid splash prevention that prevents dispersion of the spray droplets of the chemical liquid. The spray shield 101 is disposed at a side of the first chemical liquid nozzle 31. The spray shield 101 is of an L shape. The spray shield 101 includes a support arm 102 that extends up and down at the side of the first chemical liquid nozzle 31 and a shield plate 103 that extends laterally from a lower end of the support arm 102 and away from the first chemical liquid nozzle 31. The shield plate 103 is supported by the support arm 102.

The spray shield 101 is mounted to the first chemical liquid nozzle 31. The spray shield 101 moves together with the first chemical liquid nozzle 31. Even when the first chemical liquid nozzle 31 moves, the position of the spray shield 101 with respect to the first chemical liquid nozzle 31 does not change. In other words, the first chemical liquid nozzle 31 and the spray shield 101 move inside the chamber 12 in a state where the relative positions of the first chemical liquid nozzle 31 and the spray shield 101 are fixed. When the first chemical liquid nozzle 31 discharges the SPM toward the upper surface of the substrate W, the first chemical liquid nozzle 31 and the spray shield 101 are disposed above the substrate W. The spray shield 101 is smaller than the substrate W in plan view (see FIG. 16).

As shown in FIG. 10, when the first chemical liquid nozzle 31 discharges the SPM toward the upper surface of the substrate W, the lower surface 90 of the first chemical liquid nozzle 31 and a lower surface 104 of the shield plate 103 directly oppose the substrate W. The lower surface 104 of the shield plate 103 is a shield surface 104 that directly opposes the upper surface of the substrate W. In the following, the "lower surface 104 of the shield plate 103" may be referred to at times as the "shield surface 104" or as the "lower surface 104 of the spray shield 101."

All portions of the shield surface 104 of the spray shield 101 directly oppose the upper surface of the substrate W. The first chemical liquid nozzle 31 discharges the chemical liquid obliquely toward a target position P1 within the upper surface of the substrate W. The shield surface 104 is separated upward from the upper surface of the substrate W and overlaps in plan view with just a portion of the upper surface of the substrate W including the target position P1 (see FIG. 14). Spray droplets of the SPM that scatter upward from the target position P1 are received by the shield surface 104.

The spray shield 101 is disposed at a left side of the first chemical liquid nozzle 31 (the right side of FIG. 10 is the left side of the first chemical liquid nozzle 31). The spray shield 101 is disposed at an opposite side from the first rinse liquid nozzle 33 with respect to the first chemical liquid nozzle 31 (see FIG. 4). When the first chemical liquid nozzle 31 is disposed at the standby position, the spray shield 101 is disposed at the spin chuck 21 side with respect to the first chemical liquid nozzle 31 (see FIG. 4).

As shown in FIG. 10, the spray shield 101 is a single, integral member. The shield plate 103 is integral to the support arm 102. The spray shield 101 may be a plurality of members that are fixed to each other. The spray shield 101 is in contact with the nozzle portion 81 of the first chemical liquid nozzle 31 and is fixed to the nozzle portion 81 of the first chemical liquid nozzle 31. The spray shield 101 may be in contact with the arm portion 82 of the first chemical liquid nozzle 31 and may be fixed to the arm portion 82 of the first chemical liquid nozzle 31. Or, a portion or a whole of the spray shield 101 may be integral to the first chemical liquid nozzle 31.

The support arm 102 is overlapped with a side surface of the upstream portion 87 of the first chemical liquid nozzle 31. The support arm 102 is fixed to the upstream portion 87, for example, by a bolt. The support arm 102 extends downward from the upstream portion 87. The lower end of the support arm 102 is disposed at a position that is lower than a lower end of the upstream portion 87 and higher than a lower end of the downstream portion 88. The shield plate 103 extends in a direction opposite to the first chemical liquid nozzle 31 from the support arm 102. The shield plate 103 and the support arm 102 are not in contact with the downstream portion 88 and are separated horizontally from the downstream portion 88.

The support arm 102 is, for example, of a vertical plate shape. A front surface **102*f* and a rear surface 102*r* of the support arm 102 are parallel or substantially parallel to each other. The front surface 102*f* and the rear surface 102*r* of the support arm 102 are both a single flat surface of vertical, rectangular shape. The front surface 102*f* of the support arm 102 may be of two or more flat surfaces and may include a flat surface and a curved surface. The front surface 102*f* of the support arm 102 may be of a shape other than a rectangular shape. The same also applies to the rear surface 102*r* of the support arm 102**.

The front surface **102*f* of the support arm 102 is overlapped with the side surface of the upstream portion 87. The front surface 102*f* of the support arm 102 extends downward from the upstream portion 87. A lower end of the front surface 102*f* of the support arm 102 is disposed at a position that is lower than the lower end of the upstream portion 87 and higher than the lower end of the downstream portion 88. The front surface 102*f* of the support arm 102 is not in contact with the downstream portion 88 and is separated horizontally from the downstream portion 88. A shortest distance in a horizontal direction from the downstream portion 88 to the front surface 102*f* of the support arm 102 may be fixed from an upper end of the downstream portion 88 to the lower end of the front surface 102*f* of the support arm 102 or may decrease stepwise or continuously as the chemical liquid discharge port 95** is approached.

As shown in FIG. 10, an upper surface **103*u* of the shield plate 103 extends in a direction opposite to the first chemical liquid nozzle 31 from the rear surface 102*r* of the support arm 102. The lower surface 104 of the shield plate 103 that corresponds to being the shield surface 104 extends in a direction opposite to the first chemical liquid nozzle 31 from the front surface 102*f* of the support arm 102. The upper surface 103*u* and the lower surface 104 of the shield plate 103 are parallel or substantially parallel to each other. The upper surface 103*u* and the lower surface 104 of the shield plate 103 are disposed lower than the upper end of the upstream portion 87**.

Figure 12:
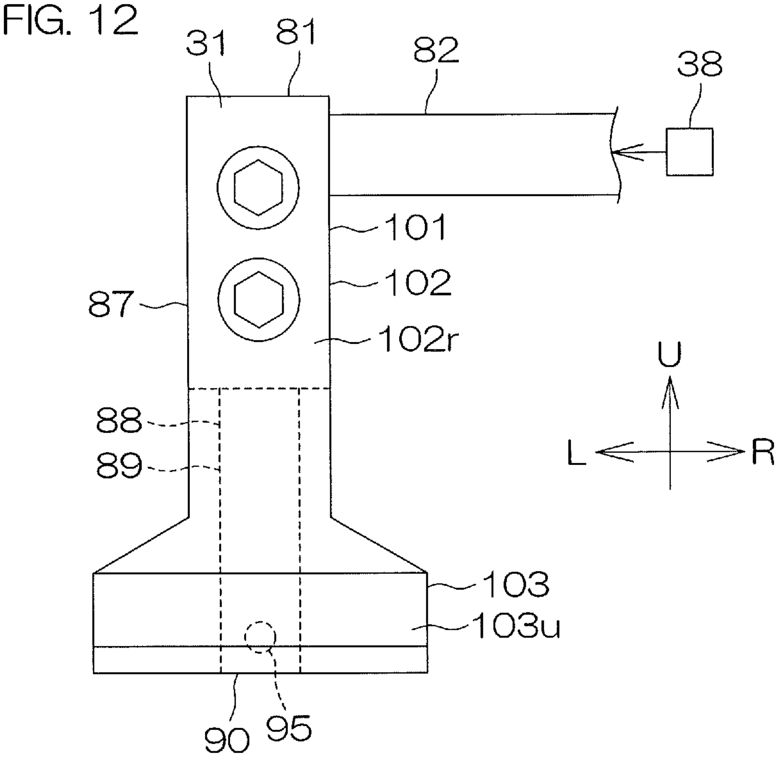
FIG. 12 is a schematic view of the first chemical liquid nozzle and the spray shield as viewed from a rear side of the spray shield.
Figure 13:
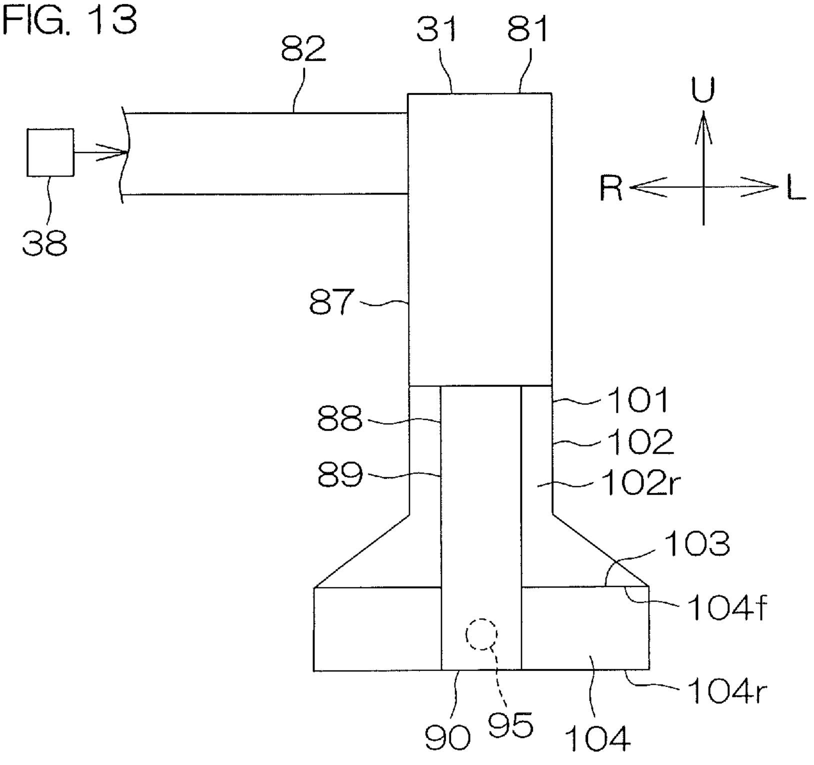
FIG. 13 is a schematic view of the first chemical liquid nozzle and the spray shield as viewed from a front side of the spray shield.

As shown in FIG. 12 and FIG. 13, a width (length in the right/left direction of the spray shield 101) of the support arm 102 is fixed or substantially fixed from an upper end of the support arm 102 to a vicinity of the shield plate 103 and, in the vicinity of the shield plate 103, increases as the shield plate 103 is approached. The width of the support arm 102 may instead be fixed from the upper end of the support arm 102 to the lower end of the support arm 102.

Figure 14:
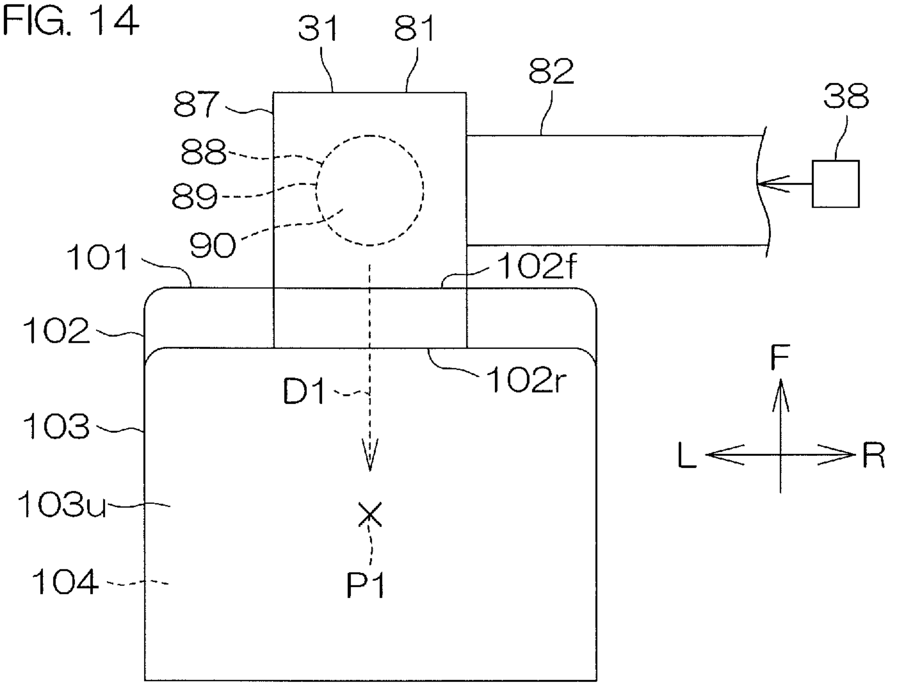
FIG. 14 is a schematic view of the first chemical liquid nozzle and the spray shield as viewed from an upper side of the spray shield.

As shown in FIG. 14, a width (length in the right/left direction of the spray shield 101) of the shield plate 103 is fixed or substantially fixed from a front end of the shield plate 103 to a rear end of the shield plate 103. The width of the shield plate 103 is equal or substantially equal to a maximum value of the width of the support arm 102. A depth (length in the front/rear direction of the spray shield 101) of the shield plate 103 is fixed or substantially fixed from a right end of the shield plate 103 to a left end of the shield plate 103. The width of the shield plate 103 may be equal to the depth of the shield plate 103 or may be greater or smaller than the depth of the shield plate 103. The width and the depth of the shield plate 103 does not have to be fixed and may change.

As shown in FIG. 10, the shield surface 104 is a single flat surface that is inclined at a fixed angle with respect to the horizontal plane such as to approach the upper surface of the substrate W with separation from the chemical liquid discharge port 95 in the front/rear direction of the spray shield 101. In other words, a distance in the vertical direction from the upper surface of the substrate W to the shield surface 104 decreases continuously at a fixed rate with separation from the chemical liquid discharge port 95 in the front/rear direction of the spray shield 101.

On the other hand, as long as a distance from the chemical liquid discharge port 95 in the front/rear direction of the spray shield 101 does not change, the distance in the vertical direction from the upper surface of the substrate W to the shield surface 104 is fixed from a right end of the shield surface 104 to a left end of the shield surface 104. Therefore, as shown in FIG. 13, a front end 104*f* (side at the front) of the shield surface 104 is horizontal and a rear end 104*r* (side at the rear) of the shield surface 104 is also horizontal.

An inclination angle θ2 (see FIG. 11) of the shield surface 104 with respect to the horizontal plane may be equal to an inclination angle θ1 (see FIG. 11) of the chemical liquid discharge direction D1 with respect to the horizontal plane or may be greater or smaller than the inclination angle θ1 of the chemical liquid discharge direction D1 with respect to the horizontal plane. The inclination angle θ1 of the chemical liquid discharge direction D1 with respect to the horizontal plane is, for example, 10 to 45 degrees. The inclination angle θ2 of the shield surface 104 with respect to the horizontal plane is, for example, 10 to 45 degrees.

The shield surface 104 may be horizontal instead. That is, the distance in the vertical direction from the upper surface of the substrate W to the shield surface 104 may be fixed from the front end 104*f* of the shield surface 104 to the rear end 104*r* of the shield surface 104 and be fixed from the right end of the shield surface 104 to the left end of the shield surface 104. Or, the distance in the vertical direction from the upper surface of the substrate W to the shield surface 104 may change continuously or stepwise as the rear end 104*r* of the shield surface 104 is approached in the front/rear direction of the spray shield 101. Similarly, the distance in the vertical direction from the upper surface of the substrate W to the shield surface 104 may change continuously or stepwise as the left end of the shield surface 104 is approached in the right/left direction of the spray shield 101.

As shown in FIG. 11, the front end 104*f* of the shield surface 104 is disposed higher than the rear end 104*r* of the shield surface 104. The front end 104*f* of the shield surface 104 corresponds to being an upper end of the shield surface 104 and the rear end 104*r* of the shield surface 104 corresponds to being a lower end of the shield surface 104. A distance DS1 in the vertical direction (height difference) from the front end 104*f* of the shield surface 104 to the rear end 104*r* of the shield surface 104 is greater than a radius of the lower surface 90 of the first chemical liquid nozzle 31 and is shorter than a depth DP1 (see FIG. 15) of the shield surface 104. The distance DS1 may be greater than a distance in the vertical direction from the upper surface of the substrate W to the rear end 104*r* of the shield surface 104.

The front end 104*f* of the shield surface 104 is a portion of the shield surface 104 that is closest to the chemical liquid discharge port 95. The front end 104*f* of the shield surface 104 is disposed higher than a lower end 95L of the chemical liquid discharge port 95. The front end 104*f* of the shield surface 104 may be disposed at a height equal to an upper end 95*u* of the chemical liquid discharge port 95 or may be disposed higher or lower than the upper end 95*u* of the chemical liquid discharge port 95. The rear end 104*r* of the shield surface 104 is disposed lower than the upper end 95*u* of the chemical liquid discharge port 95. The rear end 104*r* of the shield surface 104 may be disposed at a height equal to the lower end 95L of the chemical liquid discharge port 95 or may be disposed higher or lower than the lower end 95L of the chemical liquid discharge port 95.

If the rear end 104*r* of the shield surface 104 is disposed lower than the lower end 95L of the chemical liquid discharge port 95, the rear end 104*r* of the shield surface 104 may be disposed at a height equal to the lower surface 90 of the first chemical liquid nozzle 31 or, as long as it does not contact the upper surface of the substrate W, may be disposed lower than the lower end of the first chemical liquid nozzle 31. By making the rear end 104*r* of the shield surface 104 that corresponds to being the lower end of the shield surface 104 approach the upper surface of the substrate W within a range in which the rear end 104*r* of the shield surface 104 does not contact the SPM on the substrate W, the spray droplets of the SPM that are scattered upward from the substrate W can be received efficiently by the shield surface 104.

Figure 15:
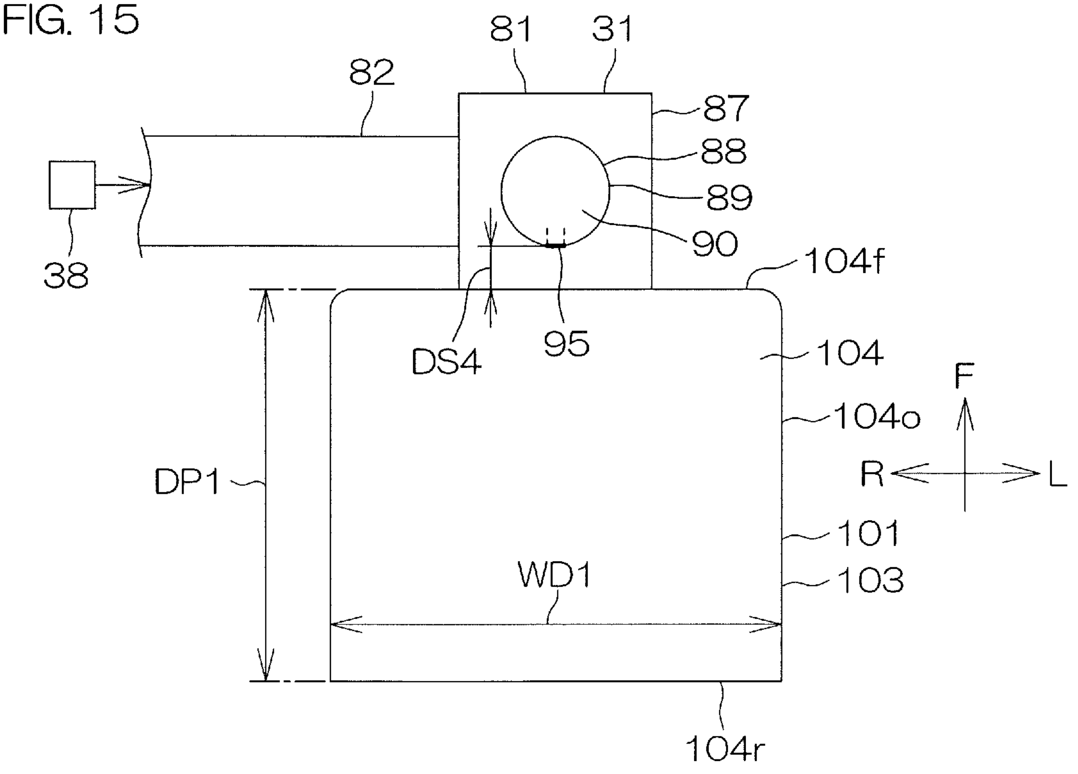
FIG. 15 is a schematic view of the first chemical liquid nozzle and the spray shield as viewed from a lower side of the spray shield.

As shown in FIG. 15, when the shield surface 104, that is, the lower surface 104 of the shield plate 103 is viewed from below, the shield surface 104 is a single plane of quadrilateral or rectangular shape. The shield surface 104 may instead be a single curved surface or may include a flat surface and a curved surface. The shield surface 104 may also be of a shape other than quadrilateral or rectangular such as a fan shape or a trapezoidal shape, etc. The shield surface 104 is smaller than the substrate W in plan view (see FIG. 16). That is, an area of the shield surface 104 in plan view is smaller than an area of the substrate W in plan view.

The depth DP1 (length in the front/rear direction of the spray shield 101) of the shield surface 104 may be fixed or may change continuously or stepwise from the right end of the shield surface 104 to the left end of the shield surface 104. Similarly, a width WD1 (length in the right/left direction of the spray shield 101) of the shield surface 104 may be fixed or may change continuously or stepwise from the front end 104*f* of the shield surface 104 to the rear end 104*r* of the shield surface 104. The depth DP1 of the shield surface 104 may be equal to the width WD1 of the shield surface 104 or may be greater or smaller than the width WD1 of the shield surface 104.

The depth DP1 and the width WD1 of the shield surface 104 are each greater than a diameter of the lower surface 90 of the first chemical liquid nozzle 31. The depth DP1 and the width WD1 of the shield surface 104 are each smaller than a radius of the substrate W. The depth DP1 and the width WD1 of the shield surface 104 are each smaller than a distance DS2 (see FIG. 10) in the vertical direction from an upper end of the spray shield 101 to a lower end of the spray shield 101. The depth DP1 and the width WD1 of the shield surface 104 are each smaller than a distance DS3 (see FIG. 10) in the vertical direction from an upper end of the nozzle portion 81 of the first chemical liquid nozzle 31 to a lower end of the nozzle portion 81 of the first chemical liquid nozzle 31.

As shown in FIG. 15, when the first chemical liquid nozzle 31 and the spray shield 101 are viewed from below, all portions of the lower surface 90 of the first chemical liquid nozzle 31 are disposed at an outer side of an outer edge 104*o* of the shield surface 104 and are separated horizontally from the shield surface 104. When the first chemical liquid nozzle 31 is viewed from below, all portions of the chemical liquid discharge port 95 are disposed on an outer edge 90*o* of the lower surface 90 of the first chemical liquid nozzle 31. Therefore, when the first chemical liquid nozzle 31 and the spray shield 101 are viewed from below, all portions of the chemical liquid discharge port 95 are disposed at the outer side of the outer edge 104*o* of the shield surface 104 and are separated horizontally from the shield surface 104.

When the first chemical liquid nozzle 31 and the spray shield 101 are viewed from below, a shortest distance DS4 (see FIG. 15) from the chemical liquid discharge port 95 to the outer edge 104*o* of the shield surface 104 is shorter than the depth DP1 of the shield surface 104. In the example shown in FIG. 15, the shortest distance from the chemical liquid discharge port 95 to the front end 104*f* (upper end) of the shield surface 104 is shorter than the depth DP1 of the shield surface 104. Therefore, the shield surface 104 is disposed close to the chemical liquid discharge port 95 and the shield surface 104 is long in the front/rear direction of the spray shield 101. The depth DP1 of the shield surface 104 may instead be not more than the shortest distance DS4.

A liquid that is discharged from a discharge port of a nozzle toward the upper surface of the substrate W collides with the upper surface of the substrate W or a liquid on the substrate W at or in a vicinity of the target position P1 within the upper surface of the substrate W. In this process, a liquid splash is generated on the substrate W and spray droplets (liquid droplets, mist, vapor, etc.) of the liquid scatter upward from the substrate W. In addition, spray droplets of the liquid that scatter radially from the discharge port are also generated. When such spray droplets of the liquid adhere to a member inside the chamber 12 (see FIG. 3) and dry, they may change into particles that contaminate the substrate W.

When two types of liquids that react chemically are mixed immediately before discharge, spray droplets of liquid are generated due to the chemical reaction of the two types of liquids and such spray droplets scatter at times from the discharge port and the upper surface of the substrate W. When a liquid that exceeds 100° C. and a liquid that contains water and is less than 100° C. are mixed immediately before discharge, spray droplets of liquid scatter at times from the discharge port and the upper surface of the substrate W due to rapid boiling of water.

Especially when the liquid that exceeds 100° C. and the liquid that contains water and is less than 100° C. are two types of liquids that cause an exothermic reaction, the water contained in the two types of liquids is heated even more rapidly and the number of spray droplets increases or the spray droplets increase in impetus. Examples of such two types of liquids are sulfuric acid that exceeds 100° C. and hydrogen peroxide water that is less than 100° C. When the sulfuric acid and the hydrogen peroxide water are mixed, SPM of high temperature is formed due to heat of dilution of the sulfuric acid.

As shown in FIG. 10, when the SPM is supplied to the upper surface of the substrate W in the first chemical liquid supplying step (see step S3 of FIG. 6), the controller 3 (see FIG. 1) makes the first chemical liquid nozzle 31 discharge the SPM toward the target position P1 within the upper surface of the substrate W in a state where the lower surface 90 of the first chemical liquid nozzle 31 and the shield surface 104 are put in proximity to the upper surface of the substrate W. A distance DS5 in the vertical direction from the upper surface of the substrate W to the lower surface 90 of the first chemical liquid nozzle 31 is shorter than the depth DP1 of the shield surface 104. A distance DS6 in the horizontal direction from the chemical liquid discharge port 95 to the target position P1 is shorter than the depth DP1 of the shield surface 104.

The first chemical liquid nozzle 31 does not discharge the SPM in a direction perpendicular to the upper surface of the substrate W but discharges the SPM obliquely with respect to the upper surface of the substrate W. A range of scattering of spray droplets of the SPM in the up direction can thereby be narrowed. Further, the target position P1 within the upper surface of the substrate W is covered by the shield surface 104. Spray droplets of the SPM that scatter upward from the chemical liquid discharge port 95 and spray droplets of the SPM that scatter upward from the substrate W collide with the shield surface 104. The range of scattering of the spray droplets of the SPM can thereby be narrowed and the number of spray droplets of the SPM that adhere to members inside the chamber 12 other than the first chemical liquid nozzle 31 and the spray shield 101 (for example, the lower surface of the rectifying plate 18 shown in FIG. 3) can be lessened.

Next, movements of the first chemical liquid nozzle 31 and the spray shield 101 above the substrate W shall be described.

Figure 16:
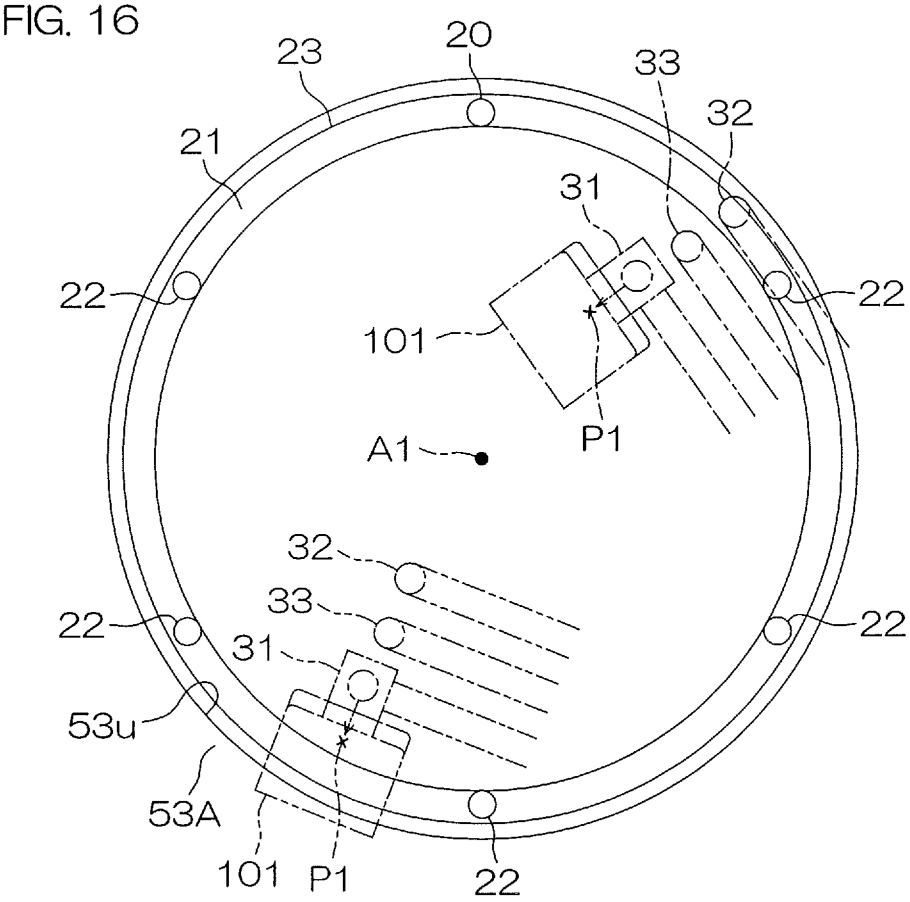
FIG. 16 is a schematic view showing positions of the first chemical liquid nozzle and the spray shield with respect to a substrate.
Figure 17:
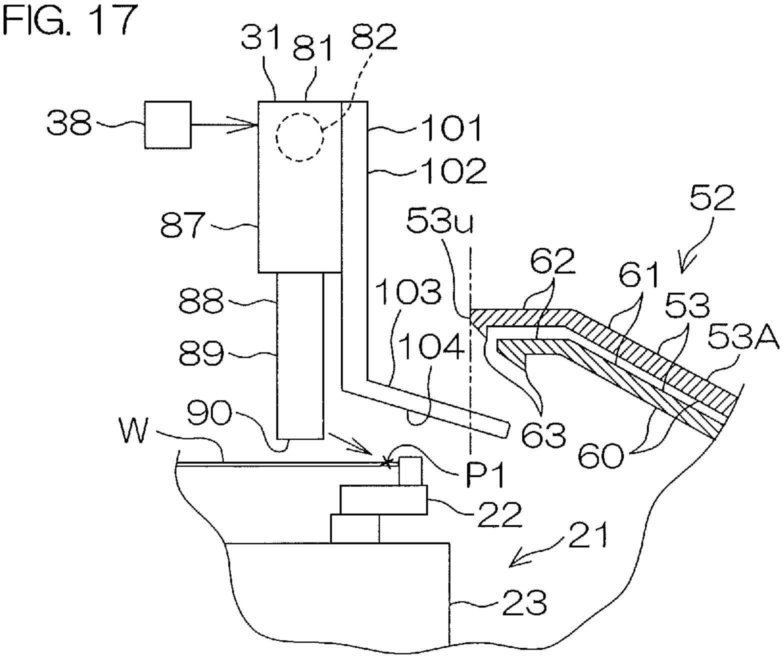
FIG. 17 is a schematic view showing a position of the spray shield with respect to a first guard when the first chemical liquid nozzle is discharging SPM toward an outer circumferential portion of an upper surface of the substrate.

FIG. 16 is a schematic view showing positions of the first chemical liquid nozzle 31 and the spray shield 101 with respect to a substrate W. FIG. 17 is a schematic view showing a position of the spray shield 101 with respect to the first guard 53A when the first chemical liquid nozzle 31 is discharging the SPM toward an outer circumferential portion of the upper surface of the substrate W.

In the first chemical liquid supplying step (see step S3 of FIG. 6), the controller 3 (see FIG. 1) makes the first chemical liquid nozzle 31 discharge the SPM toward the upper surface of the substrate W in a state where at least one of the guards 53 is positioned at the upper position and while the substrate W is being rotated by the spin chuck 21. In this process, the controller 3 may keep the first chemical liquid nozzle 31 and the spray shield 101 still such that the collision position at which the SPM discharged from the first chemical liquid nozzle 31 collides with the upper surface of the substrate W stays at the central portion of the upper surface of the substrate W or may move the first chemical liquid nozzle 31 and the spray shield 101 horizontally such that the collision position moves in a radial direction of the substrate W (direction orthogonal to the rotation axis A1 of the substrate W) within the upper surface of the substrate W.

If the first chemical liquid nozzle 31 and the spray shield 101 are moved horizontally while making the first chemical liquid nozzle 31 discharge the SPM, the controller 3 may move the first chemical liquid nozzle 31 and the spray shield 101 horizontally between a center processing position at which the SPM discharged from the first chemical liquid nozzle 31 collides with the central portion of the upper surface of the substrate W and an edge processing position at which the SPM discharged from the first chemical liquid nozzle 31 collides with the outer circumferential portion of the upper surface of the substrate W (half scan). Or, the controller 3 may move the first chemical liquid nozzle 31 and the spray shield 101 horizontally between two edge processing positions at which the SPM discharged from the first chemical liquid nozzle 31 collides with the outer circumferential portion of the upper surface of the substrate W (full scan).

FIG. 16 shows an example where the first chemical liquid nozzle 31 and the spray shield 101 are moved horizontally between two edge processing positions. In the case of this example, the controller 3 controls the first nozzle moving unit 38 such that the first chemical liquid nozzle 31 and the spray shield 101 are moved between an outer edge position (position indicated by alternate long and two short dashed lines) and an inner edge position (position indicated by alternate long and short dashed lines).

The "outer edge position" is a position at which the first chemical liquid nozzle 31 is disposed at an opposite side from the rotation axis A1 of the substrate W with respect to the second chemical liquid nozzle 32 and the collision position of the SPM with respect to the upper surface of the substrate W is made close to an outer circumference of the substrate W such that the spray shield 101 overlaps in plan view with the first guard 53A positioned at the upper position.

The "inner edge position" is a position at which the second chemical liquid nozzle 32 is disposed at an opposite side from the rotation axis A1 of the substrate W with respect to the first chemical liquid nozzle 31 and the collision position of the SPM with respect to the upper surface of the substrate W is made close to the outer circumference of the substrate W within a range in which the second chemical liquid nozzle 32 does not contact the first guard 53A positioned at the upper position.

As shown in FIG. 17, when the first chemical liquid nozzle 31 is disposed at the outer edge position, the shield plate 103 of the spray shield 101 is disposed below the ceiling portion 60 of the first guard 53A positioned at the upper position and overlaps with the ceiling portion 60 in plan view. In this state, the support arm 102 and the shield plate 103 are separated from the first guard 53A positioned at the upper position and do not contact the first guard 53A. The upper end portion 53*u* of the first guard 53A positioned at the upper position is disposed higher than any portion of the shield plate 103 and overlaps in plan view with the spray shield 101 positioned at the outer edge position.

The outer edge position is a position that is further outward than the inner edge position in regard to the radial direction of the substrate W. That is, a shortest distance from a center of the substrate W to the collision position of the SPM when the first chemical liquid nozzle 31 is disposed at the outer edge position is longer than a shortest distance from the center of the substrate W to the collision position of the SPM when the first chemical liquid nozzle 31 is disposed at the inner edge position.

As mentioned above, the horizontal direction that is parallel in plan view to and the same in orientation in plan view as the chemical liquid discharge direction D1 is the rear direction of the spray shield 101. The direction opposite to the rear direction of the spray shield 101 is the front direction of the spray shield 101. The front direction of the spray shield 101 coincides with the right direction of the first chemical liquid nozzle 31 and the rear direction of the spray shield 101 coincides with the left direction of the first chemical liquid nozzle 31. The first chemical liquid nozzle 31 and the spray shield 101 move horizontally in the front/rear direction of the spray shield 101 (right/left direction of the first chemical liquid nozzle 31).

The controller 3 may maintain a flow rate of the SPM discharged from the first chemical liquid nozzle 31 fixed regardless of whether the first chemical liquid nozzle 31 is moving in the front direction or the rear direction of the spray shield 101. Or, the controller 3 may change the flow rate of the SPM discharged from the first chemical liquid nozzle 31 in accordance with which of the front direction and the rear direction of the spray shield 101 the first chemical liquid nozzle 31 is moving in. In this case, the controller 3 may decrease the flow rate of the SPM to zero or a value exceeding zero when the first chemical liquid nozzle 31 is moving in the front direction of the spray shield 101 or may decrease the flow rate of the SPM to zero or a value exceeding zero when the first chemical liquid nozzle 31 is moving in the rear direction of the spray shield 101.

The shield surface 104 is inclined with respect to the horizontal plane such as to approach the upper surface of the substrate W as it separates, in the rear direction of the spray shield 101, from the chemical liquid discharge port 95. When the first chemical liquid nozzle 31 is made to discharge the SPM while moving the first chemical liquid nozzle 31 in the front direction of the spray shield 101, the shield surface 104 approaches the spray droplets of the SPM that are scattered from the chemical liquid discharge port 95 and the upper surface of the substrate W. Therefore, when the first chemical liquid nozzle 31 is moved in the front direction of the spray shield 101, the spray droplets of the SPM can be received earlier by the shield surface 104.

Oppositely when the first chemical liquid nozzle 31 is made to discharge the SPM while moving the first chemical liquid nozzle 31 in the rear direction of the spray shield 101, the shield surface 104 moves away from the spray droplets of the SPM that are scattered from the chemical liquid discharge port 95 and the upper surface of the substrate W. An efficiency at which the shield surface 104 receives the spray droplets of the SPM may be higher when the first chemical liquid nozzle 31 is moved in the front direction of the spray shield 101. In such a case, by decreasing the flow rate of the SPM when the first chemical liquid nozzle 31 is moving in the rear direction of the spray shield 101, the spray droplets that are generated can be lessened and the spray droplets that could not be blocked by the spray shield 101 can be lessened.

On the other hand, the spray droplets of the SPM that are generated by collision with the upper surface of the substrate W or a liquid on the substrate W mainly scatter in the rear direction of the spray shield 101 in plan view. When the first chemical liquid nozzle 31 is moved in the front direction of the spray shield 101, the spray shield 101 moves in the direction opposite to the direction in which a large portion of the spray droplets of the SPM is scattered. In this case, the spray droplets of the SPM that should have been received by the spray shield 101 may not collide with the spray shield 101. In such a case, by decreasing the flow rate of the SPM when the first chemical liquid nozzle 31 is moving in the front direction of the spray shield 101, the spray droplets that are generated can be lessened and the spray droplets that could not be blocked by the spray shield 101 can be lessened.

Next, the standby pod 111 shall be described.

Figure 18:
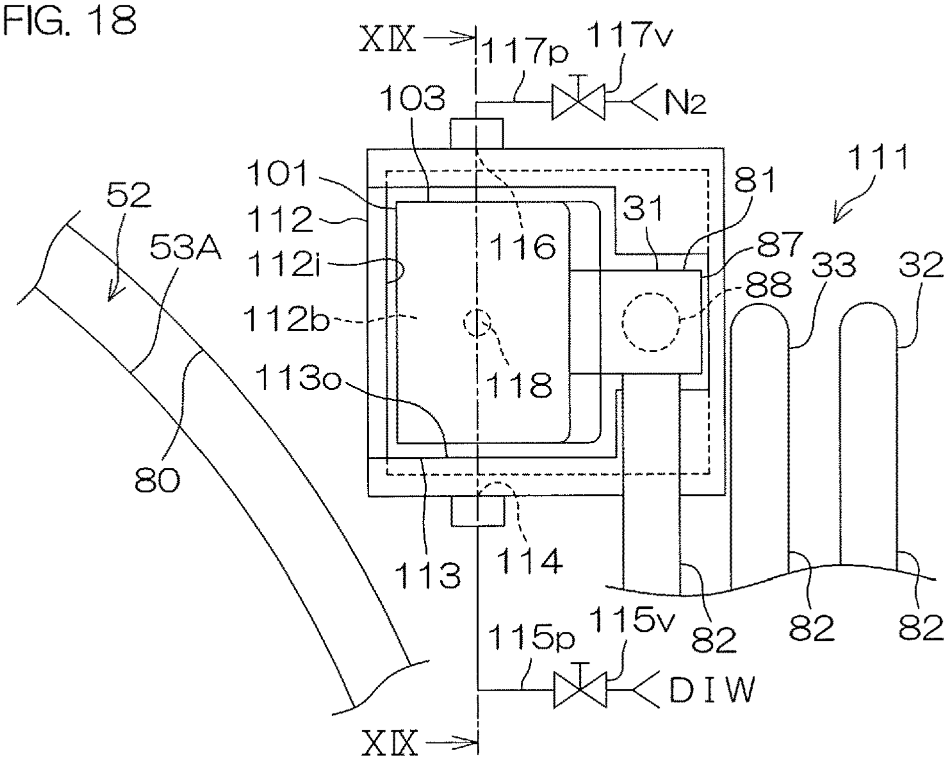
FIG. 18 is a schematic plan view of a standby pod.
Figure 19:
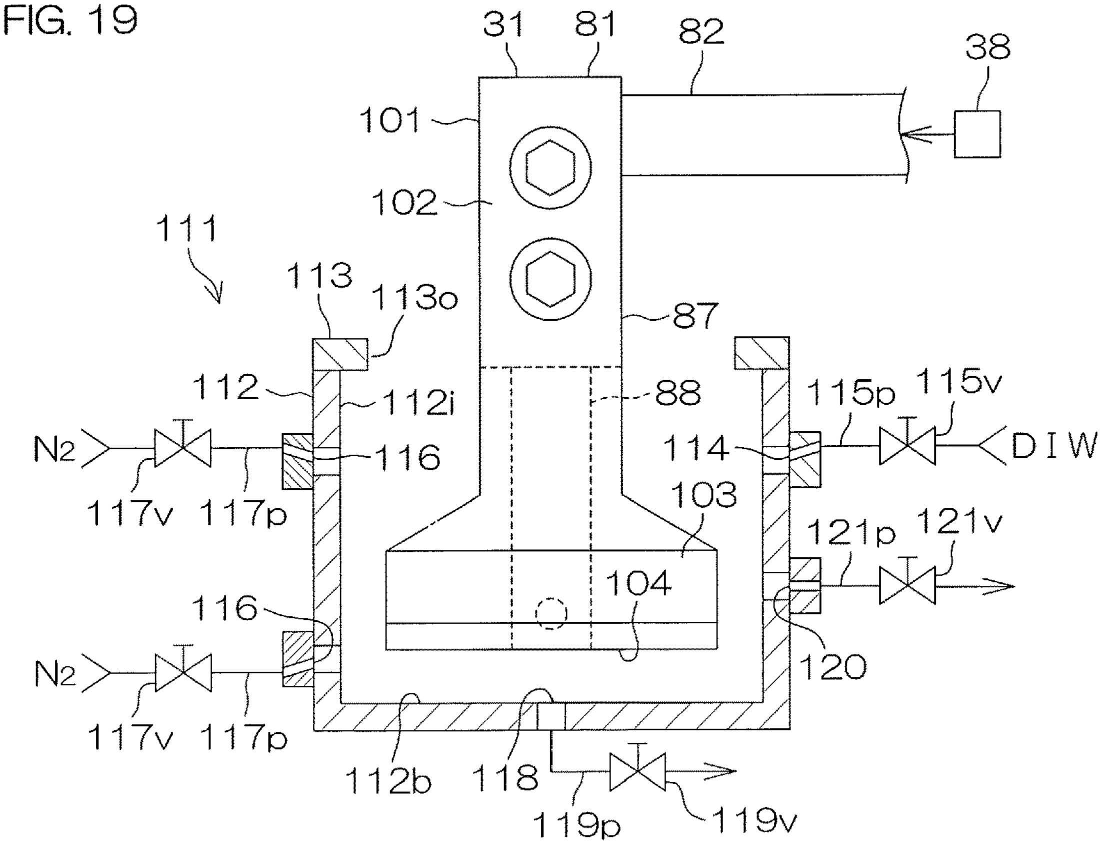
FIG. 19 is a schematic cross-sectional view showing a vertical cross-section of the standby pod taken along line XIX-XIX shown in FIG. 18.

FIG. 18 is a schematic plan view of the standby pod 111. FIG. 19 is a schematic cross-sectional view showing a vertical cross-section of the standby pod 111 taken along line XIX-XIX shown in FIG. 18. FIG. 18 shows the first chemical liquid nozzle 31 and the spray shield 101 that are positioned at standby position.

As shown in FIG. 18, the standby pod 111 is disposed at an outer side of the first guard 53A. The standby pod 111 is disposed at a position of overlapping in plan view with the first chemical liquid nozzle 31 and the spray shield 101 that are positioned at standby position. The standby position of the first chemical liquid nozzle 31 and the spray shield 101 includes a lower standby position at which the first chemical liquid nozzle 31 and the spray shield 101 are inserted in the standby pod 111 and an upper standby position at which all portions of the first chemical liquid nozzle 31 and the spray shield 101 are positioned above the standby pod 111. FIG. 19 shows the first chemical liquid nozzle 31 and the spray shield 101 that are positioned at the lower standby position. The lower standby position is a position directly below the upper standby position.

As shown in FIG. 18 and FIG. 19, the standby pod 111 includes a housing cup 112 that houses the first chemical liquid nozzle 31 and the spray shield 101 and a top cover 113 that forms an opening 113*o* through which the first chemical liquid nozzle 31 and the spray shield 101 pass when the first chemical liquid nozzle 31 and the spray shield 101 enter inside the housing cup 112. When the first chemical liquid nozzle 31 and the spray shield 101 descend from the upper standby position to the lower standby position, the first chemical liquid nozzle 31 and the spray shield 101 pass through the opening 113*o* and enter inside the housing cup 112.

The housing cup 112 includes an inner circumferential surface 112*i* of cylindrical shape that surrounds the nozzle portion 81 of the first chemical liquid nozzle 31 and the spray shield 101 in plan view and a bottom surface 112*b* that closes a lower end of the inner circumferential surface 112*i*. When the first chemical liquid nozzle 31 and the spray shield 101 are positioned at the standby position, the inner circumferential surface 112*i* of the housing cup 112 surrounds an entire circumference of the nozzle portion 81 of the first chemical liquid nozzle 31 and the spray shield 101 in plan view. When the first chemical liquid nozzle 31 and the spray shield 101 are disposed at the lower standby position, the nozzle portion 81 of the first chemical liquid nozzle 31 and the spray shield 101 are disposed at an inner side of the inner circumferential surface 112*i* of the housing cup 112.

The top cover 113 is disposed above the housing cup 112. The top cover 113 is supported by the housing cup 112. The top cover 113 projects inward from the inner circumferential surface 112*i* of the housing cup 112 in plan view. When the first chemical liquid nozzle 31 and the spray shield 101 are positioned at the standby position, the top cover 113 is disposed around the nozzle portion 81 of the first chemical liquid nozzle 31 and the spray shield 101 in plan view. The top cover 113 may alone form the opening 113*o* through which the first chemical liquid nozzle 31 and the spray shield 101 pass or may form the opening 113*o* together with the housing cup 112. FIG. 18 shows an example of the latter.

When the first chemical liquid nozzle 31 and the spray shield 101 descend from the upper standby position to the lower standby position, the first chemical liquid nozzle 31 and the spray shield 101 pass through the opening 113*o* of the standby pod 111 in the down direction. The first chemical liquid nozzle 31 and the spray shield 101 are thereby inserted in the standby pod 111. When the first chemical liquid nozzle 31 and the spray shield 101 ascend from the lower standby position to the upper standby position, the first chemical liquid nozzle 31 and the spray shield 101 pass through the opening 113*o* of the standby pod 111 in the up direction. The first chemical liquid nozzle 31 and the spray shield 101 thereby exit out of the standby pod 111.

As shown in FIG. 19, the standby pod 111 includes, in addition to the housing cup 112 and the top cover 113, a cleaning liquid discharge port 114 that discharges a cleaning liquid toward the first chemical liquid nozzle 31 and the spray shield 101 inside the housing cup 112 and a dry gas discharge port 116 that discharges a dry gas toward the first chemical liquid nozzle 31 and the spray shield 101 inside the housing cup 112. The standby pod 111 further includes a drain port 118 that releases a liquid inside the housing cup 112 and an exhaust port 120 that releases a gas inside the housing cup 112.

FIG. 19 shows an example where two dry gas discharge ports 116 are provided and one each of the cleaning liquid discharge port 114, the drain port 118, and the exhaust port 120 are provided. The number of the dry gas discharge port 116 may instead be one or three or more. The number of the cleaning liquid discharge port 114 may instead be two or more. The same applies to the drain port 118 and the exhaust port 120. The drain port 118 is disposed lower than the cleaning liquid discharge port 114, the dry gas discharge ports 116, and the exhaust port 120. The drain port 118 may open at the bottom surface 112*b* of the housing cup 112 or may open at a lower end of the inner circumferential surface 112*i* of the housing cup 112.

The cleaning liquid discharge port 114 is connected to a cleaning liquid piping 115*p* with a cleaning liquid valve 115*v* interposed therein. When the cleaning liquid valve 115*v* is opened, the cleaning liquid is supplied from the cleaning liquid piping 115*p* to the cleaning liquid discharge port 114 and discharged from the cleaning liquid discharge port 114. The cleaning water is warm water (pure water of higher temperature than room temperature). The cleaning liquid may be a liquid other than pure water. Specifically, the cleaning liquid may be a liquid that includes at least one among pure water, carbonated water, electrolyzed ion water, hydrogen water, ozone water, an aqueous hydrochloric acid solution of dilute concentration (for example, approximately 10 to 100 ppm), and an ammonia water of dilute concentration (for example, approximately to 100 ppm) or may be a liquid other than the above. The temperature of the cleaning liquid may be room temperature or may be higher or lower than room temperature.

Each dry gas discharge port 116 is connected to a dry gas piping 117*p* with a dry gas valve 117*v* interposed therein. When the dry gas valve 117*v* is opened, the dry gas is supplied from the dry gas piping 117*p* to the dry gas discharge port 116 and discharged from the dry gas discharge port 116. The dry gas is nitrogen gas. The dry gas may be a gas other than nitrogen gas. Specifically, the dry gas may be an inert gas other than nitrogen gas such as helium gas or argon gas, etc., or may be a gas other than an inert gas such as clean air or dry air, etc. The temperature of the dry gas may be room temperature or may be higher or lower than room temperature.

The cleaning liquid discharge port 114 may discharge the cleaning liquid horizontally or may discharge the cleaning liquid obliquely upward or obliquely downward. Similarly, the dry gas discharge ports 116 may discharge the dry gas horizontally or may discharge the dry gas obliquely upward or obliquely downward. FIG. 19 shows an example where the cleaning liquid discharge port 114 discharges the cleaning liquid obliquely downward, one of the two dry gas discharge ports 116 discharges the dry gas obliquely upward, and the other of the two dry gas discharge ports 116 discharge the dry gas obliquely downward (see FIG. and FIG. 21).

The drain port 118 is connected to a drain piping 119*p* with a drain valve 119*v* interposed therein. The exhaust port 120 is connected to an exhaust piping 121*p* with an exhaust valve 121*v* interposed therein. When the drain valve 119*v* is opened, the liquid inside the housing cup 112 is released through the drain port 118. When the exhaust valve 121*v* is opened, a suction force that sucks the gas inside the housing cup 112 is transmitted to the gas inside the housing cup 112 through the exhaust piping 121*p* and the exhaust port 120 and the gas inside the housing cup 112 is released through the exhaust port 120. When the cleaning liquid discharge port 114 is made to discharge the cleaning liquid in a state where the drain valve 119*v* is closed, the bottom surface 112*b* of the housing cup 112 becomes covered by a liquid film of the cleaning liquid and thereafter, a surface of the cleaning liquid moves up gradually. The cleaning liquid thereby accumulates inside the housing cup 112.

Next, cleaning and drying of the first chemical liquid nozzle 31 and the spray shield 101 shall be described.

Figure 20:
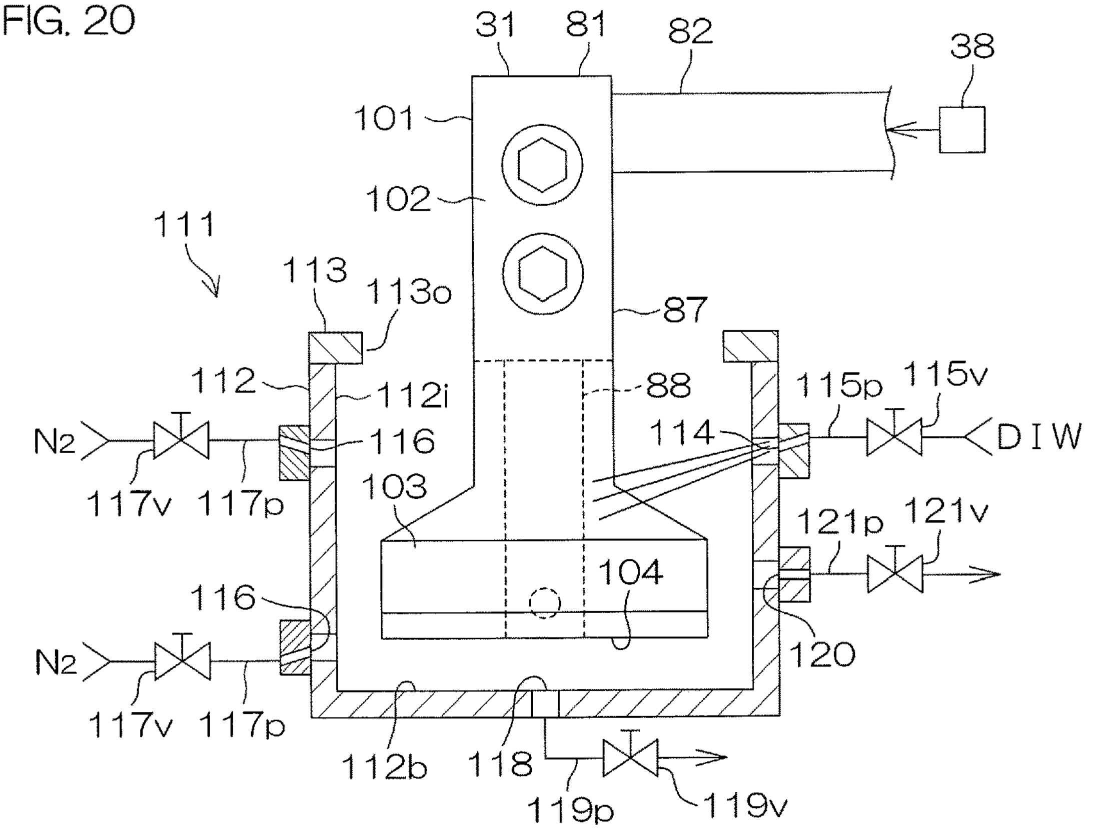
FIG. 20 is a schematic cross-sectional view showing a state where the first chemical liquid nozzle and the spray shield are being cleaned inside the standby pod.
Figure 21:
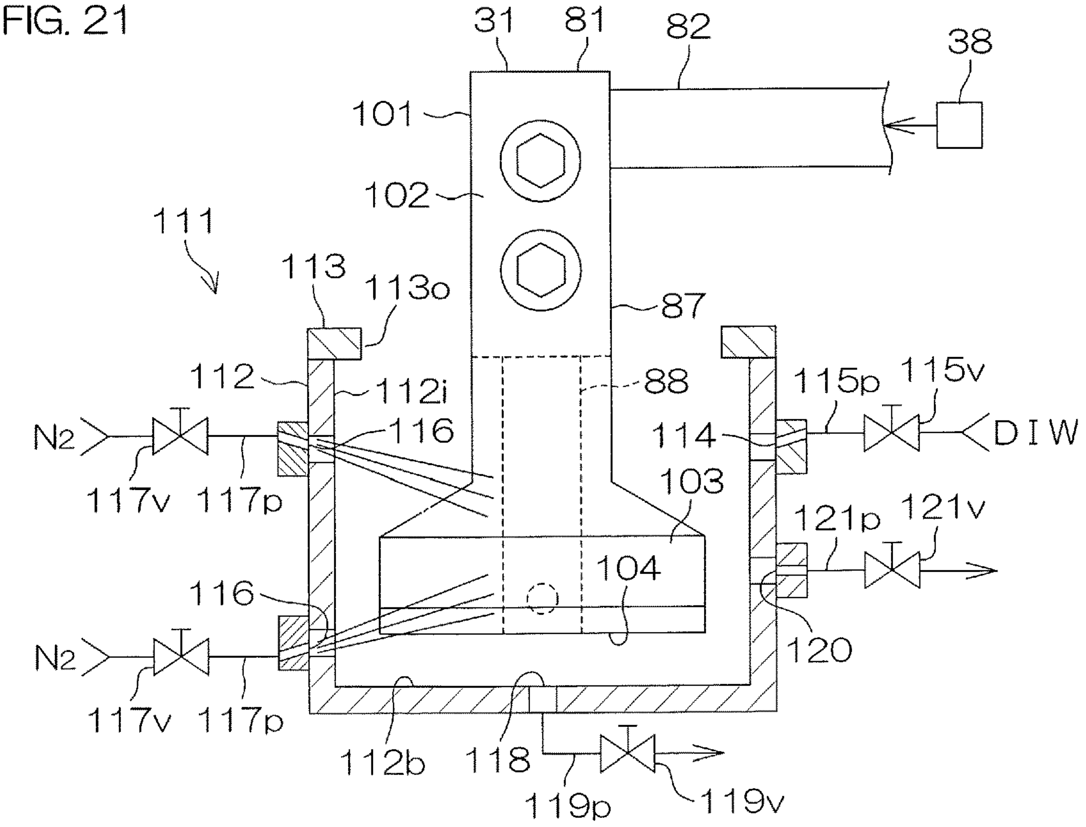
FIG. 21 is a schematic cross-sectional view showing a state where the first chemical liquid nozzle and the spray shield are being dried inside the standby pod.

FIG. 20 is a schematic cross-sectional view showing a state where the first chemical liquid nozzle 31 and the spray shield 101 are being cleaned inside the standby pod 111. FIG. 21 is a schematic cross-sectional view showing a state where the first chemical liquid nozzle 31 and the spray shield 101 are being dried inside the standby pod 111.

The controller 3 (see FIG. 1) makes the first chemical liquid nozzle 31 and the spray shield 101 be cleaned and dried, for example, after making the first chemical liquid nozzle 31 stop the discharge of the SPM in the first chemical liquid supplying step (see step S3 of FIG. 6) and before the substrate W is carried out of the chamber 12 in the carry-out step (see step S9 of FIG. 6).

Specifically, after making the first chemical liquid nozzle 31 stop the discharge of the SPM in the first chemical liquid supplying step, the controller 3 controls the first nozzle moving unit 38 such that the first chemical liquid nozzle 31 and the spray shield 101 is moved horizontally from the processing position to the upper standby position and moved vertically from the upper standby position to the lower standby position. The first chemical liquid nozzle 31 and the spray shield 101 are thereby inserted in the housing cup 112.

As shown in FIG. 20, after the first chemical liquid nozzle 31 and the spray shield 101 are inserted in the housing cup 112, the controller 3 opens the cleaning liquid valve 115*v* to make the cleaning liquid discharge port 114 discharge the cleaning liquid toward the first chemical liquid nozzle 31 and the spray shield 101 inside the housing cup 112. The controller 3 may start the discharge of the cleaning liquid before the first chemical liquid nozzle 31 and the spray shield 101 are inserted in the housing cup 112. When a predetermined time elapses from when the cleaning liquid valve 115*v* was opened, the controller 3 closes the cleaning liquid valve 115*v* to stop the discharge of the cleaning liquid.

The cleaning liquid discharged from the cleaning liquid discharge port 114 collides with the first chemical liquid nozzle 31 and the spray shield 101 and flows along the first chemical liquid nozzle 31 and the spray shield 101. Thereafter, the cleaning liquid flows down from the first chemical liquid nozzle 31 and the spray shield 101. Contamination sources such as liquid droplets of SPM, etc., are thereby washed off from the first chemical liquid nozzle 31 and the spray shield 101 by the cleaning liquid. When the cleaning liquid discharge port 114 is discharging the cleaning liquid, the controller 3 may keep the first chemical liquid nozzle 31 and the spray shield 101 still inside the housing cup 112 or may make them reciprocate up and down inside the housing cup 112.

When the cleaning liquid discharge port 114 is discharging the cleaning liquid, the drain valve 119*v* and the exhaust valve 121*v* are opened. Therefore, the cleaning liquid discharged from the cleaning liquid discharge port 114 is released from the housing cup 112 through the drain port 118. The controller 3 may instead close the drain valve 119*v* when the cleaning liquid discharge port 114 is discharging the cleaning liquid.

For example, in order to accumulate the cleaning liquid inside the housing cup 112, the controller 3 may close the drain valve 119*v* when the cleaning liquid discharge port 114 is discharging the cleaning liquid. In this case, the controller 3 may accumulate the cleaning liquid until the surface of the cleaning liquid inside the housing cup 112 reaches the lower surface 104 (shield surface 104) of the spray shield 101 or may make the first chemical liquid nozzle 31 and the spray shield 101 descend to sink the first chemical liquid nozzle 31 and the spray shield 101 in the accumulated cleaning liquid. The cleaning liquid can thereby be supplied directly to an entire area of the lower surface 104 of the spray shield 101.

As shown in FIG. 21, after the discharge of the cleaning liquid is stopped, the controller 3 opens the dry gas valves 117*v* to make the dry gas discharge ports 116 discharge the dry gas toward the first chemical liquid nozzle 31 and the spray shield 101 inside the housing cup 112. If the cleaning liquid is accumulated in the housing cup 112, the controller 3 releases all of cleaning liquid from the housing cup 112 and thereafter opens the dry gas valves 117*v* to make the dry gas discharge ports 116 start discharge of the dry gas. When a predetermined time elapses from when the dry gas valves 117*v* were opened, the controller 3 closes the dry gas valves 117*v* to stop the discharge of the dry gas.

The dry gas discharged from the dry gas discharge ports 116 collide with the first chemical liquid nozzle 31 and the spray shield 101 and flows along the first chemical liquid nozzle 31 and the spray shield 101. Liquid such as the cleaning liquid, etc., is thereby removed from the first chemical liquid nozzle 31 and the spray shield 101 and the first chemical liquid nozzle 31 and the spray shield 101 dries. When the dry gas discharge ports 116 are discharging the dry gas, the controller 3 may keep the first chemical liquid nozzle 31 and the spray shield 101 still inside the housing cup 112 or may make them reciprocate up and down inside the housing cup 112.

When the dry gas discharge ports 116 are discharging the dry gas, the drain valve 119*v* and the exhaust valve 121*v* are opened. Liquid that is blown off from the first chemical liquid nozzle 31 and the spray shield 101 by the collision of the dry gas is released from the housing cup 112 through the drain port 118. In addition, the dry gas discharged from the dry gas discharge ports 116 is released from the housing cup 112 through the drain port 118 and released from the housing cup 112 through the exhaust port 120. Thereby, increase in air pressure inside the housing cup 112 can be suppressed and fluid exiting out of the standby pod 111 through the opening 113*o* can be lessened.

The cleaning and drying of the first chemical liquid nozzle 31 and the spray shield 101 is thus completed before the time the substrate W is carried out from the chamber 12. The cleaning and drying of the first chemical liquid nozzle 31 and the spray shield 101 may be performed each time a single substrate W is processed or may be performed each time a plurality of substrates W are processed or may be performed at every fixed time period or may be performed at an arbitrary timing. Just some of the steps of the cleaning and drying of the first chemical liquid nozzle 31 and the spray shield 101 may be performed in a state in which the substrate W is not in the chamber 12 or all of the steps of the cleaning and drying of the first chemical liquid nozzle 31 and the spray shield 101 may be performed in a state in which the substrate W is not in the chamber 12.

As described above, in this preferred embodiment, the spray droplets of the chemical liquid that are generated when the first chemical liquid nozzle 31 discharges the chemical liquid toward the upper surface of the substrate W are received by the spray shield 101. The first chemical liquid nozzle 31 discharges the chemical liquid toward the target position P1 within the upper surface of the substrate W. The chemical liquid discharged from the first chemical liquid nozzle 31 collides with the upper surface of the substrate W or a liquid on the substrate W at or in a vicinity of the target position P1. The shield surface 104 of the spray shield 101 is disposed above the target position P1 and directly opposes the target position P1. The shield surface 104 is therefore disposed close to a generation source of spray droplets of the chemical liquid. The spray droplets of the chemical liquid that are scattered upward from the substrate W can thereby be received efficiently by the spray shield 101.

The spray shield 101 moves together with the first chemical liquid nozzle 31. Even if the target position P1 moves within the upper surface of the substrate W due to movement of the first chemical liquid nozzle 31, the state in which the shield surface 104 directly opposes the target position P1 can be maintained. Therefore, regardless of which position within the upper surface of the substrate W the chemical liquid is discharged toward, the spray droplets of the chemical liquid can be received by the spray shield 101. Further, the first chemical liquid nozzle 31 discharges the chemical liquid in the chemical liquid discharge direction D1 that is inclined with respect to the upper surface of the substrate W. Therefore, in comparison to a case where the chemical liquid is discharged perpendicularly to the upper surface of the substrate W, a distance by which the spray droplets of the chemical liquid scatter upward from the substrate W can be decreased.

When the first chemical liquid nozzle 31 and the spray shield 101 are viewed from directly below, respective portions of the chemical liquid discharge port 95 are disposed at the outer side of the outer edge 104*o* of the shield surface 104 or on the outer edge 104*o* of the shield surface 104. In other words, when the first chemical liquid nozzle 31 and the spray shield 101 are viewed from directly below, the chemical liquid discharge port 95 is not surrounded by the outer edge 104*o* of the shield surface 104 and does not overlap with respective portions of the shield surface 104 other than the outer edge 104*o*. The spray shield 101 can thus be made compact in comparison to a case where the chemical liquid discharge port 95 is surrounded by the outer edge 104*o* of the shield surface 104.

In this preferred embodiment, at least a portion of the shield surface 104 of the spray shield 101 is disposed higher than the lower end 95L of the chemical liquid discharge port 95 of the first chemical liquid nozzle 31. When the first chemical liquid nozzle 31 discharges the chemical liquid, the spray droplets of the chemical liquid that scatter radially from the chemical liquid discharge port 95 are generated. By disposing at least a portion of the shield surface 104 as described above, the spray droplets of the chemical liquid that are scattered upward from the chemical liquid discharge port 95 can be received by the shield surface 104 and a range of dispersion of the spray droplets of the chemical liquid can be narrowed.

In this preferred embodiment, at least a portion of the shield surface 104 of the spray shield 101 is disposed higher than the lower end 95L of the chemical liquid discharge port 95 of the first chemical liquid nozzle 31 and the shield surface 104 is disposed close to the chemical liquid discharge port 95 of the first chemical liquid nozzle 31. The spray droplets of the chemical liquid that are scattered from the chemical liquid discharge port 95 can thus be received efficiently by the shield surface 104. On the other hand, the shield surface 104 is long in the front/rear direction of the spray shield 101 that is horizontal and parallel to the chemical liquid discharge direction D1 in plan view. A large portion of the spray droplets of the chemical liquid that are scattered upward from the substrate W moves in the front/rear direction of the spray shield 101 in plan view. Since the shield surface 104 is long in the front/rear direction of the spray shield 101, the spray droplets of the chemical liquid that are scattered upward from the substrate W can be received efficiently by the shield surface 104.

In this preferred embodiment, the first chemical liquid nozzle 31 discharges the chemical liquid in the direction parallel (strictly parallel or practically parallel) in plan view to the direction in which the first chemical liquid nozzle 31 moves horizontally. When the first chemical liquid nozzle 31 moves horizontally, not just the target position P1 within the upper surface of the substrate W but the spray shield 101 also moves in the same direction as the first chemical liquid nozzle 31. A large portion of the spray droplets of the chemical liquid that are scattered upward from the substrate W moves in the chemical liquid discharge direction D1 in plan view. By making the first chemical liquid nozzle 31 discharge the chemical liquid while moving the first chemical liquid nozzle 31 horizontally, the spray shield 101 can be moved close to or away from the spray droplets of the chemical liquid that are scattered upward from the substrate W to change the manner in which the spray droplets are received by the shield surface 104.

In this preferred embodiment, the distance in the vertical direction from the upper surface of the substrate W to the shield surface 104 is not fixed but changes. Specifically, the distance in the vertical direction from the upper surface of the substrate W to the shield surface 104 decrease with separation from the chemical liquid discharge port 95 in the front/rear direction of the spray shield 101, that is, the horizontal direction that is parallel to the chemical liquid discharge direction D1 in plan view. With separation from the chemical liquid discharge port 95, the shield surface 104 approaches the target position P1 within the upper surface of the substrate W. The spray droplets of the chemical liquid that are scattered upward from the substrate W can thus be received efficiently by the shield surface 104.

In this preferred embodiment, the upper end of the shield surface 104 is disposed higher than the lower end 95L of the chemical liquid discharge port 95 of the first chemical liquid nozzle 31. The upper end of the shield surface 104 is the portion of the shield surface 104 that is closest to the chemical liquid discharge port 95. That is, the portion of the shield surface 104 that is positioned highest is disposed higher than the lower end 95L of the chemical liquid discharge port 95 of the first chemical liquid nozzle 31 and is disposed at a position closest to the chemical liquid discharge port 95 among portions of the shield surface 104. The spray droplets of the chemical liquid that are scattered from the chemical liquid discharge port 95 can thus be received efficiently by the shield surface 104.

In this preferred embodiment, the upper end of the shield surface 104 is disposed close to the chemical liquid discharge port 95 of the first chemical liquid nozzle 31. The upper end of the shield surface 104 is the portion of the shield surface 104 that is closest to the chemical liquid discharge port 95 and is disposed higher than the lower end 95L of the chemical liquid discharge port 95. The spray droplets of the chemical liquid that are scattered from the chemical liquid discharge port 95 can thus be received efficiently by the shield surface 104. On the other hand, the shield surface 104 is long in the front/rear direction of the spray shield 101 that is horizontal and parallel to the chemical liquid discharge direction D1 in plan view. A large portion of the spray droplets of the chemical liquid that are scattered upward from the substrate W moves in the front/rear direction of the spray shield 101 in plan view. Since the shield surface 104 is long in the front/rear direction of the spray shield 101, the spray droplets of the chemical liquid that are scattered upward from the substrate W can be received efficiently by the shield surface 104.

In this preferred embodiment, the lower end of the shield surface 104 of the spray shield 101 is disposed not at a position lower than the lower surface 90 of the first chemical liquid nozzle 31 but at a position equal to the lower surface 90 of the first chemical liquid nozzle 31 in the vertical direction or a position higher than the lower surface 90 of the first chemical liquid nozzle 31. Therefore, in comparison to a case where the lower end of the shield surface 104 is disposed at a position lower than the lower surface 90 of the first chemical liquid nozzle 31, the chemical liquid discharge port 95 can be brought closer to the upper surface of the substrate W and an impact when the chemical liquid collides with the upper surface of the substrate W or a liquid on the substrate W can be relaxed.

In this preferred embodiment, the chemical liquid discharge port 95 of the first chemical liquid nozzle 31 opens at the outer circumferential surface 89 that extends upward from the lower surface 90 of the first chemical liquid nozzle 31. In this case, the inclination angle of the chemical liquid discharge direction D1 with respect to the horizontal plane tends to be smaller than that in a case where the chemical liquid discharge port 95 opens at the lower surface 90 of the first chemical liquid nozzle 31. When the chemical liquid is discharged obliquely toward the upper surface of the substrate W, the spray droplets of the chemical liquid scatter obliquely upward from the substrate W and horizontally away from the chemical liquid discharge port 95. When the inclination angle of the chemical liquid discharge direction D1 with respect to the horizontal plane decreases, an angle of the spray droplets that scatter obliquely upward from the substrate W (angle formed by a path through which liquid droplets pass and the horizontal plane) also decreases.

By forming the chemical liquid discharge port 95 at the outer circumferential surface 89 of the first chemical liquid nozzle 31, the inclination angle of the chemical liquid discharge direction D1 with respect to the horizontal plane can be decreased and a range of dispersion of the spray droplets in the up direction can be decreased. Further, since the distance in the vertical direction from the upper surface of the substrate W to the shield surface 104 decreases with separation from the chemical liquid discharge port 95, the spray droplets of the chemical liquid that are scattered obliquely upward from the substrate W at a small inclination angle with respect to the horizontal plane can also be received by the shield surface 104. The range of dispersion of the spray droplets of the chemical liquid can thereby be narrowed not just in the up direction but also in the horizontal direction.

In this preferred embodiment, sulfuric acid that is an example of a first component liquid exceeding 100° C. and hydrogen peroxide water that is an example of a second component liquid containing water and being less than 100° C. are mixed in the nozzle portion 81 of the first chemical liquid nozzle 31 and the mixed liquid of these is discharged as the chemical liquid from the nozzle portion 81 of the first chemical liquid nozzle 31. When the first component liquid exceeding 100° C. and the second component liquid containing water and being less than 100° C. are mixed immediately before discharge, spray droplets of the mixed liquid scatter at times from the chemical liquid discharge port 95 and the upper surface of the substrate W due to rapid boiling of water. By providing the spray shield 101, dispersion of such spray droplets can be prevented.

Further, the sulfuric acid piping **34*p* that is an example of the first component liquid piping and the hydrogen peroxide water piping 35*p* that is an example of the second component liquid piping are inserted in the arm portion 82 of cylindrical shape of the first chemical liquid nozzle 31. The first component liquid piping and the second component liquid piping can thus be protected from other members and the spray droplets of the chemical liquid by the arm portion 82 of the first chemical liquid nozzle 31. In addition, decrease in temperature of the first component liquid flowing through the first component liquid piping can be alleviated by the arm portion 82 of the first chemical liquid nozzle 31 to enable the first component liquid of high temperature to be supplied to the nozzle portion 81 of the first chemical liquid nozzle 31**. The chemical liquid of high activity and high temperature can thereby be formed and supplied to the substrate W.

In this preferred embodiment, the cleaning liquid is supplied to the first chemical liquid nozzle 31 and the spray shield 101 inside the standby pod 111 to clean the first chemical liquid nozzle 31 and the spray shield 101. The first chemical liquid nozzle 31 and the spray shield 101 pass through the opening **113*o* formed by the top cover 113 of the standby pod 111 and enter inside the housing cup 112 of the standby pod 111. When the first chemical liquid nozzle 31 and the spray shield 101 positioned at the standby position are viewed from above, the top cover 113 is disposed between the housing cup 112 and the first chemical liquid nozzle 31 plus the spray shield 101. Therefore, in comparison to a case where there is no top cover 113, a sealing property of the standby pod 111 can be increased and a fluid (the cleaning liquid, etc.) that exits out of the standby pod 111 through the opening 113*o*** can be lessened.

Other Preferred Embodiments

The present invention is not restricted to the contents of the above described preferred embodiments and various modifications are possible.

For example, when the first chemical liquid nozzle 31 and the spray shield 101 are viewed from below, a whole or a portion of the chemical liquid discharge port 95 may be disposed on the outer edge **104*o* of the shield surface 104**.

Figure 22:
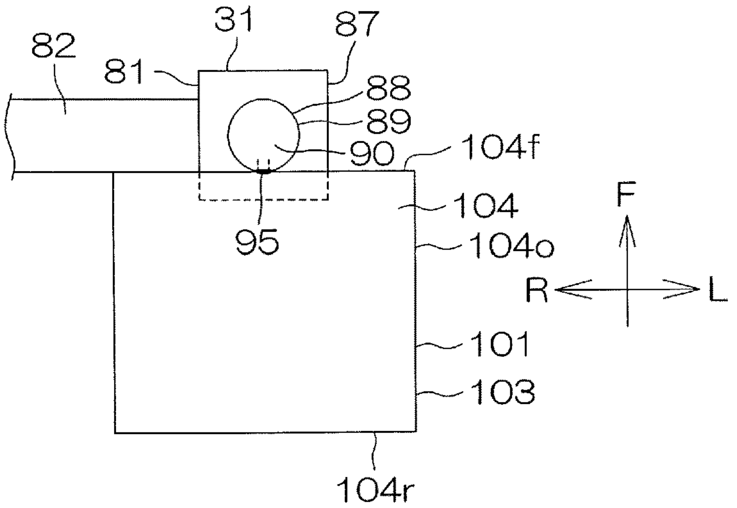
FIG. 22 is a schematic view of a first chemical liquid nozzle and a spray shield according to another preferred embodiment of the present invention as viewed from a lower side of the spray shield.
Figure 23:
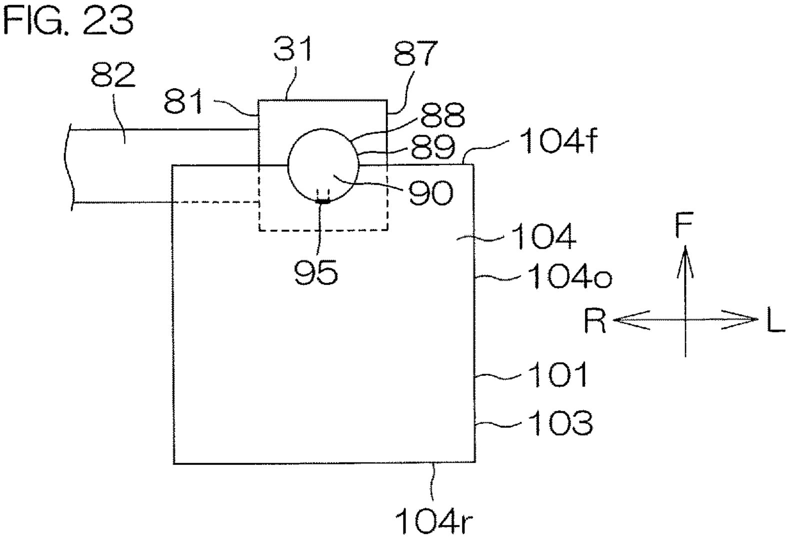
FIG. 23 is a schematic view of a first chemical liquid nozzle and a spray shield according to yet another preferred embodiment of the present invention as viewed from a lower side of the spray shield.

The chemical liquid discharge port 95 is opened at the outer circumferential surface 89 of circular cylindrical shape of the downstream portion 88 of the first chemical liquid nozzle 31. When the chemical liquid discharge port 95 is viewed from below, the chemical liquid discharge port 95 is of arcuate shape. When the first chemical liquid nozzle 31 and the spray shield 101 are viewed from below, the chemical liquid discharge port 95 of arcuate shape may be in point contact with the outer edge **104*o* of the shield surface 104 as shown in FIG. 22. Or, a notch in which the downstream portion 88 of the first chemical liquid nozzle 31 is disposed when the first chemical liquid nozzle 31 and the spray shield 101 are viewed from below may be formed in the shield surface 104 as shown in FIG. 23. With the example shown in FIG. 23, an entirety of the chemical liquid discharge port 95 is disposed on the outer edge 104*o* of the shield surface 104**.

Figure 24:
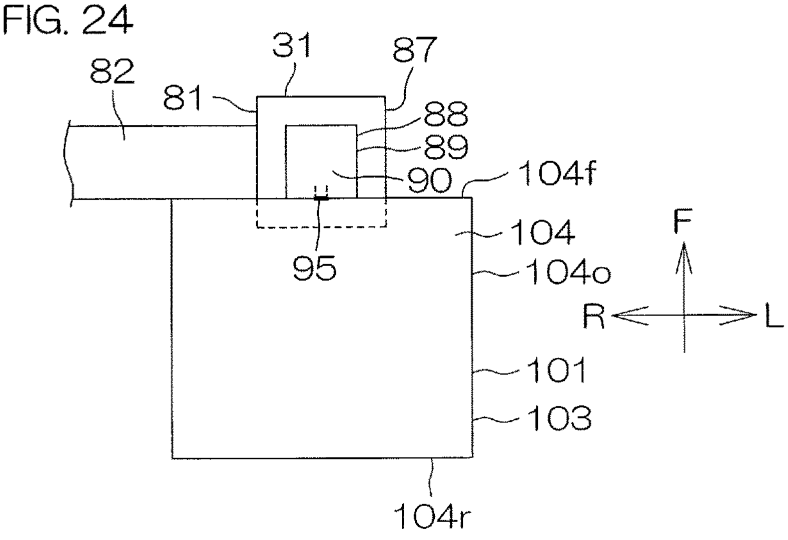
FIG. 24 is a schematic view of a first chemical liquid nozzle and a spray shield according to yet another preferred embodiment of the present invention as viewed from a lower side of the spray shield.

FIG. 24 shows an example where, a horizontal cross-section of the outer circumferential surface 89 of the downstream portion 88 of the first chemical liquid nozzle 31 is of a quadrilateral shape and when the chemical liquid discharge port 95 is viewed from below, the chemical liquid discharge port 95 has a rectilinear shape. In the case of this example, when the first chemical liquid nozzle 31 and the spray shield 101 are viewed from below, an entirety of the chemical liquid discharge port 95 of rectilinear shape may be disposed on the outer edge 104*o* of the shield surface 104 as shown in FIG. 24. Or, when the first chemical liquid nozzle 31 and the spray shield 101 are viewed from below, the entirety of the chemical liquid discharge port 95 of rectilinear shape may be disposed at the outer side of the outer edge 104*o* of the shield surface 104.

The chemical liquid discharge port 95 of the first chemical liquid nozzle 31 may be directed in the front direction or the rear direction of the first chemical liquid nozzle 31 instead of the left direction of the first chemical liquid nozzle 31. If an interval in the horizontal direction between the first chemical liquid nozzle 31 and the first rinse liquid nozzle 33 is wide or if the first rinse liquid nozzle 33 is not at the right side of the first chemical liquid nozzle 31, the chemical liquid discharge port 95 of the first chemical liquid nozzle 31 may be directed in the right direction of the first chemical liquid nozzle 31. For example, if the chemical liquid discharge port 95 of the first chemical liquid nozzle 31 is directed in the front direction of the first chemical liquid nozzle 31, the spray shield 101 should be disposed at the front side of the nozzle portion 81 of the first chemical liquid nozzle 31.

As long as the SPM can be discharged obliquely toward the upper surface of the substrate W, the chemical liquid discharge port 95 may open at the lower surface 90 of the first chemical liquid nozzle 31 instead of at the outer circumferential surface 89 (outer circumferential surface 89 of the downstream portion 88) of the first chemical liquid nozzle 31.

The shape of the nozzle portion 81 of the first chemical liquid nozzle 31 is not restricted to the shapes shown in FIG. 7A to FIG. 7C. For example, the nozzle portion 81 of the first chemical liquid nozzle 31 may be of the shame shape as the nozzle portion 81 of the second chemical liquid nozzle 32 shown in FIG. 7A to FIG. 7C.

The arm portion 82 of the first chemical liquid nozzle 31 may be omitted. In this case, the nozzle portion 81 of the first chemical liquid nozzle 31 should be supported by a nozzle arm that is coupled to the driving body 84 (see FIG. 7B) and is a separate member from the first chemical liquid nozzle 31.

Just the first chemical liquid nozzle 31 may be supported by the first nozzle moving unit 38. That is, the second chemical liquid nozzle 32 and the first rinse liquid nozzle 33 may be supported by a nozzle moving unit other than the first nozzle moving unit 38.

The sulfuric acid and the hydrogen peroxide water may be mixed inside the arm portion 82 of the first chemical liquid nozzle 31 instead of inside the nozzle portion 81 of the first chemical liquid nozzle 31. Or, the sulfuric acid and the hydrogen peroxide water may be mixed outside the first chemical liquid nozzle 31. In this case, the sulfuric acid and the hydrogen peroxide water may be mixed in a region of the lower space SL (see FIG. 3) outside the first chemical liquid nozzle 31 or may be mixed outside the chamber 12.

The spray shield 101 may be a member that is integral to the first chemical liquid nozzle 31 instead of being a member that is separate from the first chemical liquid nozzle 31. For example, the spray shield 101 may be integral to the upstream portion 87 of the first chemical liquid nozzle 31. In this case, the front surface 102*f* of the support arm 102 of the spray shield 101 may be in contact with the outer circumferential surface 89 of the downstream portion 88 of the first chemical liquid nozzle 31.

The support arm 102 may be omitted from the spray shield 101. In this case, the shield plate 103 of the spray shield 101 may be a separate member from the first chemical liquid nozzle 31 that is mounted to the first chemical liquid nozzle 31 or may be a member that is integral to the first chemical liquid nozzle 31.

If the spray shield 101 does not hit the SPM that scatters toward the upper surface of the substrate W from the first chemical liquid nozzle 31, an entirety of the shield surface 104 may be disposed lower than the lower end 95L of the chemical liquid discharge port 95.

Figure 25:
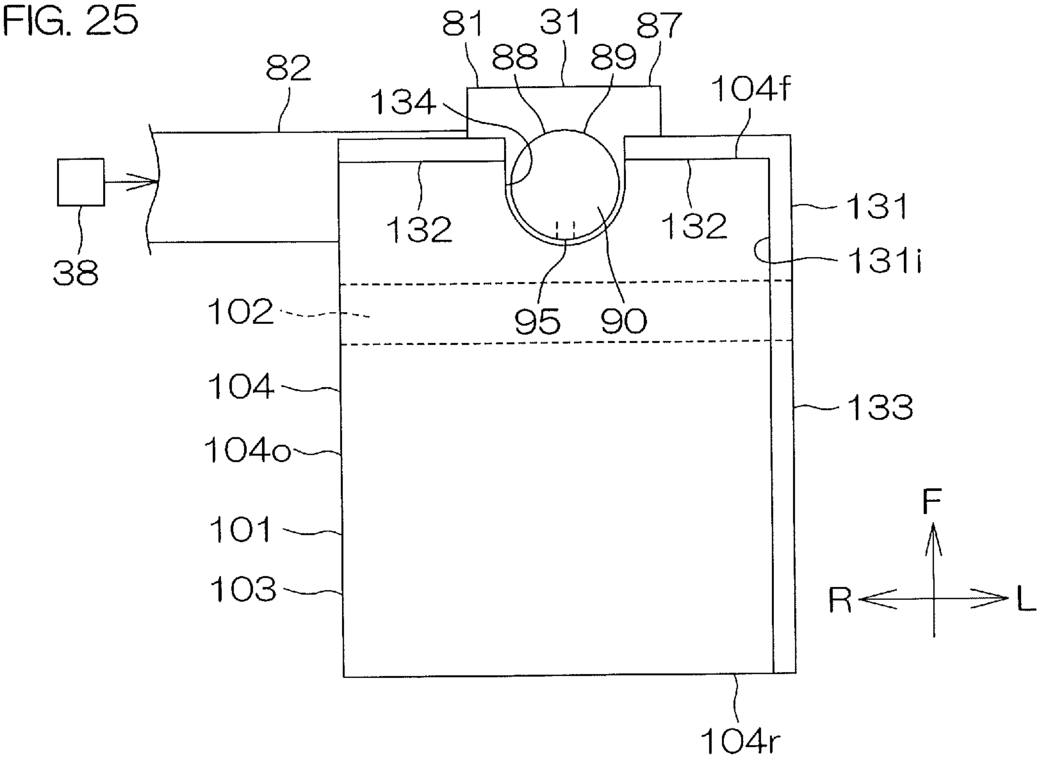
FIG. 25 is a schematic view of a first chemical liquid nozzle and a spray shield according to yet another preferred embodiment of the present invention as viewed from a lower side of the spray shield.

As shown in FIG. 25, the spray shield 101 may further include a guard wall 131 that extends downward from the shield surface 104. FIG. 25 shows an example where the guard wall 131 is provided at the front end 104*f* of the shield surface 104 and the left end of the shield surface 104. In this example, as with the shield surface 104 shown in FIG. 23, the shield surface 104 forms a recess portion 134 that houses at least a portion of the lower surface 90 of the first chemical liquid nozzle 31 when the first chemical liquid nozzle 31 and the shield surface 104 are viewed from below.

Figure 26:
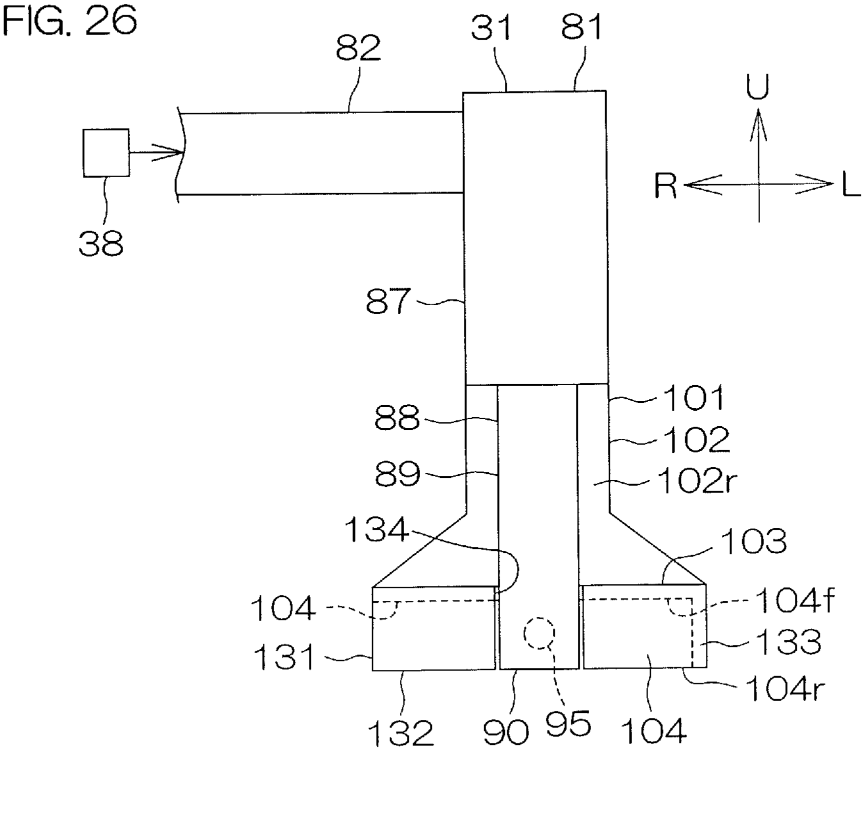
FIG. 26 is a schematic view of the first chemical liquid nozzle and the spray shield shown in FIG. 25 as viewed from a front side of the spray shield.

The guard wall 131 includes a front wall 132 that projects downward from the front end 104*f* of the shield surface 104 and a left wall 133 that projects downward from the left end of the shield surface 104. As shown in FIG. 25 and FIG. 26, the front wall 132 is provided from a left end of the front end 104*f* of the shield surface 104 to a right end of the front end 104*f*. Similarly, as shown in FIG. 27 and FIG. 28, the left wall 133 is provided from a front end of the left end of the shield surface 104 to a rear end of the left end.

Figure 27:
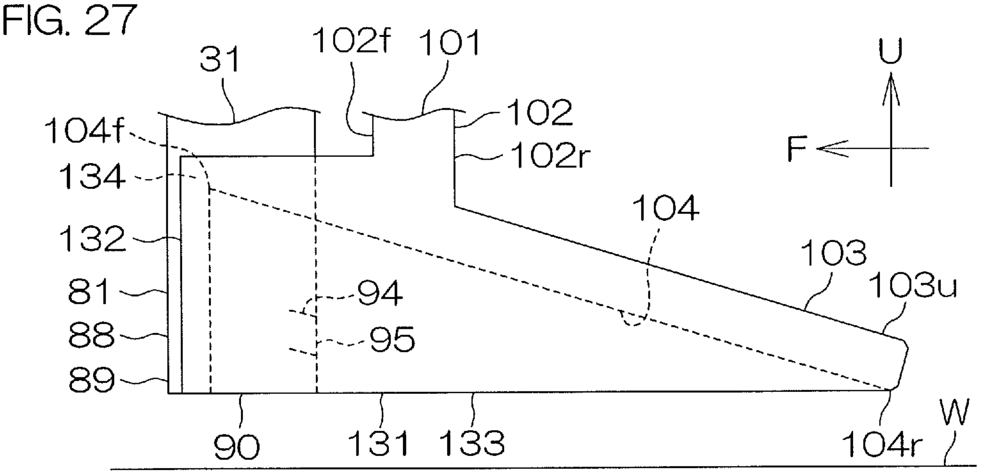
FIG. 27 is a schematic view of the first chemical liquid nozzle and the spray shield shown in FIG. 25 as viewed from a left side of the spray shield.
Figure 28:
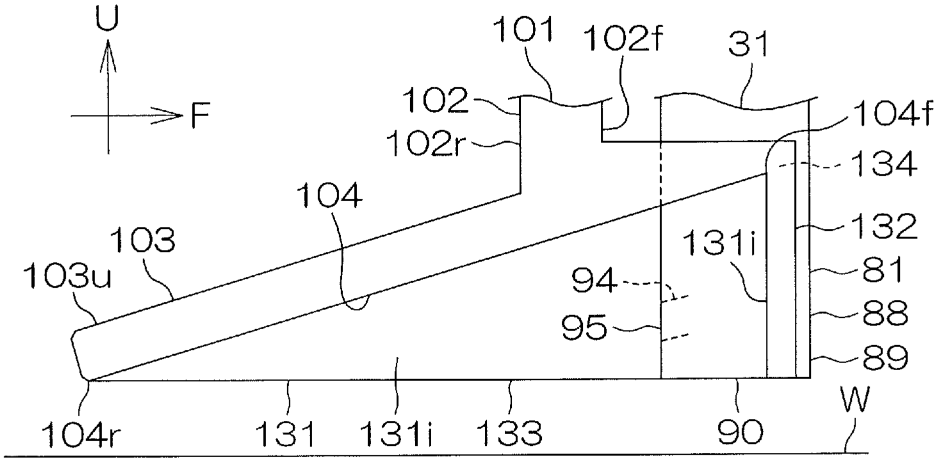
FIG. 28 is a schematic view of the first chemical liquid nozzle and the spray shield shown in FIG. 25 as viewed from a right side of the spray shield.

FIG. 27 and FIG. 28 show an example where a distance in the vertical direction from the front end 104*f* of the shield surface 104 to a lower end of the front wall 132 is fixed and a distance in the vertical distance from the left end of the shield surface 104 to a lower end of the left wall 133 decreases with separation horizontally from the first chemical liquid nozzle 31. A distance in the vertical direction from the upper surface of the substrate W to a lower end of the guard wall 131 is the same at all positions. The distance may change according to position. The lower end of the guard wall 131 may be disposed at a height equal to that of the lower surface 90 of the first chemical liquid nozzle 31 or may be disposed higher or lower than the lower surface 90 of the first chemical liquid nozzle 31. FIG. 27 and FIG. 28 show an example of the former.

The guard wall 131 may be provided at just a portion of the outer edge 104*o* of the shield surface 104 as shown in FIG. 25 or may surround an entire circumference of the shield surface 104 when the first chemical liquid nozzle 31 and the shield surface 104 are viewed from below. In the former case, the guard wall 131 may be provided at just one of the front end 104, the right end, the left end, and the rear end 104*r* of the shield surface 104 or may be provided at two or more of the above.

As shown in FIG. 28, the guard wall 131 includes an inner surface 131*i* that extends downward from the shield surface 104. An angle formed by the inner surface 131*i* of the guard wall 131 and the shield surface 104 is not less than 45 degrees and not more than 90 degrees. The angle may be outside the above-described range. A vertical cross-section of a corner portion formed by a joined portion of the inner surface 131*i* of the guard wall 131 and the shield surface 104 may be constituted of a broken line or a curve or may be constituted by both a straight line and a curve.

As shown in FIG. 25, the recess portion 134 is recessed rearward from the front wall 132. The front wall 132 is divided into two divided bodies by the recess portion 134. At least a portion of the recess portion 134 is formed by the outer edge 104*o* of the shield surface 104. An inner surface of the recess portion 134 that corresponds to being a portion of the outer edge 104*o* of the shield surface 104 may be separated horizontally from the outer circumferential surface 89 of the first chemical liquid nozzle 31 or may be in contact with the outer circumferential surface 89 of the first chemical liquid nozzle 31. FIG. 25 shows an example of the former. When the first chemical liquid nozzle 31 and the shield surface 104 are viewed from below, the chemical liquid discharge port 95 is disposed inside the recess portion 134.

According to the arrangement shown in FIG. 25 to FIG. 28, spray droplets of the chemical liquid that scatter along a path exiting from between the substrate W and the shield surface 104 can be received by the guard wall 131. Further, the inner surface of the recess portion 134 that corresponds to being a portion of the outer edge 104*o* of the shield surface 104 is disposed close to the chemical liquid discharge port 95 and therefore, the spray droplets of the chemical liquid that scatter from the chemical liquid discharge port 95 can be received efficiently by the shield surface 104. Moreover, the recess portion 134 is recessed from the guard wall 131, the guard wall 131 is disposed close to the chemical liquid discharge port 95, and therefore the spray droplets of the chemical liquid that exit from between the substrate W and the shield surface 104 can be lessened further.

Figure 29:
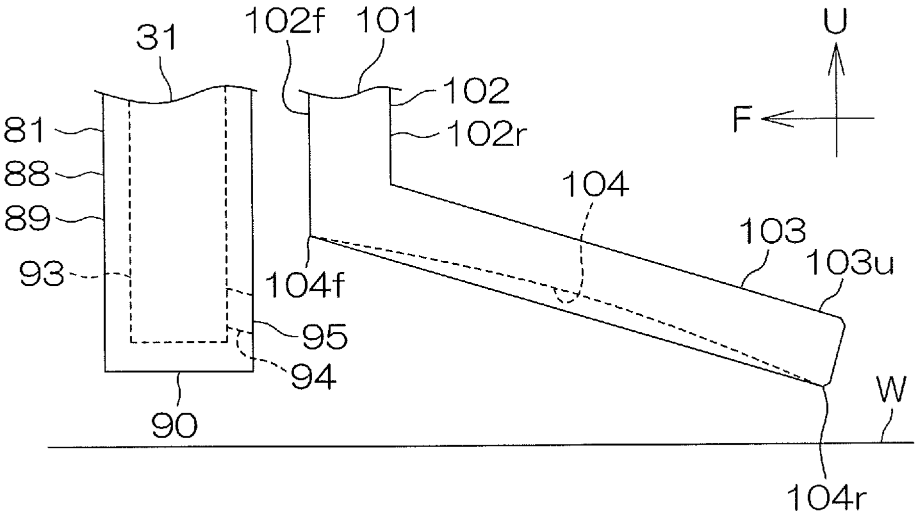
FIG. 29 is a schematic view of a first chemical liquid nozzle and a spray shield according to yet another preferred embodiment of the present invention as viewed from a left side of the spray shield.
Figure 30:
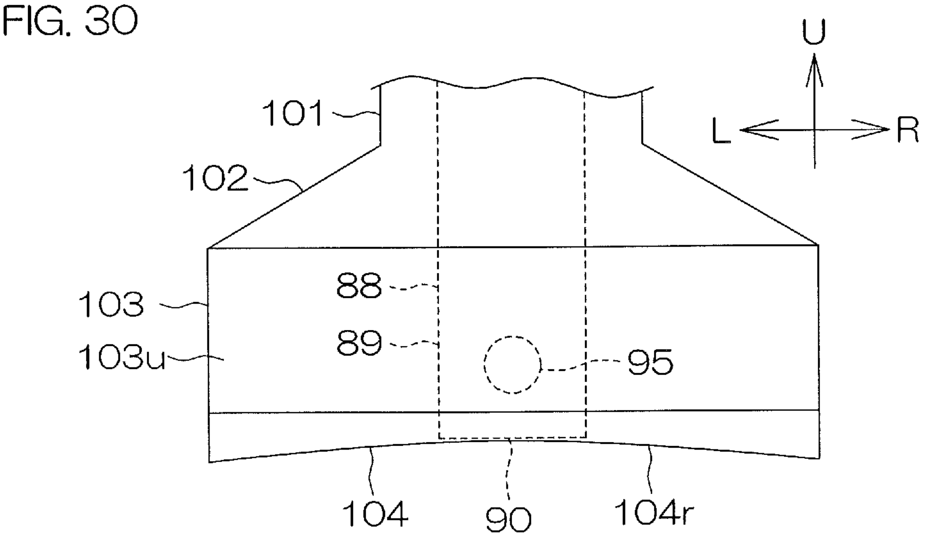
FIG. 30 is a schematic view of the first chemical liquid nozzle and the spray shield shown in FIG. 29 as viewed from a rear side of the spray shield.

As shown in FIG. 29 and FIG. 30, the shield surface 104 may be of a spherical crown shape that is upwardly convex instead of being a flat surface. The shield surface 104 may be a portion of surface of a sphere or a portion of a surface of an ellipsoid. Regardless of at which position the shield surface 104 is sectioned by a vertical flat surface, a vertical cross-section of the shield surface 104 is an arcuate shape that is upwardly convex. FIG. 30 shows an example where the rear end 104*r* of the shield surface 104 is of an arcuate shape that is upwardly convex. As shown in FIG. 29, the left end of the shield surface 104 may be made to have a rectilinear shape to block the spray droplets of the chemical liquid that scatter along a path exiting from between the substrate W and the shield surface 104. In this case, the right end of the shield surface 104 may also be made to have a rectilinear shape that is parallel to the left end of the shield surface 104.

According to the arrangement shown in FIG. 29 and FIG. 30, spray droplets of the chemical liquid that collided with the shield surface 104 bounce back toward a center of a sphere that includes the shield surface 104 because the shield surface 104 is of the spherical crown shape that is upwardly convex. For example, the spray droplets of the chemical liquid that collided with the shield surface 104 scatter toward a region of circular shape within the upper surface of the substrate W. The range of dispersion of the spray droplets of the chemical liquid that collided with the shield surface 104 can thereby be narrowed. Further, liquid droplets that adhered to the shield surface 104 can be guided to the right end, left end, or the rear end 104*r* of the shield surface 104 and liquid droplets remaining in regions of the shield surface 104 besides these portions can be lessened.

Figure 31:
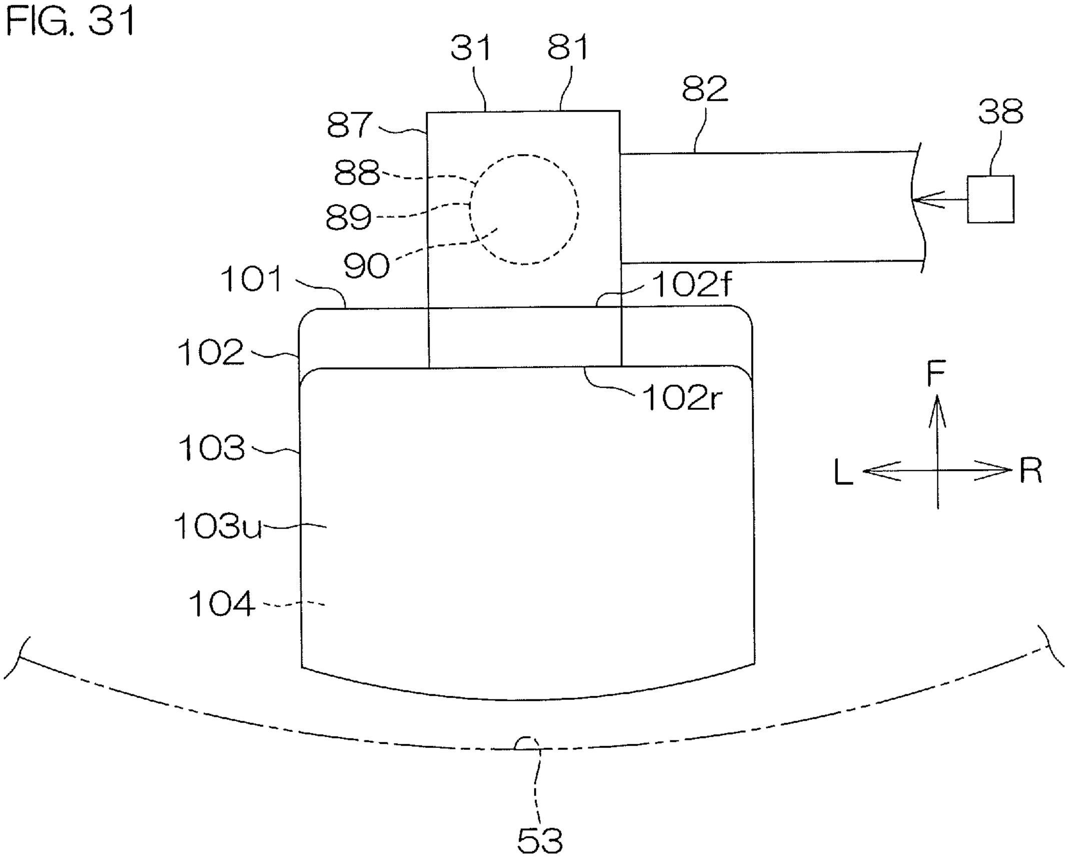
FIG. 31 is a schematic view of a first chemical liquid nozzle and a spray shield according to yet another preferred embodiment of the present invention as viewed from an upper side of the spray shield.

As shown in FIG. 31, the rear end of the shield plate 103 that corresponds to being a rear end of the spray shield 101 may be of an arcuate shape in plan view instead of a rectilinear shape in plan view. The rear end of the shield plate 103 extends along a circle that surrounds an entire circumference of the first chemical liquid nozzle 31 in plan view. The inner circumferential surface of the guard 53 has a horizontal cross-section of circular shape. FIG. 31 shows an example where a radius of curvature of the rear end of the shield plate 103 is smaller than a radius of curvature of the inner circumferential surface of the guard 53 and greater than a radius of curvature of the lower surface 90 (radius of curvature of the downstream portion 88) of the first chemical liquid nozzle 31.

According to the arrangement shown in FIG. 31, in comparison to a case where the rear end of the shield plate 103 is of a rectilinear shape in plan view, the rear end of the shield plate 103 can be brought close to the inner circumferential surface of the guard 53 without putting the rear end of the shield plate 103 in contact with the guard 53. Therefore, the target position P1 (see FIG. 16) when the first chemical liquid nozzle 31 and the spray shield 101 are disposed at the outer edge position (position indicated by alternate long and two short dashed lines in FIG. 16) can be brought close to an outer circumference of the upper surface of the substrate W and the chemical liquid can be made to collide directly with a wider range within the upper surface of the substrate W.

Figure 32:
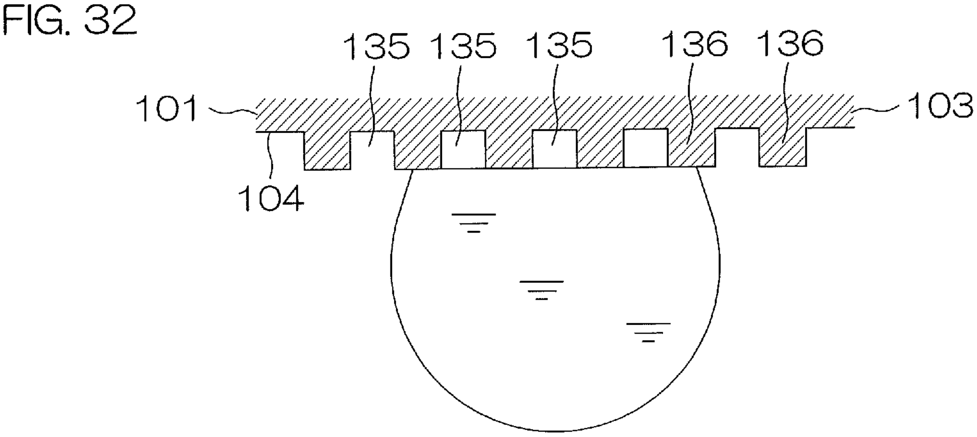
FIG. 32 is a schematic cross-sectional view showing a vertical cross-section of a spray shield according to yet another preferred embodiment of the present invention.

As shown in FIG. 32, the shield surface 104 may be an uneven surface with which a plurality of surface recess portions 135 that form spaces at a boundary between the shield surface 104 and a liquid droplet are formed. The shield surface 104 may be formed to an uneven surface, for example, by cutting. The shield surface 104 forms the plurality of surface recess portions 135 that are recessed upward and a plurality of surface projection portions 136 that project downward. The surface recess portions 135 and the surface projection portions 136 may be of at least one among straight lines, curves, and dot shapes or may be other than these. For example, the surface recess portions 135 and the surface projection portions 136 may be of straight line shapes extending in the chemical liquid discharge direction D1 (see FIG. 11). FIG. 32 shows an example where vertical cross-sections of the surface recess portions 135 and vertical cross-sections of the surface projection portions 136 are of rectangular shapes that are long in the horizontal direction. The shapes of the vertical cross-sections of the surface recess portions 135 and the surface projection portions 136 are not restricted to rectangular shapes.

According to the arrangement shown in FIG. 32, air inside the surface recess portions 135 is interposed between the shield surface 104 and the liquid droplet and therefore a contact area of the shield surface 104 and the liquid droplet can be lessened. Thereby, hydrophobicity of the shield surface 104 can be increased and the liquid droplet can be made to flow down readily without staying on the shield surface 104. Also, an amount of liquid droplets held by the shield surface 104 can be decreased and the liquid droplets held by the shield surface 104 can be made small. Liquid droplets that are generated when liquid droplets scattered from the substrate W or the chemical liquid discharge port 95 collide with the liquid droplets held by the shield surface 104 can thus be lessened.

The spin chuck 21 is not restricted to a mechanical chuck with which a plurality of chuck pins 22 are put in contact with the outer circumferential surface of the substrate W and may instead be a chuck of other form such as a vacuum chuck, etc.

The substrate processing apparatus 1 is not restricted to an apparatus to process a disc-shaped substrate W, and may be an apparatus to process a polygonal substrate W.

Two or more arrangements among all the arrangements described above may be combined. Two or more steps among all the steps described above may be combined.

The spin chuck 21 is an example of a substrate holding unit. The spin chuck 21 is also an example of a substrate holder. The first chemical liquid nozzle 31 is an example of a chemical liquid nozzle. The sulfuric acid piping 34*p* is an example of the first component liquid piping. The hydrogen peroxide water piping 35*p* is an example of the second component liquid piping. The first nozzle moving unit 38 is an example of a nozzle moving unit. The front end 104*f* of the shield surface 104 is an example of the upper end of the shield surface 104. The rear end 104*r* of the shield surface 104 is an example of the lower end of the shield surface 104.

The preferred embodiments of the present invention are described in detail above, however, these are just detailed examples used for clarifying the technical contents of the present invention, and the present invention should not be limitedly interpreted to these detailed examples, and the spirit and scope of the present invention should be limited only by the claims appended hereto.

What is claimed is:

1. A substrate processing apparatus comprising:

a substrate holding unit that holds a substrate horizontally;

a chemical liquid nozzle that includes a chemical liquid discharge port that discharges a chemical liquid in a chemical liquid discharge direction, inclined with respect to an upper surface of the substrate held by the substrate holding unit, toward a target position on the upper surface of the substrate;

a spray shield that includes a shield surface directly opposing the upper surface of the substrate and with which the shield surface overlaps with the target position in plan view and, when the chemical liquid nozzle and the shield surface are viewed from below, all portions of the chemical liquid discharge port are disposed at an outer side of an outer edge of the shield surface or on the outer edge of the shield surface; the shield surface is not in contact with the chemical liquid on the substrate; and a nozzle moving unit that moves the chemical liquid nozzle together with the spray shield, wherein at least a portion of the shield surface is disposed higher than an upper end of the chemical liquid discharge port.

2. The substrate processing apparatus according to claim 1, wherein at least a portion of the shield surface is disposed higher than a lower end of the chemical liquid discharge port.

3. The substrate processing apparatus according to claim 2, wherein when the chemical liquid nozzle and the shield surface are viewed from below, a shortest distance from the chemical liquid discharge port to the outer edge of the shield surface is shorter than a length of the shield surface in a front/rear direction of the spray shield that is horizontal and parallel to the chemical liquid discharge direction in plan view.

4. A substrate processing apparatus comprising:

a substrate holding unit that holds a substrate horizontally;

a chemical liquid nozzle that includes a chemical liquid discharge port that discharges a chemical liquid in a chemical liquid discharge direction, inclined with respect to an upper surface of the substrate held by the substrate holding unit, toward a target position on the upper surface of the substrate;

a spray shield that includes a shield surface directly opposing the upper surface of the substrate and with which the shield surface overlaps with the target position in plan view and, when the chemical liquid nozzle and the shield surface are viewed from below, all portions of the chemical liquid discharge port are disposed at an outer side of an outer edge of the shield surface or on the outer edge of the shield surface; and a nozzle moving unit that moves the chemical liquid nozzle together with the spray shield, wherein the chemical liquid discharge direction is a direction that is parallel in plan view to a direction in which the nozzle moving unit moves the chemical liquid nozzle horizontally.

5. A substrate processing apparatus comprising:

a substrate holding unit that holds a substrate horizontally;

a chemical liquid nozzle that includes a chemical liquid discharge port that discharges a chemical liquid in a chemical liquid discharge direction, inclined with respect to an upper surface of the substrate held by the substrate holding unit, toward a target position on the upper surface of the substrate;

a spray shield that includes a shield surface directly opposing the upper surface of the substrate and with which the shield surface overlaps with the target position in plan view and, when the chemical liquid nozzle and the shield surface are viewed from below, all portions of the chemical liquid discharge port are disposed at an outer side of an outer edge of the shield surface or on the outer edge of the shield surface; and a nozzle moving unit that moves the chemical liquid nozzle together with the spray shield, wherein a distance in a vertical direction from the upper surface of the substrate to the shield surface decreases as a distance from the chemical liquid discharge port in a front/rear direction of the spray shield that is horizontal and parallel to the chemical liquid discharge direction in plan view increases.

6. The substrate processing apparatus according to claim 5, wherein an upper end of the shield surface is a portion of the shield surface that is closest to the chemical liquid discharge port and is disposed higher than a lower end of the chemical liquid discharge port.

7. The substrate processing apparatus according to claim 6, wherein when the chemical liquid nozzle and the shield surface are viewed from below, a shortest distance from the chemical liquid discharge port to the upper end of the shield surface is shorter than a length of the shield surface in the front/rear direction of the spray shield.

8. The substrate processing apparatus according to claim 5, wherein the chemical liquid nozzle includes a lower surface that directly opposes the upper surface of the substrate and a lower end of the shield surface is disposed at a height equal to the lower surface of the chemical liquid nozzle or a height higher than the lower surface.

9. The substrate processing apparatus according to claim 5, wherein the chemical liquid nozzle includes a lower surface that directly opposes the upper surface of the substrate and an outer circumferential surface of cylindrical shape that extends upward from the lower surface and the chemical liquid discharge port opens at the outer circumferential surface of the chemical liquid nozzle.

10. The substrate processing apparatus according to claim 1, wherein the substrate processing apparatus further comprises: a first component liquid piping that guides a first component liquid exceeding 100° C. toward the chemical liquid discharge port; and a second component liquid piping that guides a second component liquid containing water and being less than 100° C. toward the chemical liquid discharge port;

the chemical liquid nozzle includes an arm portion of cylindrical shape that extends horizontally and a nozzle portion that extends downward from the arm portion, the nozzle portion includes an internal space in which the first component liquid exceeding 100° C. and the second component liquid containing water and being less than 100° C. are mixed and the chemical liquid discharge port by which the mixed liquid of the first component liquid and the second component liquid mixed in the internal space is discharged as the chemical liquid, and the first component liquid piping and the second component liquid piping are inserted in the arm portion of cylindrical shape and connected to the nozzle portion.

11. The substrate processing apparatus according to claim 1, wherein the substrate processing apparatus further comprises: a standby pod that houses the chemical liquid nozzle and the spray shield; and a cleaning liquid piping that guides a cleaning liquid to be supplied to the chemical liquid nozzle and the spray shield inside the standby pod; and the standby pod includes a housing cup having an inner circumferential surface of cylindrical shape that, in plan view, surrounds the chemical liquid nozzle and the spray shield positioned at a standby position and a top cover projecting from the inner circumferential surface of the housing cup in plan view and forming an opening through which the chemical liquid nozzle and the spray shield pass when the chemical liquid nozzle and the spray shield enter inside the housing cup.

12. The substrate processing apparatus according to claim 1, wherein the spray shield further includes a guard wall that extends downward from the shield surface.

13. The substrate processing apparatus according to claim 1, wherein the chemical liquid nozzle includes a lower surface that directly opposes the upper surface of the substrate and the outer edge of the shield surface forms a recess portion that houses at least a portion of the lower surface of the chemical liquid nozzle when the chemical liquid nozzle and the spray shield are viewed from below.

14. The substrate processing apparatus according to claim 13, wherein the spray shield further includes a guard wall that extends downward from the shield surface and the recess portion is recessed from the guard wall.

* * * * *